United States Patent [19]

Scheuneman

[11] Patent Number: 4,633,434

[45] Date of Patent: Dec. 30, 1986

[54] HIGH PERFORMANCE STORAGE UNIT

[75] Inventor: James H. Scheuneman, St. Paul, Minn.

[73] Assignee: Sperry Corporation, New York, N.Y.

[21] Appl. No.: 596,130

[22] Filed: Apr. 2, 1984

[51] Int. Cl.⁴ .............................................. G06F 13/00
[52] U.S. Cl. ................................................... 364/900
[58] Field of Search ... 364/200 MS File, 900 MS File

[56] References Cited

U.S. PATENT DOCUMENTS

| 3,916,383 | 10/1975 | Malcolm | 364/200 |
|---|---|---|---|
| 4,016,541 | 4/1977 | Delagi et al. | 364/200 |
| 4,101,960 | 7/1978 | Stokes et al. | 364/200 |
| 4,374,414 | 2/1983 | Comfort et al. | 364/200 |
| 4,443,846 | 4/1984 | Adcock | 364/200 |
| 4,455,602 | 6/1984 | Baxter, III et al. | 364/200 |
| 4,493,036 | 1/1985 | Boudreau et al. | 364/200 |
| 4,509,140 | 4/1985 | Cheung | 364/900 |

Primary Examiner—James D. Thomas
Assistant Examiner—William G. Niessen
Attorney, Agent, or Firm—Charles A. Johnson; Kenneth T. Grace; Marshall M. Truex

[57] ABSTRACT

A large capacity (8 memory banks of 524K error-corrected 36 bit words stored) high performance (latency as low as 240 nanoseconds, 12.8 gigabits/second aggregate data transfer capability with up to 11.4 gigabits/second utilized) pipelined (8 deep request pipeline) random access memory store simultaneously (to the limit of bank addressing conflicts) services intermixed requests from an internal exerciser plus ported requestors (up to 10) of plural types (3 types), which requestors are not of the same interface cycle time (30 nsec vs. 60 nsec). Furthermore, to such nonuniform interface cycle times, the bit-width of the data transfer interfaces (ports) to the requestors of plural types is also not uniform, but is actually wider (4 interface words of 36 bits each=144 bits) to faster (30 nanosecond) requestors than is that data transfer bit-width (2 interface words=72 bits) to slower (60 nsec) requestors. Three differing individual requestor bandwidths=data-transfer-bit width/data-transfer-period (144 bits/30 nanosecond, 72 bits/120 nanosecond or 248 bits/240 nanosecond) are intermixedly and simultaneously (to the limit of addressing possibility) supported on 8 memory banks each of which does output 144 bits per 90 nanoseconds.

5 Claims, 55 Drawing Figures

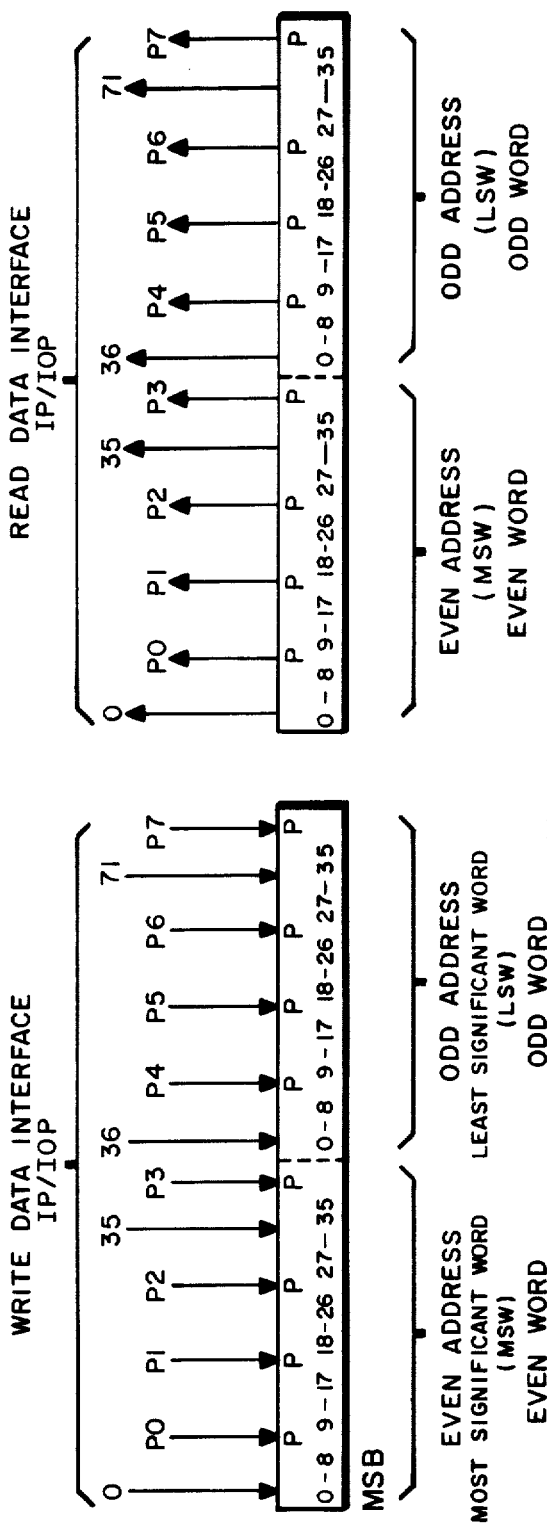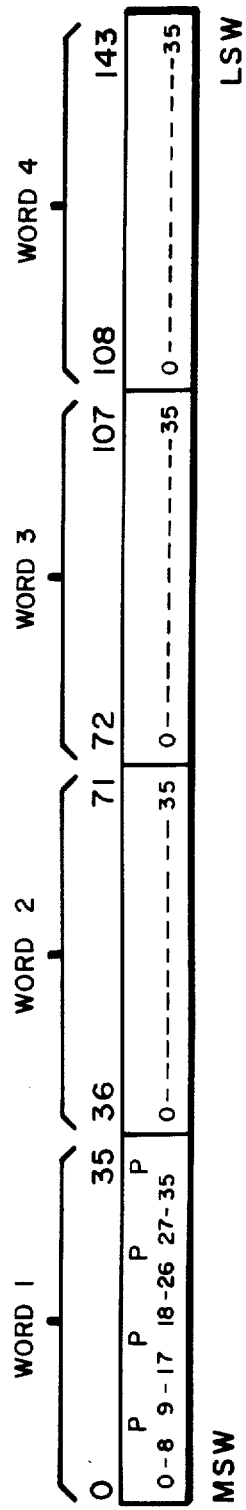
Fig. 5a
Fig. 5b

| SIGNAL | NUMBER OF LINES | | | DIRECTION HPSU-REQUESTER |
|---|---|---|---|---|
| | IOP | IP | SP | |
| REQUESTER AVAILABLE | 2 | 2 | 2 | ← |
| HPSU AVAILABLE | 2 | 2 | 2 | → |
| REQUEST | 1 | 1 | 1 | ← |
| ACKNOWLEDGE 1 | 1 | 1 | 1 | → |
| ACKNOWLEDGE 2 | 1 | 1 | 1 | → |
| STATUS CHECK* | 0 | 1 | 0 | → |
| INTERFACE CHECK | 1 | 1 | 1 | → |
| ADDRESS | 24 | 24 | 22 | ← |
| ADDRESS PARITY | 4 | 4 | 3 | ← |
| WRITE DATA | 72 | 72 | 144 | ← |
| WRITE DATA PARITY | 8 | 8 | 16 | ← |
| READ DATA | 72 | 72 | 144 | → |
| READ DATA PARITY | 8 | 8 | 16 | → |
| FUNCTION CODE | 5 | 5 | 6 | ← |
| FUNCTION CODE PARITY | 1 | 1 | 1 | ← |
| START | 6 | 6 | 0 | ← |
| START PARITY | 1 | 1 | 0 | ← |
| END | 6 | 6 | 0 | ← |
| END PARITY | 1 | 1 | 0 | ← |
| DAYCLOCK COMPARE INTERRUPT* | 0 | 1 | 0 | → |
| ACCESS LOCK (PORTS 4-7) | 0 | 1 | 0 | ← |
| BANK NOT AVAILABLE | 1 | 1 | 1 | → |
| INITIAL LOAD PROGRAM 0, 1 | 2 | 2 | 2 | → |
| INITIAL PROGRAM LOAD COMPLETE* | 0 | 1 | 0 | → |
| RESET CLEAR (PORTS 4-7) | 0 | 1 | 0 | ← |
| MULTIPLE UNCORRECTABLE ERROR 1,2 (SP 1,2,3,4) | 2 | 2 | 4 | → |
| REQUEST TAG | 0 | 0 | 1 | ← |
| STATUS CHECK ACKNOWLEDGE (PORTS 4-7) | 0 | 1 | 0 | ← |
| DAYCLOCK COMPARE INTERRUPT ACKNOWLEDGE (PORTS 4-7) | 0 | 1 | 0 | ← |
| INTERNAL CHECK | 1 | 1 | 1 | → |
| DELETE UNIT AVAILABLE (PORTS 4-7) | 0 | 1 | 0 | ← |
| REQUEST TAG RESPONSE | 0 | 0 | 1 | → |
| READ ACKNOWLEDGE 2 TAG | 0 | 0 | 1 | → |
| MAINTENANCE ACKNOWLEDGE 2 | 0 | 0 | 1 | → |

\* = BROADCAST LINES IN PORTS 4-7

_Fig. 6_

P = PARITY

IP, IOP FUNCTION WORD FORMAT

P = PARITY

IP, IOP START AND END FIELD FORMAT

P = PARITY

SP FUNCTION WORD FORMAT

P = PARITY

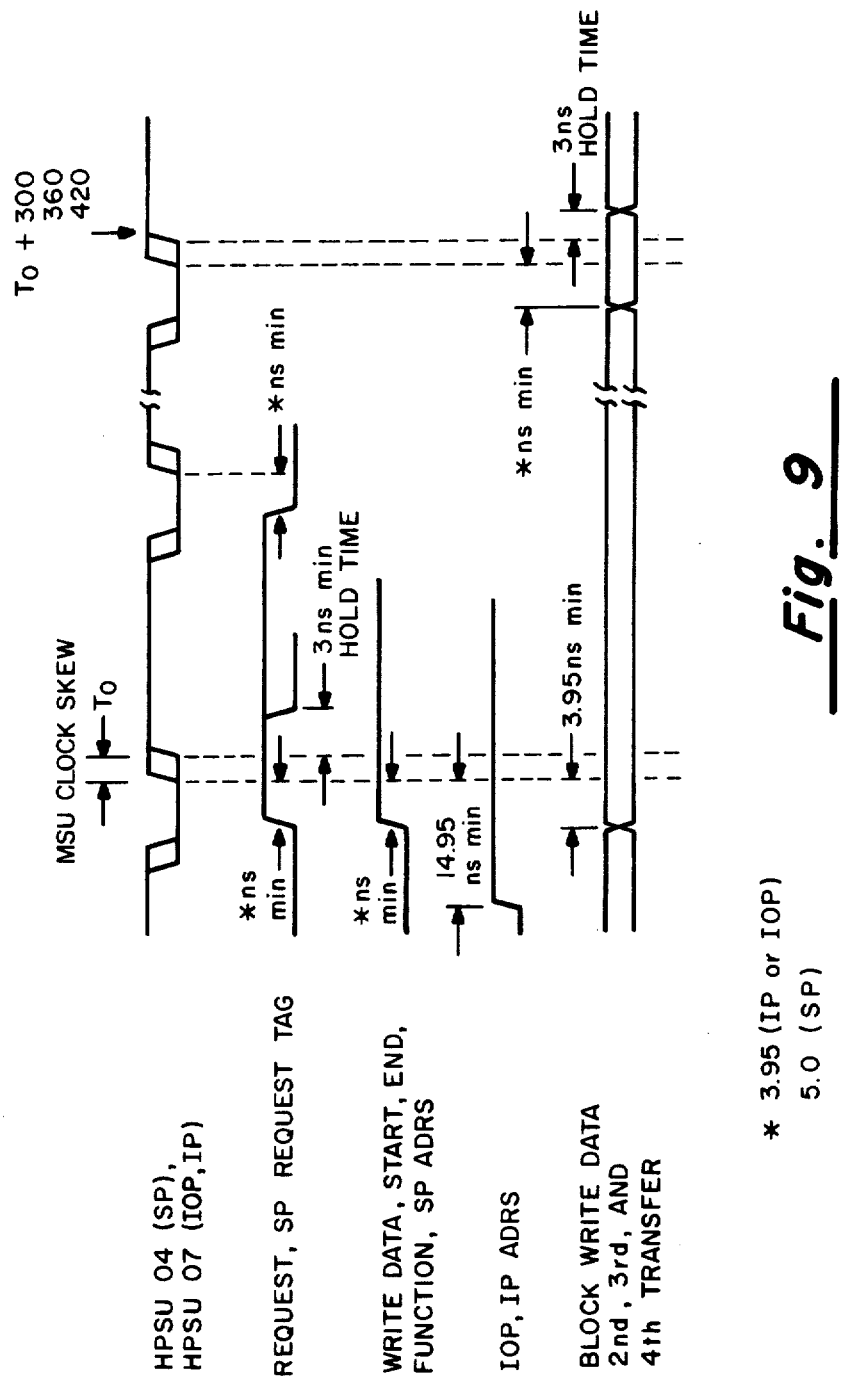

| OCTAL CODE | TYPE |
| --- | --- |
| 013* | Write Block |
| 012 | Write Two Words |
| 011 | Write One Word |
| 010 | Write One Word Partial |
| 031 | Maintenance Write One Word |
| 002 | Read Two Words |
| 003* | Read Block |
| 017* | Read Bank Status Register |
| 004* | Read System Status Register |
| 006 | Test And Set |
| 007 | Test And Clear |
| 034* | Read Dayclock Comparator |
| 005* | Read Dayclock |
| 014* | Load Dayclock |
| 015* | Load Dayclock Comparator |
| 024* | Set Dayclock Mode Normal |
| 025* | Set Dayclock Mode Fast |
| 026* | Set Dayclock Mode Slow |
| 020* | Selected Load Path 0 |
| 021* | Selected Load Path 1 |
| 033* | Maintenance Read Block |
| 032 | Maintenance Two Word Read |
| 023* | Reset Auto Recovery Timer |
| 022* | Initiate Auto Recovery |
| 016* | Load Error Function Register |

\* IP Functions Only

*Fig. 11*

| FIELD NAME | FIELD BIT LENGTH | PARITY BITS INPUT | PARITY BITS OUTPUT |
|---|---|---|---|
| FUNCTION CODE | 5 | 1 | |
| ADDRESS | 24 | 4 | |
| START | 6 | 1 | |
| END | 6 | 1 | |
| WRITE DATA | | | |
|   BYTE 0,1,2,3 | 9 EACH | 4* | |
|   BYTE 4,5,6,7 | 9 EACH | 4** | |
| READ DATA | | | |
|   BYTE 0,1,2,3 | 9 EACH | | 4* |
|   BYTE 4,5,6,7 | 9 EACH | | 4** |

\* = EVEN WORD
\*\* = ODD WORD

Fig. 12

| FUNCTION | TYPE |
|---|---|
| 00  0000 | READ FOUR WORDS |
| 00  0001* | WRITE WORD SPECIFIED BY |
| 00  1111 | MASTER BIT |
| 01  0001** | TEST AND SET SPECIFIED BY |
| 01  1000 | MASTER BIT |
| 10  0000 | MAINTENANCE READ (SEE SECTION 3.2.4) |
| 11  0001** | TEST AND CLEAR SPECIAL MASTER BIT |

\* ANY COMBINATION IS LEGAL.
\*\* ONLY ONE MAY BE SELECTED.

Fig. 13

| FIELD NAME | FIELD BIT LENGTH | PARITY BITS INPUT | PARITY BITS OUTPUT |
|---|---|---|---|
| Function Code | 6 | 1 | |
| Address | 22 | 3 | |
| Write Data | | | |
|   Byte 0,1,2,3 | 9* | 4 | |
|   Byte 4,5,6,7 | 9* | 4 | |
|   Byte 8,9,10,11 | 9* | 4 | |
|   Byte 12,13,14,15 | 9* | 4 | |
| Read Data | | | |
|   Byte 0,1,2,3 | 9* | | 4 |
|   Byte 4,5,6,7 | 9* | | 4 |
|   Byte 8,9,10,11 | 9* | | 4 |
|   Byte 12,13,14,15 | 9* | | 4 |

*9 Bits/Byte - 144 Bits/Interface Data Word

*Fig. 14*

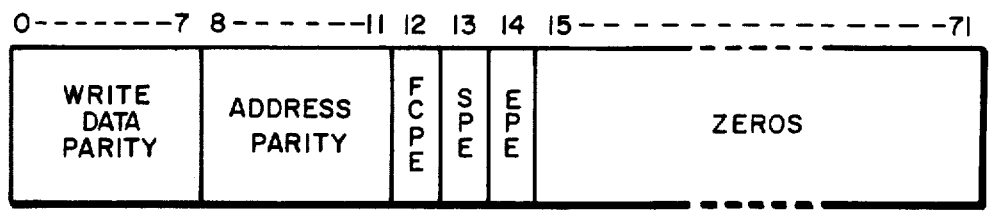
_Fig. 16a_
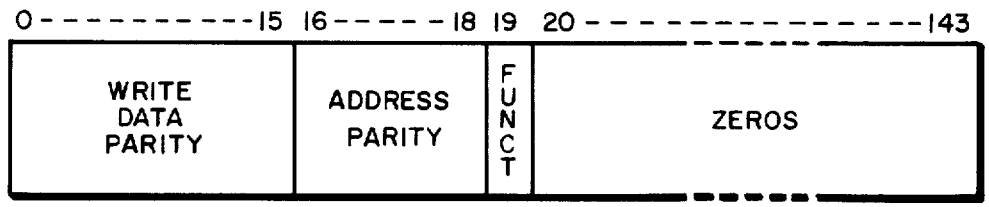
_Fig. 16b_
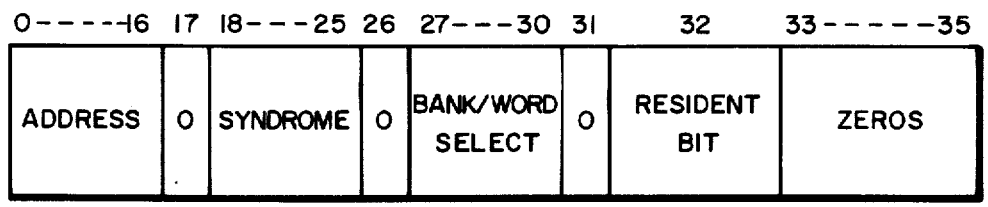
_Fig. 18_

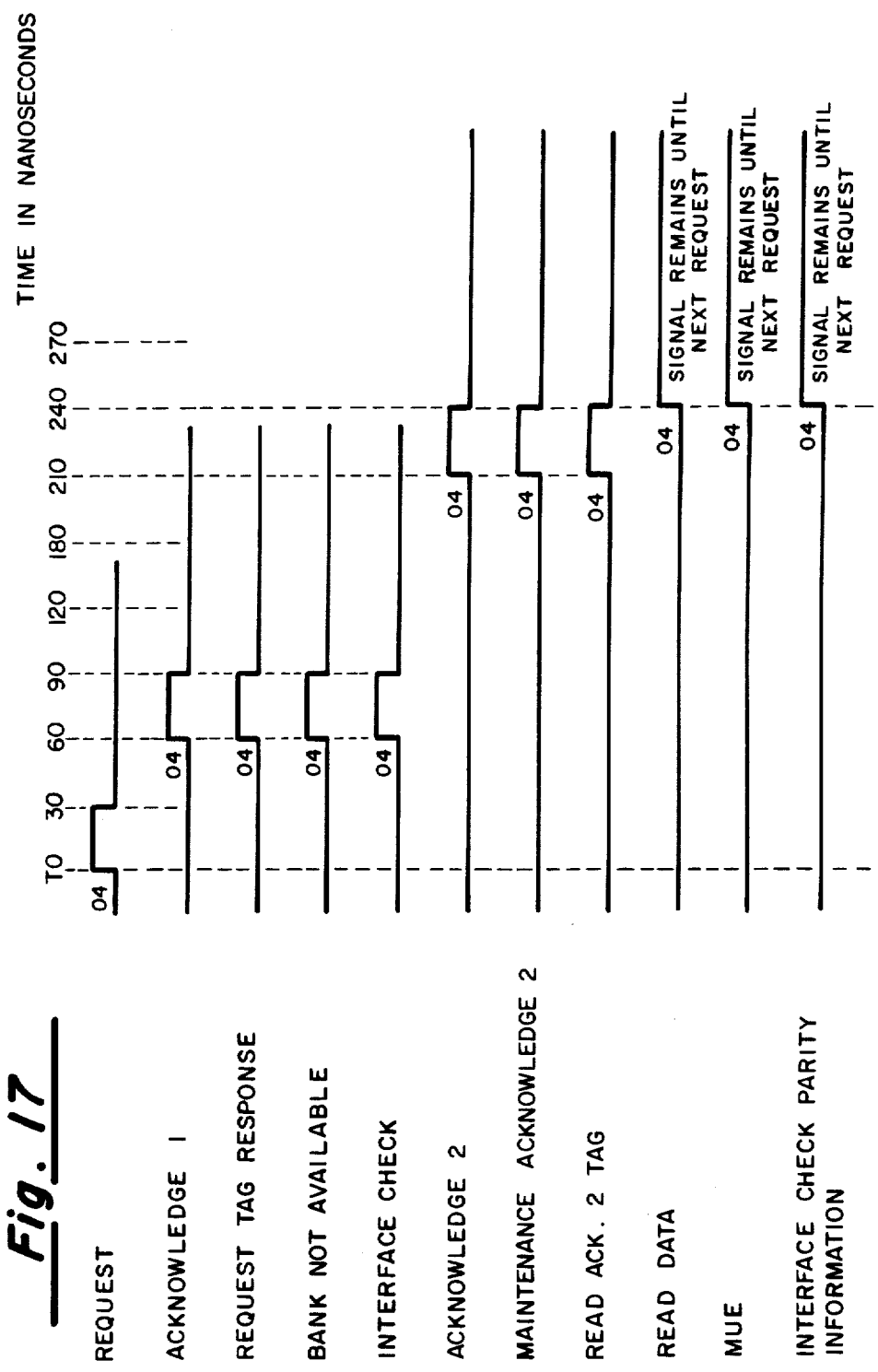

| ADDRESS BIT 23 | FUNCTION CODE (OCTAL) | START FIELD (DECIMAL) | END FIELD (DECIMAL) | REF. FIG. | DESCRIPTION |
|---|---|---|---|---|---|
| 0 | 11 | XX | XX | 23(B) | FULL WRITE OF EVEN ADDRESS (MSW) |
| 1 | 11 | XX | XX | 23(C) | FULL WRITE OF ODD ADDRESS (LSW) |
| 0 | 10 | 7 | 9 | 23(D) | PARTIAL WRITE IN EVEN WORD (MSW) |
| 1 | 10 | 0 | 8 | 23(E) | PARTIAL WRITE IN ODD WORD (LSW) |
| X | 12 | XX | XX | 23(F) | FULL WRITE OF DOUBLE WORD |

| APPLICATION STATUS | | | | | | | | | | | RESERVED FOR SOFTWARE | | | MSR | | | | RES | | MODE | |
|---|---|---|---|---|---|---|---|---|---|---|---|---|---|---|---|---|---|---|---|---|---|
| A P P 0 | A P P 1 | A P P 2 | A P P 3 | L O | C L I | F F O | F I P | D U | S C | C C | | | | LOAD PATH 0 0-5 | | | LOAD PATH 1 0-5 | O | I | AR | IL |
| | | | | | | | | | | | | | | | | | | R | R | R | R |
| 0 | 1 | 2 | 3 | 4 | 5 | 6 | 7 | 8 | 9 | 10 | 11 --- 55 | 56 --- 61 | 62 --- 67 | | | | 68 | 69 | 70 | 71 | |

Fig. 26a

| SPARE BITS | | P S 1 C 1 | P S 1 C 2 | S P A R E | — C C | S P A R E | SBE LOCK | SBE SELECTIVE ENABLE | | | S P A R E | INH CORR | INH MUE | ENABLE SBE | INJ PAR | LOCK CHECK BITS | PARITY ERROR SELECTOR | | | SPARE BITS |
|---|---|---|---|---|---|---|---|---|---|---|---|---|---|---|---|---|---|---|---|---|
| 0 --- 13 | | 14 | 15 | 16 | 17 | 18 | | 19 --- 21 | | | 22 | 23 | 24 | 25 | 26 | 27 | 28 --- 32 | | | 33 --- 35 |

| ERROR FUNCTION REGISTER BIT | | | STARTING ADDRESS | ENDING ADDRESS |
|---|---|---|---|---|
| 19 | 20 | 21 | | |
| 1 | 1 | 1 | 917504 | 1048575 |
| 1 | 1 | 0 | 786432 | 917503 |
| 1 | 0 | 1 | 655360 | 786431 |
| 1 | 0 | 0 | 524288 | 655359 |
| 0 | 1 | 1 | 393216 | 524287 |
| 0 | 1 | 0 | 262144 | 393215 |
| 0 | 0 | 1 | 131072 | 262143 |
| 0 | 0 | 0 | 0 | 131071 |

*Fig. 26b*

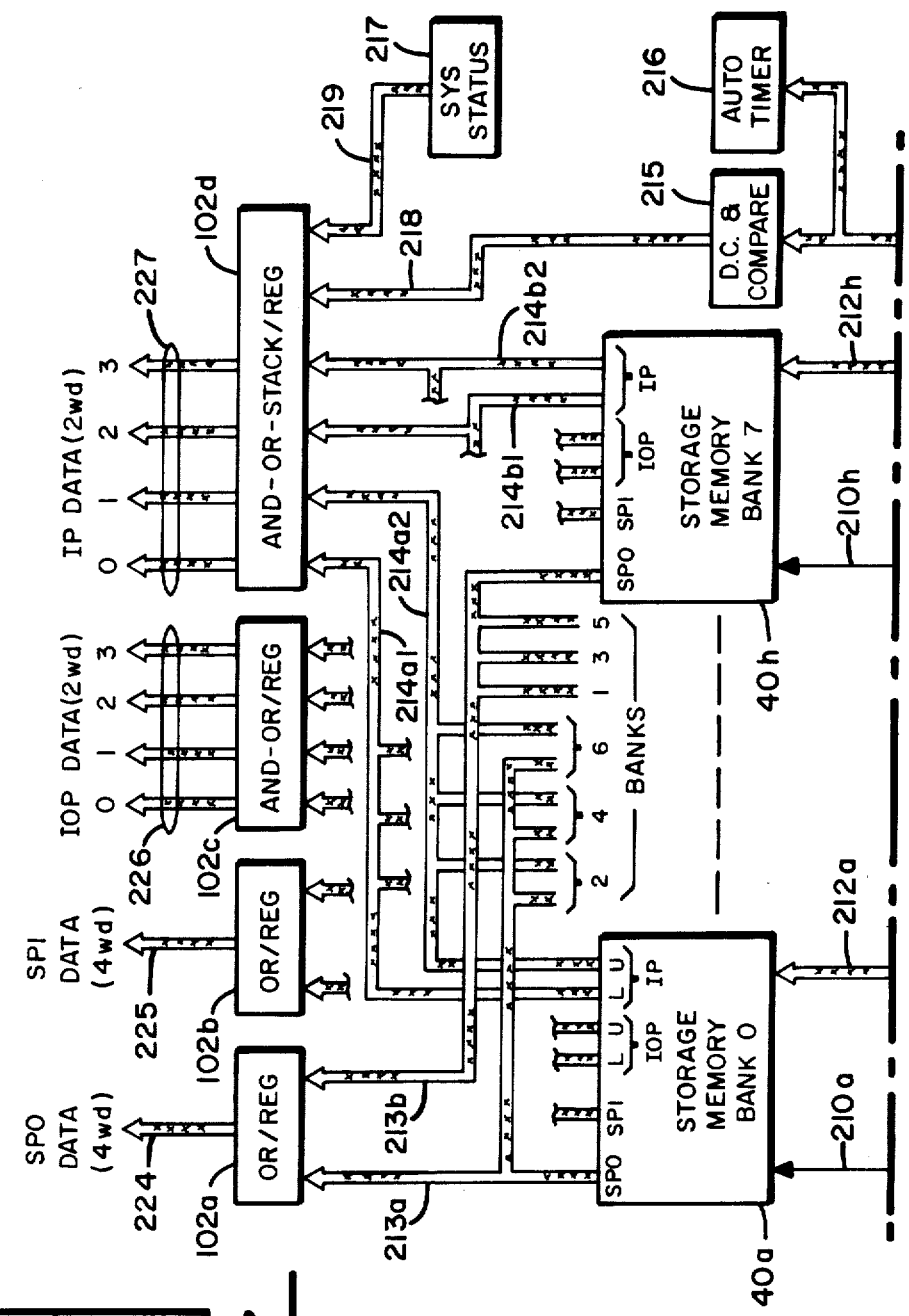

BITS FOR FOUR BANK INTERLEAVE (REFERENCE FIG. 15A)

| | Bk 0 | | | | Bk 1 | | | | Bk 2 | | | | Bk 3 | | | | Bk 4 | | | | Bk 5 | | | | Bk 6 | | | | Bk 7 | | | |
|---|---|---|---|---|---|---|---|---|---|---|---|---|---|---|---|---|---|---|---|---|---|---|---|---|---|---|---|---|---|---|---|---|
| WD | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 2  | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 20 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 21 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 |
| 22 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 23 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

BITS FOR EIGHT BANK INTERLEAVE (REFERENCE FIG. 15B)

| | Bk 0 | | | | Bk 1 | | | | Bk 2 | | | | Bk 3 | | | | Bk 4 | | | | Bk 5 | | | | Bk 6 | | | | Bk 7 | | | |
|---|---|---|---|---|---|---|---|---|---|---|---|---|---|---|---|---|---|---|---|---|---|---|---|---|---|---|---|---|---|---|---|---|
| WD | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 19 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 20 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 21 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 |
| 22 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 23 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

*Fig. 28a*

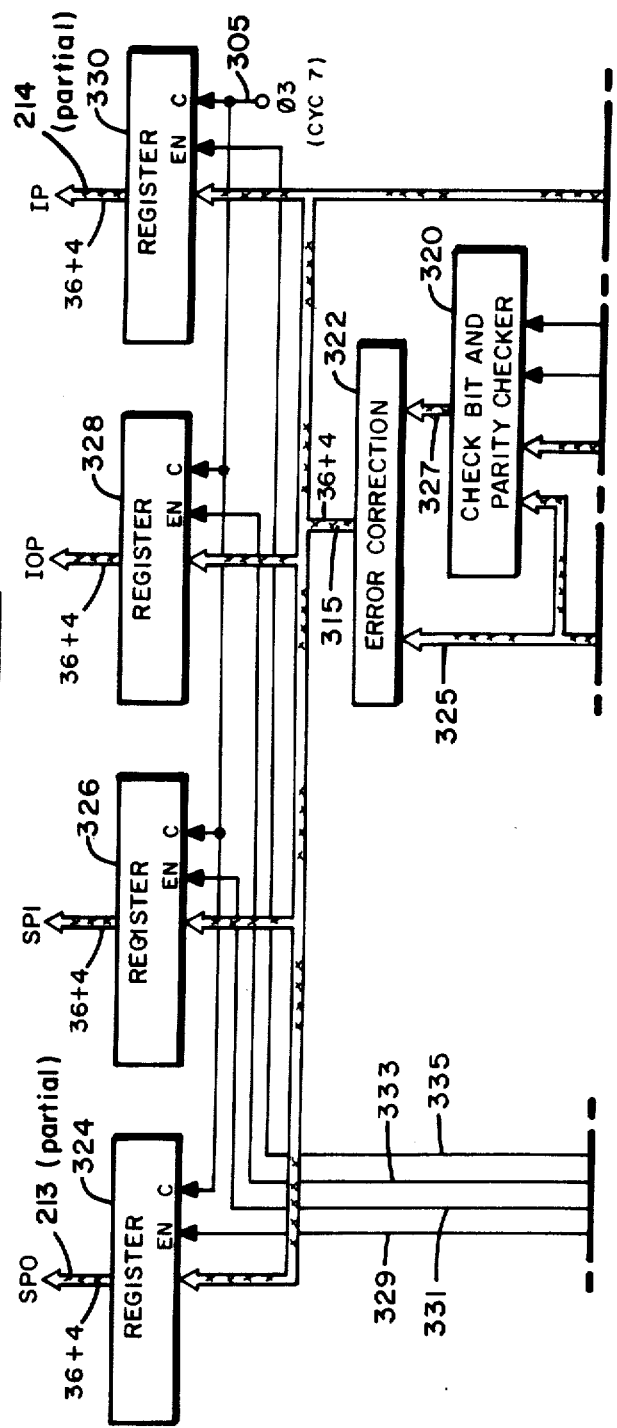

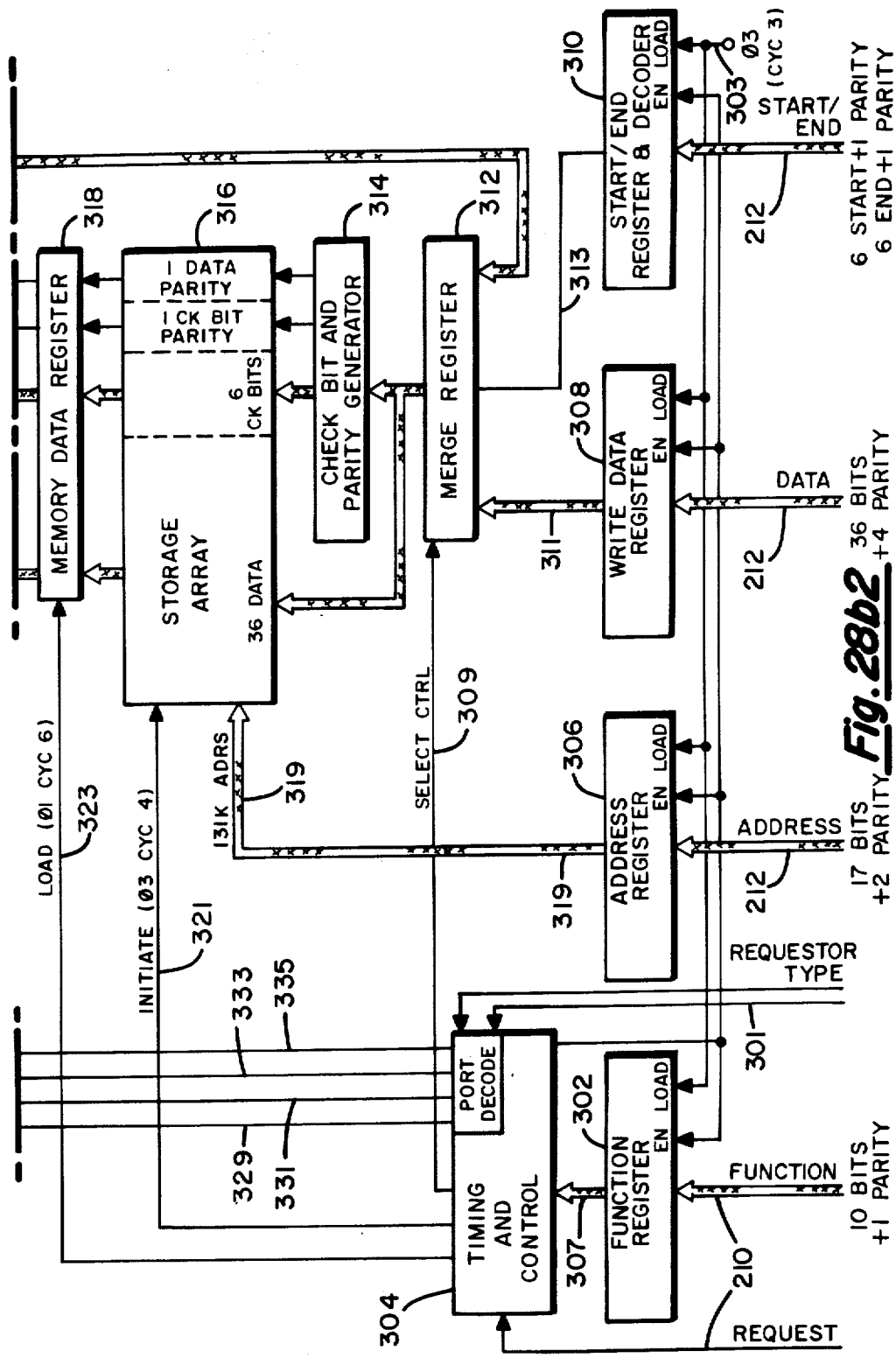
Fig. 28b2

HIGH PERFORMANCE STORAGE UNIT

CONTENTS

RELATED PATENT APPLICATIONS
CONTENTS
BACKGROUND OF THE INVENTION
  A. Field of the Invention
  B. State of the Prior Art
    1. Environment of the Invention
    2. Description of the Prior Art
OBJECTS
  A. General Objects
  B. Specific Objects
SUMMARY OF THE INVENTION
  A. General Function of the High Performance Storage Unit
  B. Response to Requestors of Differing Interface Cycle Times
  C. Response to Requestors of Differing Interface Bit Widths
BRIEF DESCRIPTION OF THE DRAWINGS
DESCRIPTION OF THE PREFERRED EMBODIMENT
  A. Conventions
  B. The System Within Which the HPSU Resides
  C. General High Performance Storage Unit Function Within the System
  D. General Multiple Unit Adapter Function Within the System
  E. General Scientific Processor Function Within the System
  F. HPSU Interfaces Definition and Timing
    1. IOP AND IP
    1.1 Control Signals
    1.2 Request
    1.3 Acknowledge 1
    1.4 Interface Check
    1.5 Acknowledge 2
    2. SCIENTIFIC PROCESSOR (SP)
    2.1 Control Signals
    2.2 Request
    2.3 Request Tag
    2.4 Acknowledge 1
    2.5 Request Tag Response
    2.6 Acknowledge 2
    2.7 Read Acknowledge 2 Tag
    2.8 Maintenance Acknowledge 2
    2.9 Interface check
    3. INPUT LINES
    3.1 IP and IOP
    3.1.1 Address
    3.1.2 Write Data
    3.1.3 Start
    3.1.4 End
    3.1.5 Function Code
    3.1.6 Bank Lock
    3.1.7 Input Parity
    3.2 SP Input Lines
    3.2.1 Address
    3.2.2 Write Data
    3.2.3 Function Code
    3.2.4 Input Parity
    4. OUTPUT LINES TO IP AND IOP
    4.1 Read Data
    4.2 Output Parity
    5. OUTPUT LINES TO SP
    5.1 Read Data
    5.2 Output Parity
    6. ADDRESS TRANSLATION
    7. ERROR SIGNALS
    7.1 Interface Check (INTEC CHK)
    7.2 Internal Check (INTL CHK)
    7.3 Internal Partial Write Check
    7.4 Multiple Uncorrectable Error
    7.4.1 Multiple Uncorrectable Error to IOP/IP
    7.4.2 Multiple Uncorrectable Error to SP
    7.5 Bank Not Available
    7.6 Status Check Interrupt
    7.7 Status Check Acknowledge
    7.8 Dayclock Interrupt
    7.9 Dayclock Interrupt Acknowledge
    8. INITIAL PROGRAM LOAD SIGNALS
    8.1 Initial Program Load 0-1
    8.2 Initial Program Load Complete
    8.3 Reset Clear
    9. BANK INTERLEAVE
    9.1 IOP/IP REQUESTER BANK INTERLEAVE
    9.2 SP Requester Bank Interleave
    10. UNIT AVAILABLE LINES
    10.1. HPSU Available
    10.2. Requestor Available
    10.3. Delete Unit Available
  G. HPSU FUNCTIONAL CHARACTERISTICS
    1. PERFORMANCE
    2. DATA RATES
    3. MODES OF OPERATION
    3.1 IOP/IP Functions
    3.1.1 Write One Word Partial ($10_8$)
    3.1.2 Write One Word ($11_8$)
    3.1.3 Write Two Words ($12_8$)
    3.1.4 Write Block ($13_8$)
    3.1.5 Read Functions
    3.1.5.1 Read Two Words ($02_8$)
    3.1.5.2 Read Block ($03_8$)
    3.1.6 Status Functions
    3.1.6.1 Read System status Register ($04_8$)
    3.1.6.2 Read Bank Status Register ($17_8$)
    3.1.7 Dayclock Functions-IP only
    3.1.7.1 Read dayclock ($05_8$)
    3.1.7.2 Load Dayclock ($14_8$)
    3.1.7.3 Load Dayclock Comparator ($15_8$)
    3.1.7.4 Select Dayclock Rates
    3.1.7.4.1 Set dayclock Mode Normal ($24_8$)
    3.1.7.4.2 Set Dayclock Mode Fast ($25_8$)
    3.1.7.4.3 Set Dayclock Mode Slow ($26_8$)
    3.1.7.4.4 Read Dayclock Comparator ($34_8$)
    3.1.8 Auto Recovery Timer
    3.1.8.1 Select Load Path 0 (SLP 0) ($20_8$)
    3.1.8.2 Select Load Path 1 (SLP 1) ($21_8$)
    3.1.8.3 Initiate Auto Recovery (IAR) ($22_8$)
    3.1.8.4 Reset Auto Recovery Timer (RAT) ($23_8$)
    3.1.9 Test and set Functions
    3.1.9.1 Test and Set ($06_8$)
    3.1.9.2 Test and Clear ($07_8$)
    3.1.10 Maintenance and Diagnostic Functions
    3.1.10.1 Load Error Function Register ($16_8$)
    3.1.10.2 Maintenance Write One word ($31_8$)
    3.1.10.3 Maintenance Read block ($33_8$)
    3.1.10.4 Maintenance Two Word Read ($32_8$)
    3.2 SP Functions
    3.2.1 Read Four Words (OO-OOOO)
    3.2.2 write 1-4 Word (OO-XXXX)
    3.2.3 Test and Set (01-XXXX)

3.2.4 Maintenance Read (10-0000)
3.2.5 Test and Clear (11-XXXX)
H. HPSU BLOCK DIAGRAM
I. TIMING OF THE HPSU IN SUPPORT OF RESPONSE TO REQUESTORS OF DIFFERING CLOCK RATES
J. DATA PATHS OF THE HPSU IN SUPPORT OF RESPONSE TO REQUESTORS OF DIFFERING INTERFACE BIT WIDTHS

RELATED PATENT APPLICATIONS

The following co-pending patent applications are assigned to the assignee of this invention, and their teachings are incorporated herein by reference:

Title: MULTIPLE OUTPUT PORT MEMORY STORAGE MODULE
Inventor: James H. Scheuneman and Gary D. Burns
Ser. No.: 596,214
Filed: Apr. 2, 1984

Title: READ ERROR THROUGH-CHECKING SYSTEM
Inventor: James H. Scheuneman
Ser. No.: 354,340
Filed: Mar. 2, 1982

Title: READ ERROR OCCURRENCE DETECTOR FOR ERROR CHECKING AND CORRECTING SYSTEMS
Inventors: Gary D. Burns and Scott D. Schaber
Ser. No.: 464,184
Filed: Feb. 1, 1983

Title: MULTIPLE UNIT ADAPTER
Inventor: James H. Scheuneman
Ser. No.: 596,205
Filed: Apr. 2, 1984

Title: A PRIORITY REQUESTER ACCELERATOR
Inventors: John R. Trost and Daniel Zenk
Ser. No.: 530,285
Filed: Aug. 31, 1983

Title: PARTIAL DUPLEX OF PIPELINED STACK WITH DATA INTEGRITY CHECKING
Inventor: James H. Scheuneman, et al.
Ser. No.: 595,864
Filed: Apr. 2, 1984

Title: PIPELINED DATA STACK WITH ACCESS THROUGH-CHECKING
Inventor: James H. Scheuneman
Ser. No.: 596,131
Filed: Apr. 2, 1984

Title: MULTIPLE PORT MEMORY WITH PORT DECODE ERROR DETECTOR
Inventor: James H. Scheuneman
Ser. No.: 596,132
Filed: Apr. 2, 1984

Title: HIGH PERFORMANCE PIPELINED STACK WITH OVER-WRITE PROTECTION
Inventor: Wayne A. Michaelson
Ser. No.: 596,203
Filed: Apr. 2, 1984

Title: AN IMPROVED ACCESS LOCK APPARATUS FOR USE WITH A HIGH PERFORMANCE STORAGE UNIT OF A DIGITAL DATA PROCESSING SYSTEM
Inventors: Daniel K. Zenk and John R. Trost
Ser. No.: 596,202
Filed: Apr. 2, 1984

Title: MULTILEVEL PRIORITY SYSTEM
Inventors: James H. Scheuneman and W. A. Michaelson
Ser. No.: 596,206
Filed: Apr. 2, 1984

Title: PIPELINED SPLIT STACK WITH HIGH PERFORMANCE INTERLEAVED DECODE
Inventors: James H. Scheuneman and W. A. Michaelson
Ser. No.: 596,215
Filed: Apr. 2, 1984

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved High Performance Storage Unit (HPSU) memory resource for use in such a digital data processing system. Still more particularly it relates to an improvement according that such HPSU should be synchronously communicative with requestors, such host data processors and such scienrific processors, which are not of uniform interface cycle times, and furthermore that such HPSU should be synchronously communicative at non-uniform bit-widths of data transfer to such requestors.

B. State of the Prior Art

1. Environment of the Invention

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an overall control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input-/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scienific data processing system is considered to overcome the data transfer bottleneck by providing an unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

2. Description of the Prior Art

Digital memories which communicate asynchronously or synchronously with requestors which have differing probabilities and prevalences of making repetitive requests separated by various time intervals are known in the prior art. The time or times of occurrence(s) of individual requests from requestors, or the latency time or times of the communication of data read responsively to such requests are not the subject of the present invention. The present invention synchronously communicates with plural types of requestors which plural requestor types do communicate at synchronous interface communication cycle times which are nonuniform, meaning different. The frequency that any one(s) of such requestors should make synchronous request of the present invention, and the latency(ies) thereafter such request that data read responsively thereto should be synchrnously communicated to such any one(s) of such requestors has nothing to do with the interface communication cycle times of each such information interchange of the request(s) and of the data read responsively to such request(s).

Digital memories which receive to be written, or which transmit as read, a data quantity which is but partial of the maximally exercisable bit-width of the interface communication channel(s) thereto such digital memories may be known in the prior art. The present invention is not concerned with data transfers occurring over but partial of the bit-width of a communication channel (although the present invention conventionally supports that but partial of the entire information, i.e., a quarter word or a half word, transmitted upon a communication channel should be used, as in a partial word write). The present invention is concerned with separate parallel communication channels, or interfaces, to a common shared digital computer memory resource, which separate interfaces do always have separate and unequal bit-widths of parallel data transfer thereupon. Certain prior art digital systems may employ a memory "A" of interface communication bit width "A$^1$", and additionally a memory "B" of interface communication (even to the selfsome requestors) bit-width "B$^1$". But the present invention is one single shared memory resource accessable on a priority basis by a multiplicity of requestors of a plurality of types which memory resource does communicate to some of said requestors at an interface communication bit-width of "A$^1$" and to others of said requestors at an interface communication bit-width of "B$^1$".

OBJECTS

A. General Objects

It is the general object of the present invention that a digital memory resource should be capable of simultaneously rendering high bandpass performance to one or more array, or vector, processor requestors communicating with such memory resource while also serving, in a manner substantially non-conflicting with the high performance to one or more array processors, certain additional requestors of the scalar instruction processor and input/output processor types. The present invention of a High Performance Unit (HPSU) exhibits a 4.8 gigabits/second bandpass simultaneously to each of two scientific processors, or SP's, simultaneously with a 600 megabits/second bandpass to up to four Input/Output Processors, or IOP's, collectively, simultaneous with a 1.2 gigabits/second bandpass to up to four collective Instruction Processors, or IP's. The net total read/write performance bandpass of the HPSU is 11.4 gigabits/second.

B. Specific Objects

It is a first specific object of the present invention of a High Performance Storage Unit HPSU in obtaining the general object of high performance to different types of requestors, and to plural ones of each requestor type, that the communication to requestors of different types should be synchronous at different interface cycle times. Specifically, the HPSU will concurrently communicate to each of two SP type requestors at an interface cycle time, or period within which one interchange of data plus addressing plus function plus miscellaneous control information can be repeatedly effectuated, of 30 nanoseconds. Meanwhile, the HPSO will communicate with the collective IOP requestors concurrently to communication with the collective IP requestors each at an interface cycle time of 60 nanoseconds. It is a subsidiary object to such first object that the internal processes of the memory, such as the timed initiation of the read/write cycle of the storage memory banks and the timed recovery of the read data later resultant from such initiation, should not be inflexibly fixed relative to one (nominally the slower) interface cycle time thereby inefficiently creating wasted, or dead, operational time when such internal processes of the memory can instead be more efficiently rapidly fixedly timed relative to the other (nominally the faster) interface cycle time. The operational consequence of the realization of this subsidiary object while meeting the first specific object is that the HPSU internal processes are fixedly timed to run just as fast as is electronically possible by running fixedly timed relative to the faster interface cycle time but, resultantly, do deliver read data results of such fast running at times which are not fixed, but are variable, relative to the slower interface cycle time. This operational consequence is solved by resynchronization: the read data results delivered at variable times which need be synchronously communicated to requestors operating at the slower interface cycle time will resynchronized with the interface cycle time of such requestors, and then communicated to such requestors. Meanwhile to such resynchronization, the remaining HPSO internal processes, including most particularly the read/write cycles of the storage memory banks, are running (fixedly timed relative to the faster interface cycle time) just as fast as is electronically possible. In simplified terms, the HPSO does not sacrifice internal efficiencies and speeds of performance merely to realize the first object of simultaneous communication to requestor types which differ in communications interface cycle time.

It is a second specific object of the present invention of a HPSU that communication interfaces to the various types of requestors communicating with such HPSU will be supported which requestor type communication interfaces differ in the number of data bits which are communicated upon each and every interface cycle time thereof such requestor type. Specifically, the HPSO will communicate to each of two SP requestors (each of which does synchronously communicate at a 30 nanosecond interface cycle time) invariably at a width of 144 data bits plus 16 accompanying parity bits (called 4 words). Meanwhile and simultaneously, the HPSU will communicate to each and any of four IOP requestors (collective ones of which do communicate of a 60 nanosecond interface cycle time) and to each an any of four IP requestors (collective ones of which do communicate at a 60 nanosecond interface cycle time) invariably at a width of 72 data bits plus 8 accompanying parity bits (called 2 words). Obviously, data transfer rate times data transfer bit-width is not constant—indeed, the faster 30 nanosecond interface has the greater bit-width of data transfer. It is a subsidiary object to such second specific object that the reading and writing of the full interface bit-width (four words on the SP interfaces or two words on each of the IOP or IP interfaces), or the writing of two words, or the writing of one word, or the writing of a partial word should not be precluded to either or any interface simply because an interface of another bit-width happens to exist. In other words, each interface is a fully capable interface allowing all those read and write operations normally expected across a memory interface. This is true even though the HPSU of the present invention supports interfaces which are not equal, but are different, in the bit-width thereof such interfaces.

SUMMARY OF THE INVENTION

A. General Function of the High Performance Storage Unit

The digital data processing system within which the present invention resides includes one or more host processors each coupled to one or more high performance storage units, or memory resources. Host processors can be selected from units available commercially, where the 1100/90 System available from Sperry Corporation is found to be particularly advantageous.

The High Performance Storage Unit (HPSU) of the present invention is unique, being basically a memory unit capable of coupling to various pluralities of instruction processors, and input/output units as well as to a pair of Scientific Processor (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor through the use of a single Scientific Processor port to a plurality of up to four HPSUs via four HPSU ports. In this manner a Scientific Processors may address, read and write any location in any of the HPSUs.

The MUA is used in a scientific data processing system to interface at least one scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide overall increased performance for scientific vector FORTRAN programs.

The present invention of a High Performance Storage Unit (HPSU) is a digital memory resource for addressably storing digital data, and for reading and writing such digital data to and from a number of requestors thereof such digital memory resource which are of a number of requestor types. Many characteristics of the HPSU show it to be, at the time of this diclosure, a very large and fast digital memory resource. The HPSU stores 4, 194, 304 error-corrected 36-bit data words in 8 independently and simultaneously operative storage memory banks, the 90 nanosecond read/write cycle time of which storage memory banks within which each can write 4 complete data words providing of a total bandpass of 12.8 gigabits/second for the data stores. Any suitably pipelined memory resource with sufficiently wide simultaneously operative storage memory banks can obtain this level of bandpass for the total memory stores. The major difficulty in memory resource design is efficiently and effectively coupling this large bandpass of the memory stores to the bandpass registered by the overall memory resource to the cumulative requestor-users of such resource. The greater number of requestor-users of such memory resource, and the greater number of types and diversity of interface characteristics thereof such requestor-users, the greater the difficulty in the delivery of the potential bandpass of the memory stores to the requestor-users of the overall memory resource containing such memory stores. The present invention deals with two aspects of the efficient and effective support of communication response to a number of requestor-users of a number of types differing specifically in the interface cycle time of synchronous communication, and also in the bit-width of the interface. Additional ones of the previously referenced co-pending patent applications also deal with inventions supporting the efficient and effective support of a number of requestor-users of diverse types. The combinatorial effect of all such inventions is that 10 requestor-users of a first major type and of a second major type consisting of two sub-types are supported by the HPSU at a net aggregate data transfer capability to aggregate such requestor-users of 11.4 gigabits/second.

B. Response to Requestors of Differing Interface Cycle Times

The present invention of a High Performance Storage Unit (HPSU) supports of the synchronous communication to requestors of, and at, two different interface cycle times. Specifically, the present invention communicates to one type of requestor, called a Scientific Processor or SP, at a first interface communication cycle time (during each which 36-bit datawords may be transferred). The present invention also supports synchronous communication with requestors at and of a second interface cycle time, requestors identified either as instruction processors or IP's or as input output processors or IOP's, which second interface cycle time is 60 nanoseconds (during each which interface communication cycle two 36-bit data words may be transferred).

Any HPSU internal function commonly exercised by the requestors of two different interface cycle times, such as the internal read/write cycle time of the storage memory bank is, and can be by definition, in fixed time relationship to one only of the two different interface cycle times. The HPSU internal functions are timed by a clock relational to its fastest interface, ergo a four-phase 30 nanosecond clock. (Conversely, it could be said that a 30 nanosecond interface cycle time can exist only because there is an HPSU clock to support such.) Consider, for example, the read/write function of the storage memory banks relative to the four-phase 30 nanosecond clock. This interval read/write function, and the read/write cycle time, of the storage memory banks are always exercised at fixed times (fixed clock phases) relative to the four-phase 30 nanosecond clock cycle, ergo at fixed times relative to the 30 nanosecond interface cycle time.

Now consider the interaction of a second, 60 nanosecond cycle time, communication interface with the functions, such as the internal read/write cycle time of the storage memory banks, of the HPSU exercised of fixed times (phases) relative to the 30 nanosecond clock cycle. It is obvious that HPSU internal functions, such as the read/write cycle time of the storage memory banks, if uniformly initiated relative to the faster, 30 nanosecond clock cycle will not always occur at the same time, meaning clock phase, relative to the 60 nanosecond interface communication cycle time. Now there is no appreciable problem to synchonizing a request occurring (from an IP or an IOP) upon the slower, 60 nanosecond interface cycle time, communications interface with the faster 30 nanosecond pipelined cycle time of the storage memory banks. But there is a problem in resynchronizing the data read of such storage memory banks with such a slower, 60 nanosecond interface cycle time, communications interface. This resynchronization is the essence of the present invention allowing response to requestors of differing interface cycle times.

It is notable that resynchronization would not be required by lengthening the read/write cycle time of the storage memory modules to be an integral multiple of both the different interface communication cycle times. But, the present invention rejects any implementation wherein the storage memory banks should be requested only at such interval, greater than the read/write cycle time of such storage memory resource, which is an integral multiple of the cycle times of all interfaces to the HPSU. Such a rejected approach would, in the appartus of the present invention, mean that the storage memory resource therein should incur a read/write cycle only each 120 nanoseconds, thereby wasting one-third of the potential of such storage memory resource when, as is the case, the actually attainable electronic cycle time of such storage memory resource is 90 nanoseconds. Instead, the present invention utilizes a method and an implementing apparatus of such method whereby the storage memory resource is operated at its minimum read/write cycle time (90 nanoseconds) while plural synchronous requestor interfaces should also be operated at respective interface cycle times which are different (e.g., 30 nanoseconds and 60 nanoseconds), and also wherein at least one of such different interface cycle times may not be an integral fraction or multiple of such read/write cycle time (e.g., 60 nanoseconds is not an integral fraction of 90 nanoseconds).

C. Response to Requestors of Differing Interface Bit-Widths

The HPSU of the present invention communicates with one class of requestor, the SP's, by transferring four words, or 144 data bits plus 16 associated parity bits (4 words), upon each SP interface communication cycle time of 30 nanoseconds. The HPSU communicates with another class of requestors, the IOP's and IP's, by transferring two words, or 72 data bits plus 8 associated parity bits (2 words), to the IOP's collectively, or to the IP's cllectively upon each IOP or IP interface communication cycle time of 60 nanoseconds.

In order to so respond to requestors of different types writing at respectively different interface bit widths the HPSU must be able to position the two words received upon the 72-data-bit interface to the proper upper pair or lower pair positions of each 4-word-wide addressable boundary in memory stores. But this turns out to be trivial: the received two words are positioned to both the upper pair and lower pair positions and interpretation of the addressing causes the proper two, or even one, of the four words upon each 4-word-wide addressable boundary to be independently written. The organization of each four-word-wide storage memory bank into four parallel independently controllable one-word-wide storage memory modules supports of this procedure.

In order to so respond to requestors of different types reading at respectively different interface bit widths the HPSU must be able to position the upper pair or the lower pair of words as are read in parallel at a 4-word-wide addressable boundary upon one read cycle of a storage memory bank to be selectively output to a requestor reading upon the two-word, 72-data-bit, wide interface. This also is accomplished in consideration of the addressing information, but the exact place within the HPSU wherein such upper pair/lower selection transpires is of interest. The selection is performed by the gating of a wired-OR communication bus which is split into upper two word and lower two word halves into an output register.

BRIEF DESCRIPTION OF THE DRAWINGS

FIG. 5a shows the format of the write and read data interfaces between the HPSU and the IP or IOP requestors.

FIG. 5b shows the format of the read and write data interface between the HPSU and the SP requester.

FIG. 6 shows the HPSU to requestor interface signals, including the number thereof and direction of transmission.

FIG. 9 shows the detailed timing of the HPSU interface directly at the physical plug connector of such interface.

FIG. 11 shows a table of the function codes exercised by the IP or by both the IP and IOP requestors upon the HPSU.

FIG. 12 shows a table of the parity bits as are attached to the various fields of the HPSU interface to the IP or IOP requestors.

FIG. 13 shows a table of the function codes exercised by the SP requestor upon the HPSU.

FIG. 14 shows a table of the parity bits attached to various fields in the HPSU communication with the SP requestor.

FIG. 16a shows the format of the error word, communicated upon the read interface lines, resultant from an error upon the HPSU interface to the IP or IOP requestors.

FIG. 16b shows the format of an error word, transmitted upon the read interface lines, resultant from an error upon the HPSU to SP interface.

FIG. 17 shows the timing of the HPSU to SP interface at the location of the HPSU.

FIG. 18 shows the format of the bank status register within the HPSU for the recording of single bit errors.

FIG. 23a shows the utilization of address bit 23, the function field, the start field, and the end field, in the definition of 1-word and 2-word write operations by the IP and IOP requestors to the HPSU, with further reference to the illustration of such write operations within FIG. 23b through FIG. 23f.

FIG. 24 shows the format of the system status register within the HPSU.

FIG. 26a shows the format of the error function register within the HPSU.

FIG. 26b shows the interpretation of the single bit error field, bit 19 through 21, of the error function register within the HPSU.

FIG. 28a shows the utilization of bits 2, 20, 21 22, and 23 of the address words previously shown in FIG. 15 in selecting amongst the eight memory banks, and amongst the four storage modules each containing one word within each such banks, within the HPSU.

FIG. 28b, consisting of FIG. 28b1 and FIG. 28b2, shows a block diagram of the multiple output port storage module of which there are four such within each of the eight memory banks of the HPSU.

FIG. 29c shows the detailed signal interconnection to the IP, IOP OUTPUT SEQUENCERS 300a,b previously seen in FIG. 29a.

DESCRIPTION OF THE PREFERRED EMBODIMENT

A. Conventions

Figure 1:
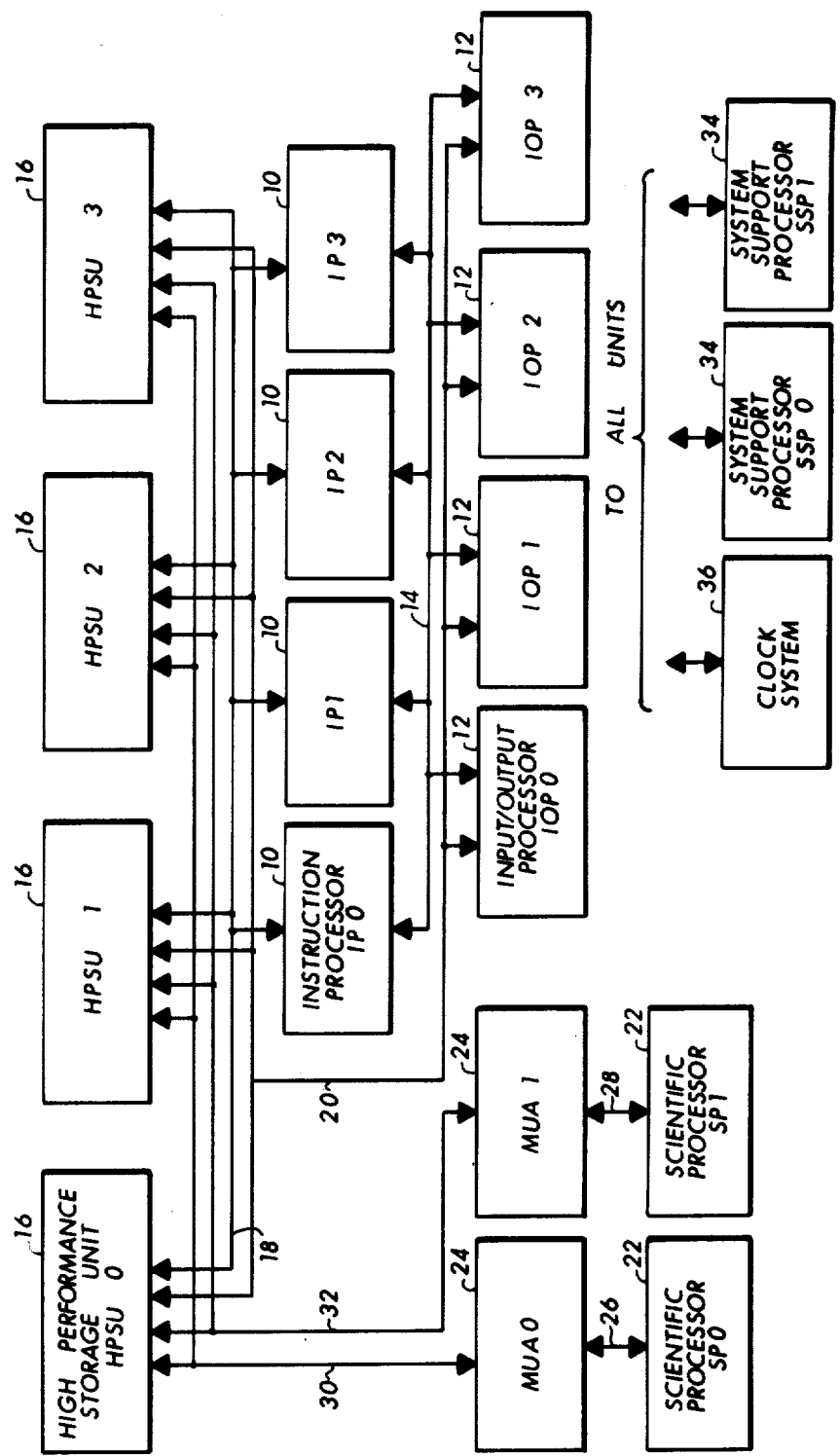
FIG. 1 shows a system block diagram of the over-all digital data processing system in which the invention can be utilized.

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of an High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking, the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

Concerning certain further conventions in nomenclature, when referring to address range or to storage size, the multipliers K and M are equal to 1024 and $1024^2$ respectively in this document. Therefore, 65,536 and 16,777,216 are indicated as 64K and 16M respectively.

It will later be seen that the High Performance Storage Unit (HPSU) of the present invention communicates with requestors of multiple types across data transfer interfaces, or ports, which are not of uniform bit widths. In the measurement of such bit widths, a "word" is defined as 36 data bits. Nominally, 4 parity bits will accompany each such word. Therefore it should be considered that the "word" plus accompanying parity bits will, in aggregate equal 40 bits. Such a "word", actually an externally communicated data quantity, is to be distinguished from those internal "storage data words" of the present invention which are pertinent to the preferred mode of storing a "word" within the memory stores of the HPSU. Such "storage data words" are also defined to be 36 bits in width, the same 36 bits as are elsewhere called a "word". A "storage data word" will be accompanied, however, by 8 bits of a combination error correction and parity code similarily to the teaching of U.S. Pat. No. 4,345,328 for ECC Check-Bit Generation Using Through-Checking Parity Bits to G. D. White. Therefore it should be considered that the "storage data word" plus an accompanying combination error correction and parity code will, in aggregate, equal 44 bits. The pertinent concept is that when a "word", or a "storage data word" is mentioned then such always contains 36 bits of data but may also be accompanied by additional error syndrome bits within different areas of the present invention of a High Performance storage Unit ( such as the interface and the memory stores of the HPSU), which aggregate bits do establish the bit-widths of various flow paths within the machine. For example, in that continuing discussion of conventions proceeding in the immediately next following paragraph, the reader will recognize that the "pair of 36-bit words" therein discussed could actually occupy a bit-width of $2 \times 40$ at the interface to the HPSU, or a bit-width of $2 \times 44$ within the memory stores of the HPSU. Similarly, when a "72-bits" interface is being talked about, the reader will recognize that the "72-bits" are of two 36-bit words of data, which will normally occupy a bit-width of $2 \times 40$ bits at the interface to the HPSU.

It will additionally be later seen that the HPSU communicates with requestor types which are nominally identified as Instruction Processor (IP's), Input/Output Processors (IOP's), and Scientific Processors (SP's). An IP/IOP storage data word consists of an even and odd address pair of 36-bit words with the even address being smaller than the odd address. The even address is the most significant word (MSW). The interface is 72-bits wide where bit 0 (MSB) and bit 36 correspond to storage bit 0 of the even and odd word respectively. An SP storage data word consists of four consecutively addressed 36-bit words on four word boundaries. The interface is 144 bits wide.

The HPSU stores and reads words as received. Odd and even words cannot be swapped at the HPSU level.

In fields where bit position represents significance, the MSB is drawn as the leftmost bit and is numbered as the lowest number in the field.

B. The System within which the HPSU Resides

FIG. 1 is a system block diagram of the overall digital data processing system in which the invention can be utilized. The overall system is essentially modular, and provides for parallel processing.

For the configuration illustrated, from one to four Instruction Processors IP0 through IP3, each labelled 10, can be utilized. Each IP can, for example, be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K storage data words. Each HPSU provides four Instruction Processor (IP) ports for providing communication paths to the IPs, both for reading and writing, shown collectively as interconnection paths 18. Again it should be understood that inter-connection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and is accompanied by four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above-identified copending incorporated patent applications.

Error Correction Code (ECC) is used internal to each HPSU to provide single-bit error correction and double-bit error detection.

In the embodiment illustrated one or two Scientific Processors SP0 and SP1, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP functions under direction of one or more of the IPs to perform scientific type calculations in a support mode. In this regard, the IPs can be considered to be host processors and the SPs can be considered to be support processors, all operating through common storage.

The overall system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as will as each HPSU, each IOP, and each SP. The clock interface includes signals and commands from the IP for controlling clock rates, clock mode, cycle count, and other capabilities of the clock.

Intercommunication between units is essentially on a Request and Acknowledge basis, and the interfaces will be described in more detail as appropriate.

C. General High Performance Storage Unit Function within the System

Figure 2:
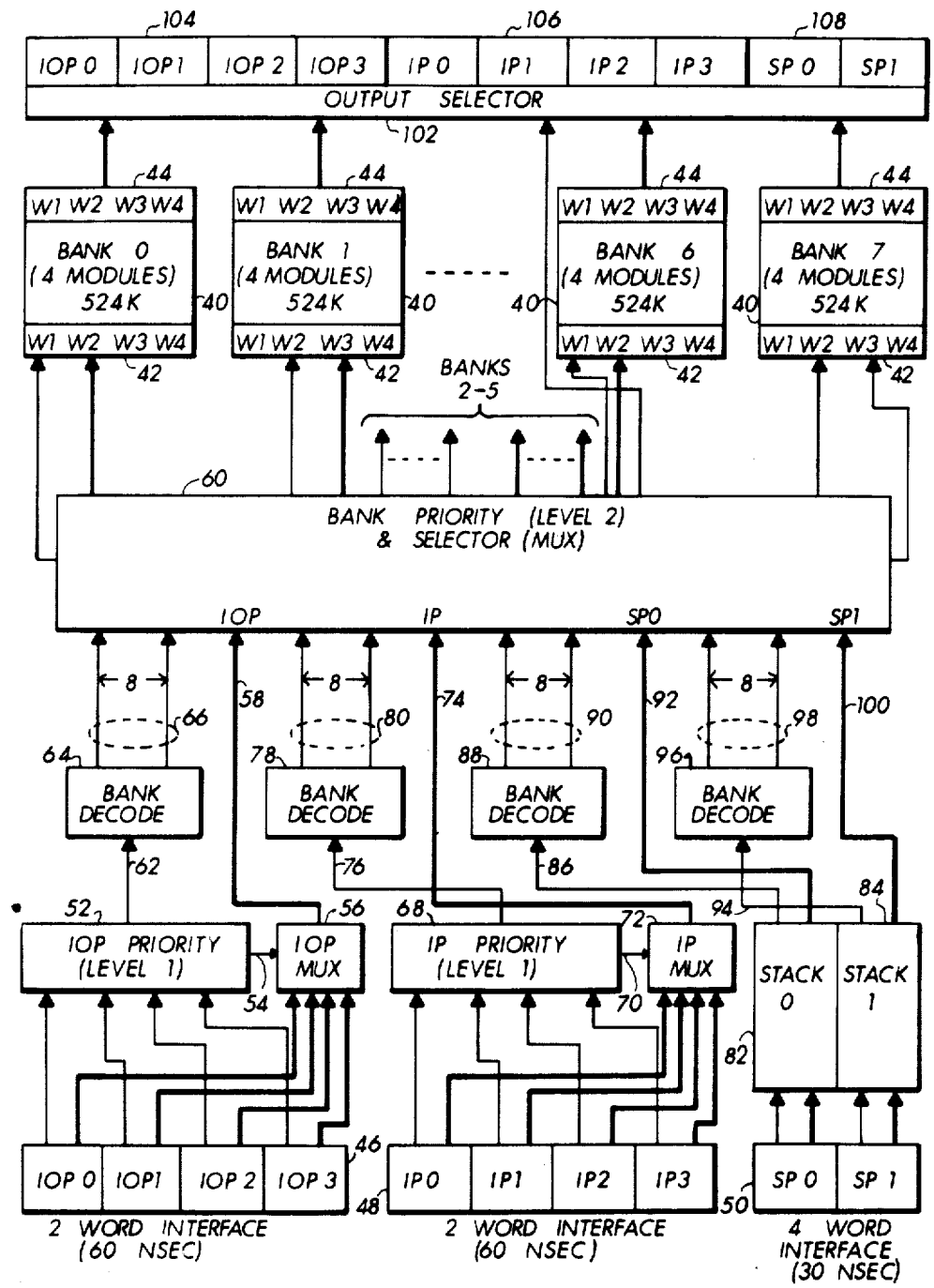
FIG. 2 shows a simplified functional block diagram of the High Performance Storage Unit (HPSU).

FIG. 2 is a simplified functional block diagram of the High Performance Storage Unit (HPSU).

The HPSU is a storage device that is commonly accessible by the IPs, the IOPs, and the SPs via the MUAs. The various devices that can be coupled to the HPSU can have differing interface cycle times and data transfer bit-widths.

In the preferred embodiment, the HPSU utilizes eight Banks of storage devices, generally identified as Bank 0 through Bank 7 of which Banks 0, 1, 6, and 7 are illustrated, and each labelled 40 since they are essentially similar. Though not specifically illustrated, each Bank is comprised of four Memory Modules and each Bank has a total capacity of 524K storage data words. Such a word in memory is 36 data bits, and is accompanied by 8 bits which are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the read/write cycle time must accommodate the interface cycle times with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IP0 through IP3. The IOP ports 46 and the IP ports 48 each operate on a two-word interface at a cycle time of 60 nanoseconds.

The HPSU also has an input SP interface 50 which can accommodate two SPs at the two ports labelled SP0 and SP1. The SP ports each function with a four-word simultaneous interface and operate at an interface cycle time of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of-eight selection and data passes on line 92 to the Bank Priority selector 60. Similarly, request information passes on line 94 to the Bank Decode 96 for making selections on lines 98, while the data passes on line 100.

The Bank Priority and Selector functions to select between the IOP, IP, and the two SP requests presented to it for accessing memory. It also functions to control the Output Selector 102 when reading is to take place.

The HPSU has an IOP output 104 capable of handling four IOP ports IOP0 through IOP3. It also has an IP output 106 capable of handling four IP ports labelled IP1 through IP3. Finally, it has an SP output 108 capable of handling two SP output ports labelled SP0 and SP1. Data rates and timing at the output ports 104, 106 and 108 are similar to those for the input ports previously described.

The HPSU provides a Dayclock, auto recovery timer, System Status register, maintenance exerciser, and an MCI interface. Odd parity is checked/generated across the interface for the IP, IOP, and SP.

Each HPSU is assigned an address range of 4M 36-bit words. Each bank contains 512K words, and there are eight bank within an HPSU. A bank is four words wide. Each bank operates independently of the other bank(s) and is accessed through a Multiple Memory Adapter (MMA). There is a four port MMA for each bank, consisting of one IOP, one IP, and two SPs (SP0 and SP1). Four IOPs (0-3) are prioritized to one IOP and four IPs (4-7) are prioritized to one IP at the bank MMA. The various operations performed by the HPSU are described commencing with the third following section F.

D. General Multiple Unit Adaptor Function within the System

Figure 3:
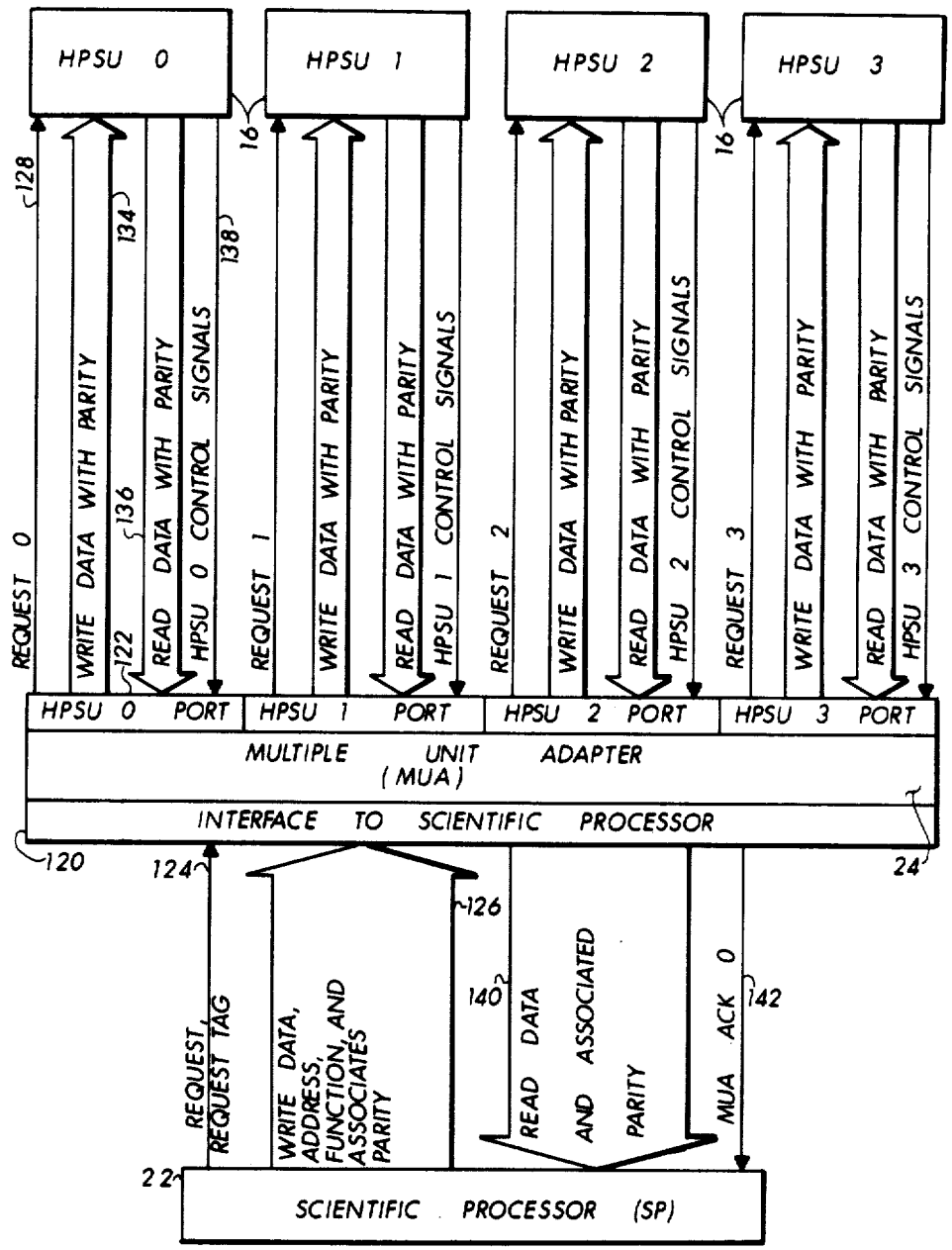
FIG. 3 shows a simplified block diagram of the Multiple Unit Adaptor (MUA) for providing selective interconnection of a Scientific Processor (SP) to one of up to four High Performance Storage Units (HPSU's).

FIG. 3 is a simplified block diagram of the Multiple Unit Adaptor (MUA) for providing selective interconnection of a Scientific Processor to one of up to four High Performance Storage Units.

The MUA 24 has a Interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function, and associated parity is provided via cable 126. the MUA can accumulate up to eight requests from the SP without acknowledgement, and the requests and the associated data are stored in a first-in-first-out (FIFO) stack (not shown).

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass on cable 140 to the SP. As each request is passed on to the selected HPSU, and MUA Acknowledge 0 (ACK 0) signal will be passed on control path 142 to the SP, thereby indicating that the stack has room for one more request.

When the MUA has passed eight requests to an HPSU without acknowledgement, the MUA ceases requesting until an Acknowledge 1 (ACK1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, and all data and control signals from the HPSU are passed on to the SP with the exception of a few special control signals. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. General cientific Processor Function within the System

Figure 4:
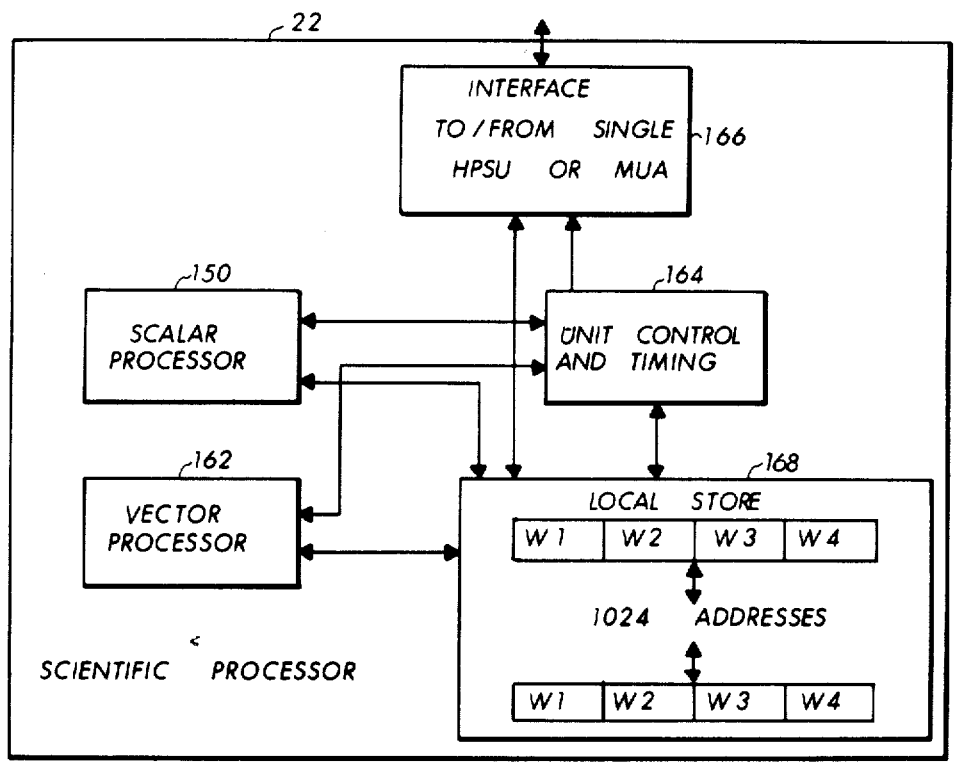
FIG. 4 shows a simplified block diagram of the Scientific Processor (SP).

FIG. 4 is a simplified block diagram of the Scientific Processor.

Basically, the SP 22 is a subsystem defined as an attached processor of the host system. The SP has been optimized for the high speed execution of floating point vector arithmetic operations. It is intended to execute user code only and is not intended to run an executive program. It does not require a control program nor does it have any privileged modes of operation. The SP includes distinct modules, the Scalar Processor 150, the Vector Processor 162, the Unit control Timing 164, the Interface 166, and the Local Store 168.

The Vector Processor module 162 performs vector calculations. the Scalar Processor module 150 performs scalar operations, and also has the overall control function, including instruction fetch and issue. Generally speaking, the Scalar and Vector processor modules operate in parallel although some Scientific Processor instructions require both modules to execute.

The Local Store 168 in the preferred embodiment comprises a high speed random-access memory (RAM) of 4,096 words. The arrangement is such that four words W1 through W4 are accessed simultaneously, yielding an addressable range of 1,024 addresses. The Local Store 168 is used primarily for the storage of frequently used scalar variables, and it should be noted is distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

F. Interfaces Definition and Timing

1. IOP AND IP

The following paragraphs provide the definitions and timing information for the HPSU requestor interface lines for the IP and IOP, with additional information for some interface lines for the SP. Particular timing for the control signals of the SP interface is given in the following section 2.

The data interface between the HPSU and each requester of either the IP or IOP type is shown in FIG. 5a. The requester side of the interface is at the top and the HPSU side of the interface is at the bottom. Odd parity is checked/generated across the interface. Two words, a Most Significant Word (MSW) and a Least Significant Word (LSW), are transferred in the indicated bit positions during each IP or IOP interface communication cycle, which will later be explained to be as often as 120 nanoseconds when no bank priority conflicts exist and requests are pending for a requester(s) of the IP and/or IOP type.

The data interface between the HPSU and each SP requestor is shown in FIG. 5b. Odd parity is again checked/generated across the interface. Four words, Word 1 through Word 4, are transferred in the indicated bit positions during each SP interface communication cycle, which will later be explained to be as often as 30 nanoseconds when no bank priority conflicts exists and requests are pending for a requestor(s) of the SP type. Although the sustainable data transfer rate of the HPSU memory stores is limited to 12.8 gigabits/second of which up to 11.4 gigabits/second are utilized, it may be noted that the 144 total data bits, exclusive of parity bits, which are shown in FIG. 5b will, when transferred each 30 nanoseconds, support a burst data transfer rate of 4.8 gigabits/second to each SP.

The total data and control interface between the HPSU and each of the IOP, IP, and SP is listed in the table of FIG. 6. An interface signal exists from phase 7 to the next phase 7 of an 8 phase clock with the phase to phase time being 7.5 nanoseconds. The total system delays are such that an interface signal must be captured eight phases after being initiated. The HPSU $T_o$ for the requestor that is granted priority, is established at 3.95 nanoseconds before the trailing edge of phase 7. Odd parity is generated and checked on the interface for the control, address, and data fields. All timing assumes that there is no conflict in priority.

1.1. Control signals

Figure 7:
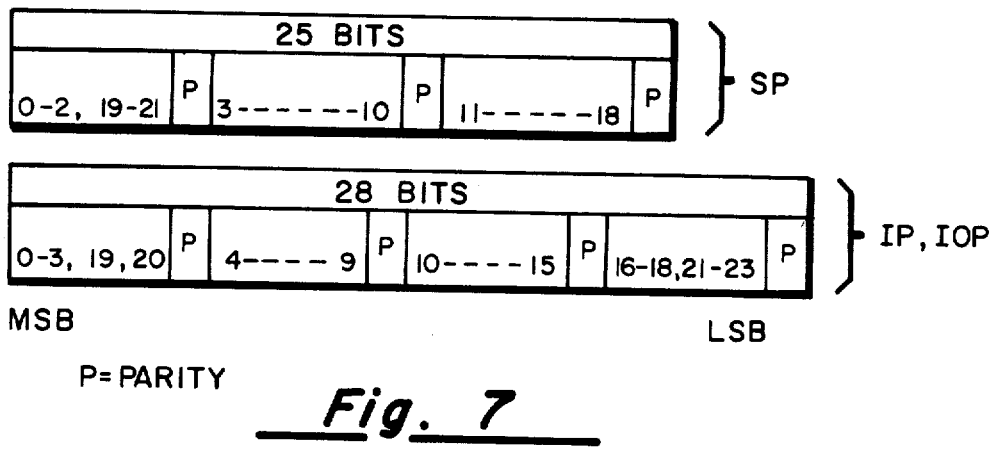
FIG. 7 (shows the format of the address transmission between the SP and the HPSU and the IP or IOP and HPSU.

The format of a word addressing the 4M words memory stores of HPSU or the Address Word Format, is respectively shown for the SP, and for the IP or IOP, requestors in FIGS. 7a and 7b.

Figure 8A:
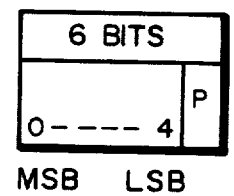
FIG. 8a shows the format of the function word transmission between the IP or IOP and the HPSU.
Figure 8B:
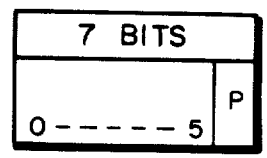
FIG. 8b shows the format of the start and end field transmitted between the IP or IOP and the HPSU.
Figure 8C:
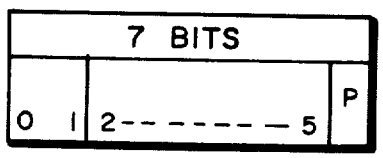
FIG. 8c shows the format of the function words transmitted between the SP and the HPSU.

The format of a Function, or Control, word from the IP or IOP is shown in FIG. 8a, while the format of the Start and End control received from the IP or IOP is shown in FIG. 8b. The format of each of the Function (Control) word, the Start control word, or the End control word as received of the HPSU from the SP is shown in FIG. 8c. The appropriate HPSU/REQUESTOR AVAILABLE signal listed in the table of FIG. 6 is used as an enable to the signals that hang the interface.

1.2. Request

The REQUEST signal listed in the table of FIG. 6 when received from an IP or IOP is a 60-nanosecond signal that initiates an HPSU operation. The REQUEST signal must be stable at the HPSU connector not later than 3.95 nanoseconds before the trailing edge of phase 7. See FIG. 9 which shows the detail timing at the HPSU side of the interface with any requestor. The minimum cable length of 19.5 feet assures that the HPSU does not capture the REQUEST signal at HPSU $T_o - 60$ nanoseconds.

1.3. Acknowledge 1

The ACKNOWLEDGE 1 (ACK 1) signal listed in the table of FIG. 6 when sent to an IP or IOP is a 60-nanosecond signal sent at $T_o + 120$ nanoseconds for all operations by the HPSU bank when the requestor has been given priority. All interface signals, except the REQUEST signal, must be held until the ACKNOWLEDGE 1 signal is received by the requestor.

1.4. Interface Check

This INTERFACE CHECK signal listed in the table of FIG. 6 when sent to an IP or IOP is a 60-nanosecond signal sent at $T_o + 120$ nanoseconds when a parity error is detected in the address, start, end, function or write data. The HPSU performs a Read cycle placing interface parity error information on the READ DATA Lines. (See FIG. 16a.) For a Block Write Parity error on the 2nd, 3rd, and 4th transfers, an INTERFACE CHECK signal is sent at $T_o + 360$, 420, and 480 nanoseconds respectively.

1.5. Acknowledge 2

The ACKNOWLEDGE 2 (ACK 2) signal listed in the table of FIG. 6 when sent to an IP or IOP is a 60-nanosecond signal transmitted to the requestor on a phase 7, one cycle before read data or interface check data. For a non block write cycle, the ACK 2 signal occurs at $T_o + 240$ nanoseconds. A block write cycle with no interface errors on the first transfer, results in an ACK 2 signal at $T_o + 540$ nanoseconds. For a block write cycle with interface errors on the first transfer, an ACK 2 signal will come at the normal time of $T_o + 120$ nanoseconds.

2. SCIENTIFIC PROCESSOR (SP)

The following paragraphs provide the definitions and timing information for the HPSU/SP requestor interface lines grouped by general function. (See FIG. 6.) An interface signal exists from phase 4 to the next phase 4 of a 4-phase clock with the phase to phase timing being 7.5 nanoseconds. The total system delays are such that an interface signal must be captured four phases after being initiated. The HPSU $T_o$ for the requestor that is granted priority is established at 5.0 nanoseconds before the trailing edge of phase 4. Odd parity is generated and checked on the interface for control, address, and data fields. All SP inputs are captured in an eight deep stack, and they are read off of the stack first in first out (FIFO). The HPSU will not prevent references to addresses which are in the SP stack waiting to be written.)

2.1. Control Signals

The format of the Function, or Control, Word transmitted from the SP to the HPSU is shown in FIG. 8c. The appropriate HPSU/REQUESTOR AVAILABLE signal is used as an enable to control signals that can hang the interface.

2.2. Request

The REQUEST signal listed in the table of FIG. 6 when received from an SP is a 30-nanosecond signal that initiates an HPSU operation. The REQUEST signal must be stable at the HPSU connector not later than five nanoseconds before the trailing edge of phase 4. (See FIG. 9.) The minimum cable length of 9.75 feet assures that the HPSU does not capture the REQUEST signal at $T_o-30$ nanoseconds. Up to 8 requests can be sent by a SP without receiving an acknowledge.

2.3. Request Tag

The REQUEST TAG signal listed in the table of FIG. 6 is a 30-nanosecond signal uniquely sent by a SP to the HPSU. The timing is the same as for the REQUEST signal. See previous section 2.2 and FIG. 9.

2.4. Acknowledge 1

The ACKNOWLEDGE 1 (ACK 1) signal listed in the table of FIG. 6 when sent to a SP is a 30-nanosecond signal generated at the HPSU gated with a phase 4 that occurs 60 nanoseconds after a request to an unbusy bank when the requestor has been given priority.

2.5. Request Tag Response

The REQUEST TAG RESPONSE signal listed in the table of FIG. 6 is a return of the REQUEST TAG signal that is sent uniquely to the SP type requestor. The timing is the same as specified in previous section 2.4 for the ACKNOWLEDGE 1 signal.

2.6. Acknowledge 2

The ACKNOWLEDGE 2 signal listed in the table of FIG. 6 when sent to a SP is a 30-nanosecond signal that is transmitted to the SP requestor on phase 4 one cycle before read data or interface check data.

2.7. Read Acknowledge 2 Tag

The READ ACKNOWLEDGE 2 TAG signal listed in the table of FIG. 6 when sent uniquely to a SP has the same timing as specified for the ACKNOWLEDGE 2 signal in previous section 2.6. This signal is high when the cycle performed had Function Code bits 2, 3, 4, and 5 low.

2.8. Maintenance Acknowledge 2

The MAINTENANCE ACKNOWLEDGE 2 signal listed in the table of FIG. 6 is a 30-nanosecond pulse that is transmitted to the SP requestor on phase 4, one cycle before read data or interface check data. Except for Bank Not Available (BNA), ACKNOWLEDGE 1 and 2 signals are sent in response to every request.

2.9. Interface Check

The INTERFACE CHECK SIGNAL listed in the table of FIG. 6 is a 30 nanosecond signal sent at $T_o+60$ nanoseconds when a parity error is detected in the address, function, or write data. The HPSU performs a read cycle placing interface parity error information on the READ DATA lines. (See FIG. 16b.)

3. INPUT LINES 3.1. IP and IOP Input Data

All data must be stable at $T_o-3.95$ nanoseconds except the address field that must be stable at $T_o-14.95$ nanoseconds. The timing for the multiplexed write data (second, third, and four words) during the block write operation is shown in FIG. 9. The input lines are described in the following sections. All input lines must be parity correct regardless of the type of cycle being requested. For input timing see FIGS. 9 and 10.

3.1.1. IP and IOP Address

A 24-bit address field shown in FIG. 7b and listed in the table at FIG. 6 provides the capability of addressing 16M 36-bit words. Most significant bits 0 and 1 of the address field may be used to decode requests to the proper HPSU when there is more than one such within a system.

3.1.2. IP and IOP Write Data

The write data interface is 72 bits wide (double Word). The requestor must place the even word on bits 0 through 35 and the odd word on bits 36 through 71. See FIG. 5a.

3.1.3. IP and IOP Start

The 6-bit Start field listed in the table at FIG. 6 is used in the partial write operation to specify the most significant bit (MSB) to be altered in the write field. The Start field except for parity is ignored on all other functions.

3.1.4. IP and IOP End

The 6-bit End field listed in the table of FIG. 6 is used in the partial write operation to specify the least significant bit (LSB) to be altered in the write field. The End field except for parity is ignored for all other functions.

3.1.5. IP and IOP Function Code

The IP or IOP requestor sends a 5-bit function code in the format shown in FIG. 8a to the HPSU that defines the HPSU operation as described in the table of FIG. 11.

3.1.6. IP Bank Lock

This signal listed in the table of FIG. 6 must be stable at the HPSU connector not later than HPSU $T_o+10$ nanoseconds and remain until the ACK 1 signal is received. When the HPSU services an IP requestor designating the ACCESS LOCK signal, it will ignore all other requests until a request is received from that requestor with the ACCESS LOCK signal cleared.

3.1.7. Input Parity

The IP or IOP requestor shall generate odd parity. The table of FIG. 12 lists the parity bits associated with the interface.

3.2. SP Input Data

All input must be stable at 3.95 nanoseconds before $T_o$ phase 4 and remain stable until 3 nanoseconds after the trailing edge of phase 4.

3.2.1. SP Address

A 22-bit address field shown in FIG. 7b provides the capability of addressing 4M quad (144 bit) words, the storage contents of one HPSU.

3.2.2. SP Write Data

The write data interface shown in FIG. 5b is 144 bits wide (quad word). The requestor must place word 0 on bits 0 through 35, word 1 on bits 36 through 71, word 2 on bits 72 through 107, and word 3 on bits 108 through 143. See FIG. 5b.

3.2.3. SP Function Code

The requestor sends a 6-bit function code in the format shown in FIG. 8c to the HPSU that defines the HPSU operation as described in the table of FIG. 13.

3.2.4. SP Input Parity

The SP requestor shall generate odd parity. The table shown in FIG. 14 lists the parity bits associated with the SP interface.

4. OUTPUT LINES TO IP AND IOP 4.1. IP and IOP Read Data

The HPSU translates address bits 2–22 to the read address and read address +1 and presents 72 bits of read data from such two addresses to the requestor. The LSB (23) of the interface corresponds to the MSW (bit 23 =0) or the LSW (bit 23 =1). See FIG. 5a. The read data is presented to the interface at the following times: for a normal read operation, at $T_o+300$ nanoseconds; or else for a block read operation the First pair of words at $T_o+300$ nanoseconds, then the second pair of words at $T_o+360$ nanoseconds, then the third pair of words at $T_o+420$ nanoseconds, and then the fourth pair of words $T_o+480$ nanoseconds.

4.2. IP and IOP Output Parity

The HPSU generates odd parity. The parity bits must be stable with read data. The table shown in FIG. 12 lists the parity bits associated with the interface.

5. OUTPUT LINES TO SP

5.1. SP Read Data

The HPSU translates address bits 2-21 shown in FIG. 7a to read an address and presents 144 bits of read data shown in FIG. 5b to the requestor at $T_o+240$ nanoseconds.

5.2. SP Output Parity

The HPSU generates odd parity. The parity bits must be stable with read data. The table shown in FIG. 14 lists the parity bits associated with the interface.

6. ADDRESS TRANSLATION

Figure 15A:
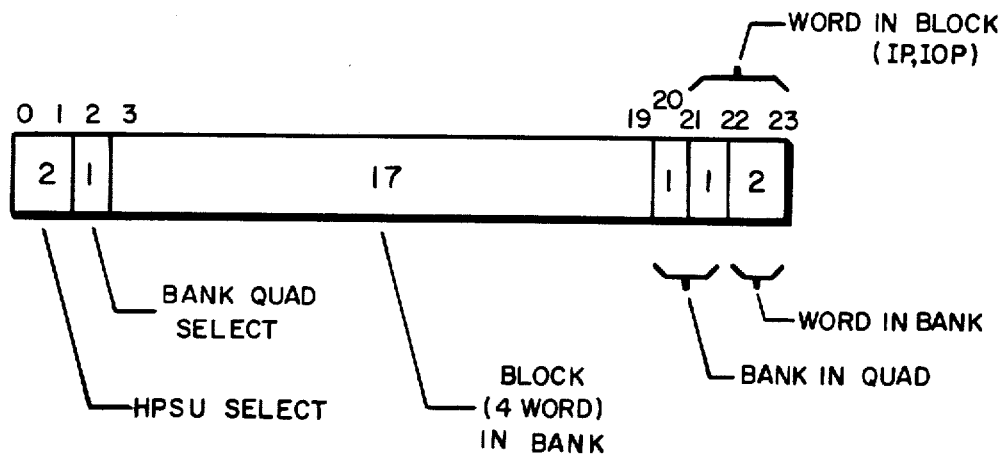
FIG. 15a shows the manner of address translation proceeding from addressing of an HPSU wherein four banks are interleaved.
Figure 15B:
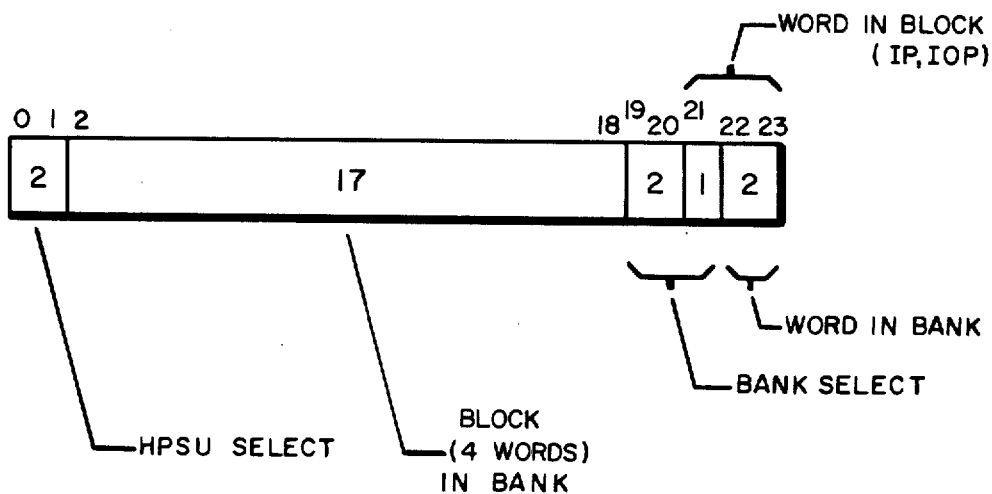
FIG. 15b shows the address translation proceeding from the addressing of an HPSU wherein eight banks are interleaved.

The Address Translation within the HPSU is shown in FIG. 15a and FIG. 15b for the respective cases of 4 bank interleave and 8 bank interleave.

7. ERROR SIGNALS

7.1. Interface Check (INTFC CHK)

The INTERFACE CHECK signal listed in the table of FIG. 6 is generated for any of five error conditions detected on incoming information:

(1) Write Data Parity Error (WDPE) on data for the IP, IOP, SP;
(2) Function Code Parity Error (FCPE) on function from the IP, IOP, SP;
(3) Address Parity Error (APE) on addresses from the IP, IOP, SP;
(4) Start Parity Error (SPE) on the Start code from the IP+IOP only; and
(5) End Parity Error (EPE) on the End code from the IP+IOP only.

For an IP or IOP Interface check, the HPSU sends a 60-nanosecond wide pulse at $T_o+120$ nanoseconds. For an SP Interface check, the HPSU sends a 30-nanosecond wide pulse at $T_o+60$ nanoseconds. An Interface Check resulting from a WDPE during a block write (IP or IOP cycle) occurs as follows:

| Write Data Parity | Interface Check |
|---|---|
| 1st | $T_o + 120$ nanoseconds |
| 2nd* | $T_o + 360$ nanoseconds |
| 3rd* | $T_o + 420$ nanoseconds |
| 4th* | $T_o + 480$ nanoseconds |

*Possible only if no interface check is sent at $T_o = 120$ nanoseconds.

Interface check error data is directed to the read data interface at normal read data timing for an INTFC CHECK signal at $T_o+120$ nanoseconds and at $T_o+600$ nanoseconds if an INTFC CHECK signal occurs for the 2nd, 3rd, or 4th data transfer of a Block Write.

The Interface Error Format for transmissions from the HPSU to an IP or IOC requestor on the read interface lines thereto in shown in FIG. 16a. The utilization of each of the bit fields is as follows:

| Bits: | Utilization |
|---|---|
| 0-7 | Write Data Parity - Each bit represents one of eight bytes (72 bits) of data transmitted across the input interface. Bit 0 set signifies the byte zero error in the write data. |
| 8-11 | Address Parity - These bits signify the 4 bytes of address Parity as follows: Bit 8 is set if incorrect parity of Bits 0-3, 19 and 20 occurs. Bit 9 is set if incorrect parity of Bits 4-9 occurs. Bit 10 is set if incorrect parity of Bits 10-15 occurs. |
| 12 | Bit 11 is set if incorrect parity of Bits 16-18 and Bits 21-23 occurs. Function Code Parity Error (FCPE) - When set, this bit signifies a parity error in the function code. |
| 13 | Start Parity Error (SPE) - When set, this bit signifies a parity error in the start field. |
| 14 | End Parity Error (EPE) - When set, this bit signifies a parity error in the end field. |

The Interface Error Format for transmissions from the HPSU to an SP requestor on the read interface lines thereto is shown in FIG. 16b. The utilization of the bit fields is as follows:

| Bits | Utilization |
|---|---|
| 0-15 | Write Data Parity - Each bit represents one of sixteen bytes (144 bits) of data transmitted across the input interface. Bit 0 set signifies byte zero error in the write data. |
| 16-18 | Address Parity - These bits represent groups of Address bits as follows: Bit 16 is set if incorrect parity of bits 0-2, 19-21 occurs. Bit 17 is set if incorrect parity of bits 3-10 occurs. Bit 18 is set if incorrect parity of bits 11-18 occurs. Function Code Parity Error - When set, this bit signifies a parity error occurred in the function code. |

Figure 10:
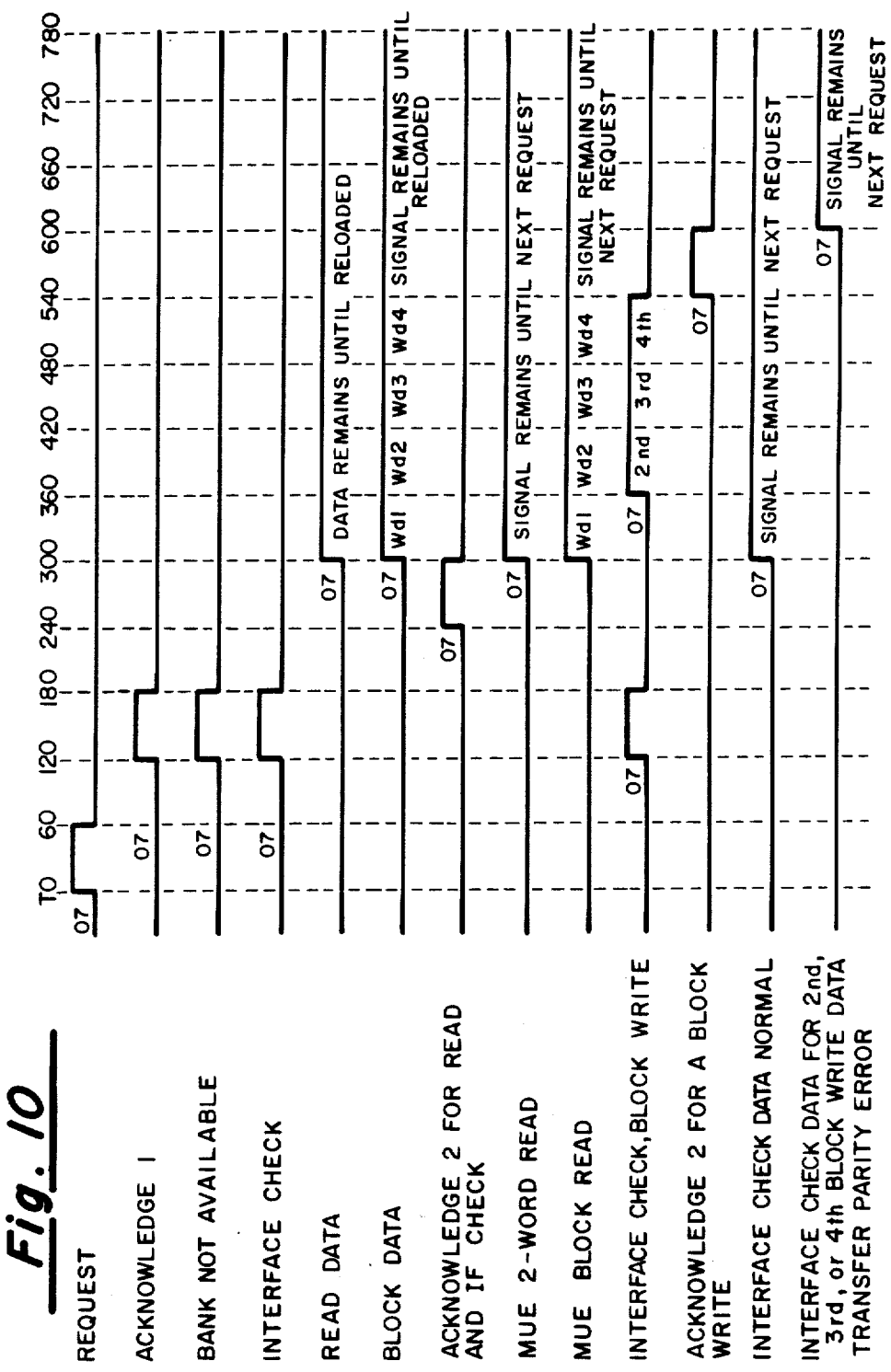
FIG. 10 shows the interface timing at the HPSU for communication to the IP or IOP requestors.

The timing for an interface check is shown in FIG. 10.

7.2. Internal Check (INTL CHK)

The HPSU performs internal parity checking on the function code, address field, start/end fields, and write data. If an error is detected, the Internal Check line listed in the table shown in FIG. 6 is set to the initiating requestor (IP or IOP at ACK2 +60 nanoseconds and the SP at ACK2+30 nanoseconds). The HPSU stops and subsequent requests to that bank cause the requestor to timeout. An Internal Check can only be cleared by the System Support Processor (SSP) or by a POWER-UP CLEAR signal.

7.3. Internal Partial Write Check

The HPSU Provides through checking for partial write cycles by parity checking. The HPSU responds to Internal Partial Write errors by stopping the requested bank. Only a CLEAR signal from the SSP or a POWER-UP CLEAR signal will clear the HPSU. No interrupt is sent to the requestor because this check occurs after $T_o+300$ nanoseconds for an IP or an IOP and 240 nanoseconds for an SP.

7.4. Multiple Uncorrectable Error

During a read, block read, or partial write cycle, a Multiple Uncorrectable Error (MUE) can occur on read data. An MUE detected on a read portion of a partial write results in an aborted write and a MUE signal as listed in the table shown in FIG. 6 to be sent to the requestor.

7.4.1. Multiple Uncorrectable Error to IOP/IP

Two lines are used to send an MUE to designate which word (even or odd) had an error. The MUE is generated at $T_o+300$ nanoseconds; $T_o+360$ nanoseconds (2nd pair of block read), $T_o+420$ nanoseconds (3rd pair) or $T_o+480$ nanoseconds (4th pair). This signal remains active until another request is received from the requestor. See FIG. 10 for the timing of this signal.

7.4.2. Multiple Uncorrectable Error to SP

Four lines are used to designate which one of the four words had an error. The MUE is generated at $T_o+240$ nanoseconds. This signal remains active until another request is received from the requestor. See FIG. 17 for the timing of this signal.

7.5. Bank Not Available

The BANK NOT AVAILABLE signal listed in the table of FIG. 6 is a 60-nanosecond signal for an IP or an IOP, a 30-nanosecond pulsed signal for an SP that is generated by the HPSU when the address presented does not decode to a Bank which is partitioned to the requestor. This signal is generated by the HPSU at $T_o+120$ nanoseconds (phase 7) for an IP/IOP and $T_o+60$ nanoseconds for an SP. No additional signals (except the REQUEST TAG RESPONSE signal) are generated for that request when a BANK NOT AVAILABLE signal is generated.

7.6. Status Check Interrupt

The STATUS CHECK signals can originate in any bank but are ORed together in the HPSU. When a single bit error occurs in a bank, the associated bank status register is loaded, the resident bit set, and the STATUS CHECK signal listed in the table of FIG. 6 is broadcast to all IP (Ports 4–7) requestors within the partition. FIG. 18 shows the bank status register format for single bit errors. The utilization of the bits within this bank status register format is as follows:

| Bits | Utilization |
|---|---|
| 0–16 | Address<br>0,1,2 Row selected<br>3–16 16K address |
| 18–25 | Syndrome - These generated code bits point at the bit in error. These syndrome bits are 0's for no failure. |
| 27–30 | Bank/Word select<br>27, 28, 29 Bank Selected<br>30 Word pair selected |
| 32 | Resident Bit - The resident bit is set when data is loaded and cleared when the requestor reads out the data. |

Figure 19:
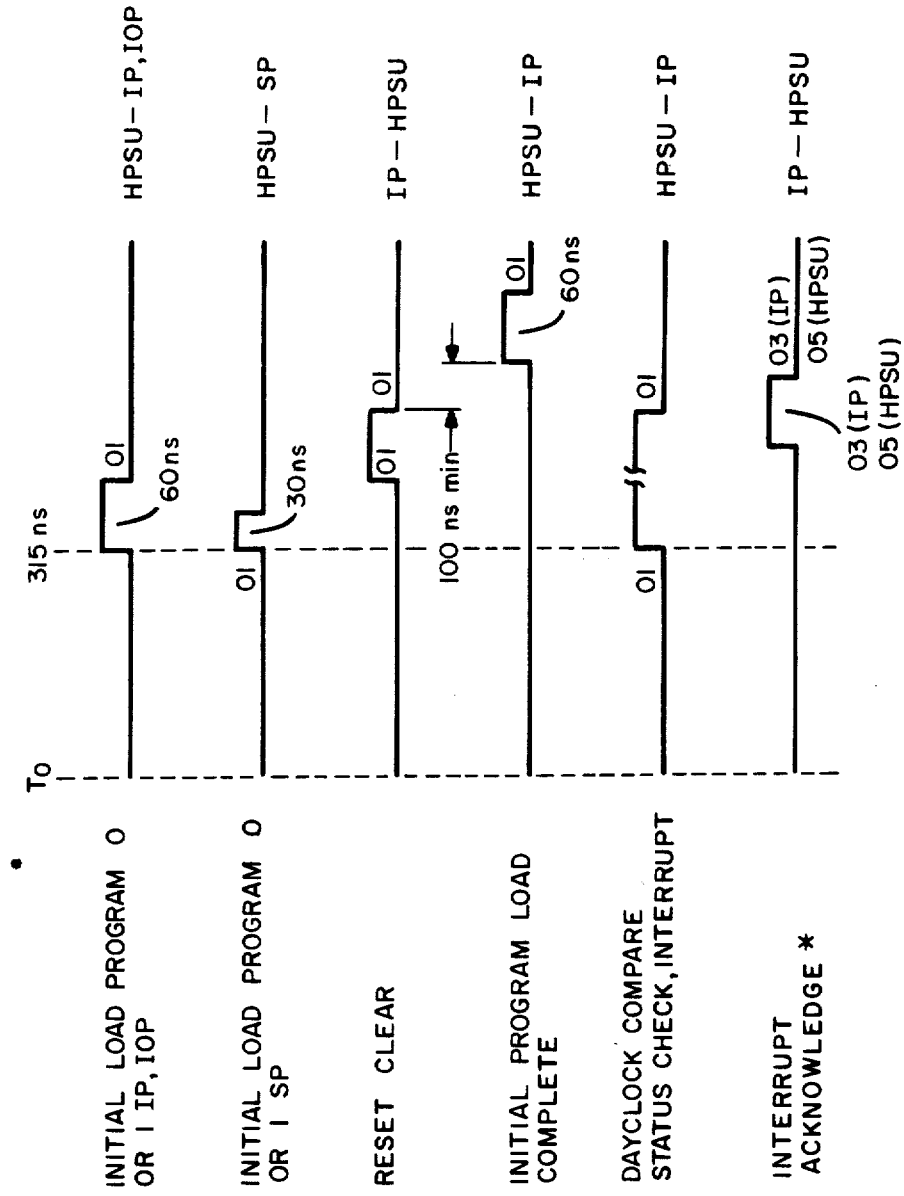
FIG. 19 shows the timing of the HPSU to IP interface for the occasion of an initial program load.

The STATUS CHECK signal remains on the interface until a STATUS CHECK ACKNOWLEDGE signal is received by the HPSU. The requestor must read 32 status works (16 double words) in the HPSU (four for each bank), FIG. 19 shows the interface timing. The resident bit which is set with the status load remains set until the status work is read by the requestor. The STATUS CHECK signal is generated at HPSU $T_o+315$ nanoseconds (Phase 1) + number of transfers $\times 60$ nanoseconds and remains set until acknowledge at Phase 3. FIG. 19 shows this interface timing also.

7.7. Status Check Acknowledge

This signal listed in the table of FIG. 6 is transmitted to the HPSU by the interrupt selected IP in response to the HPSU interrupts. See FIG. 19 for the interface timing.

7.8. Dayclock Interrupt

A DAYCLOCK INTERRUPT signal listed in the table of FIG. 6 is generated by the HPSU when the Dayclock value becomes equal to or greater than the value in the Dayclock Comparator register. A DAYCLOCK INTERRUPT signal which is broadcast to all IP (port 4–7) requestors within the application is generated at $T_o$ on phase 1 and remains until a DAYCLOCK INTERRUPT ACKNOWLEDGE listed in the table of FIG. 6 signal is received. See FIG. 19 for the interface timing.

7.9. Dayclock Interrupt Acknowledge

The DAYCLOCK INTERRUPT ACKNOWLEDGE signal listed in the table of FIG. 6 is transmitted to the HPSU by the interrupt selected IP in response to the HPSU interrupts. See FIG. 19 for the interface timing.

8. INITIAL PROGRAM LOAD SIGNALS

These signals are used to alert the IPs, IOPs, and SPs of an initial load. The initial Confidence Load Program Block is preloaded by the SSP in the HPSU. The HPSU, as the result of an INITIAL PROGRAM LOAD signal, transfers the initial Confidence Load Program block to a MSR specified location in the HPSU and broadcasts to all the IPs in the application.

8.1. Initial Program Load 0–1

The signals INITIAL LOAD PROGRAM 0, 1 listed in the table of FIG. 6 are broadcast by the HPSU to all enabled requestors within the application indicating that an initial load is to occur. These pulses are 60 nanoseconds long for the IP and IOP and 30 nanoseconds long for the SP. See FIG. 19 for the interface timing.

8.2. Initial Program Load Complete

The signal INITIAL PROGRAM LOAD COMPLETE listed in the table of FIG. 6 is a 60 nanoseconds signal which is broadcast to all IP ports (4–7) which are enabled by application. It signifies that the initial Confidence Load Program Block is loaded in the HPSU. See FIG. 19 for the interface timing. The INITIAL PROGRAM LOAD COMPLETE signal will occur 100 milliseconds minimum after a RESET CLEAR signal has been received by the HPSU. (See the next following section 8.3.)

8.3. Reset Clear

The RESET CLEAR signal listed in the table of FIG. 6 is transmitted by the selected initial load path IP to the HPSU in response to the INITIAL LOAD PROGRAM 0,1 signal. This signal causes the HPSU to perform an Initial Program Load. If this signal is not received within 100 milliseconds from the INITIAL LOAD PROGRAM signal, the HPSU will not respond to a RESET CLEAR signal.

9. BANK INTERLEAVE

9.1. IOP/IP REQUESTOR BANK INTERLEAVE

Figure 20:
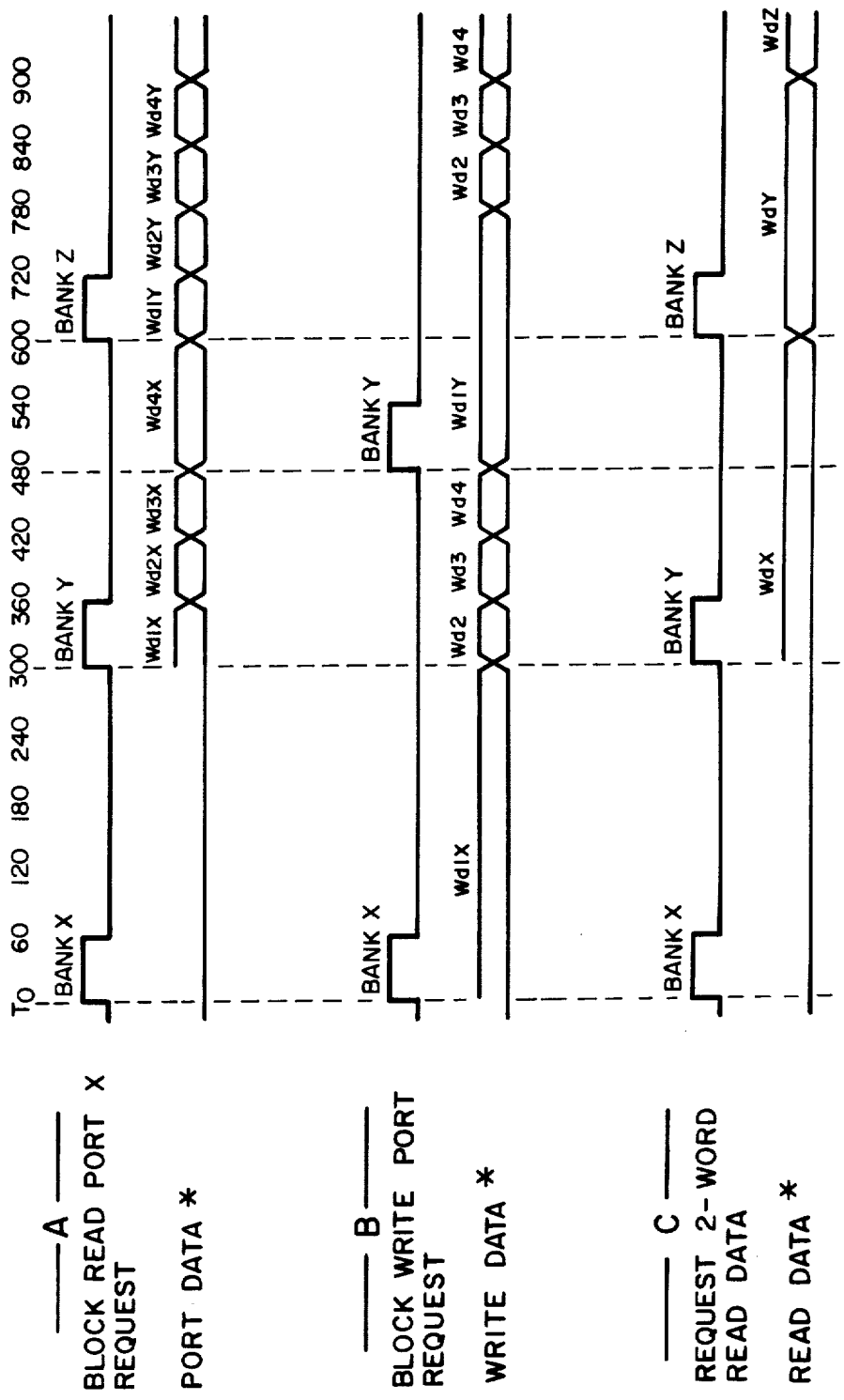
FIG. 20, consisting of sections A, B, and C, shows the timing of the IP or IOP requestors requesting interleaved banks of the HPSU.

The interface communication to an IP or IOP in the case of bank interleave is shown in FIG. 20. The HPSU provides a read access of 300 nanoseconds (72-bit word). Subsequent requests from the same IOP or IP can follow at 300 nanoseconds intervals. See FIG. 20c.

Maximum data transfer is achieved when a requestor requests block functions on a bank interleave. With requested block reads, the HPSU provides the first word (72-bits) at $T_o+300$ nanoseconds and additional words every 60 nanoseconds; $T_o+360$ nanoseconds, $T_o+420$ nanoseconds, and $T_o+480$ nanoseconds (60 nanoseconds is allowed at the end of each block read for status reporting). The first word of the second request is provided at $T_o+600$ nanoseconds with additional words at $T_o+660$ nanoseconds, $T_o+720$ nanoseconds, and $T_o+780$ nanoseconds. See FIGS. 20a and 20b.

Figure 21:
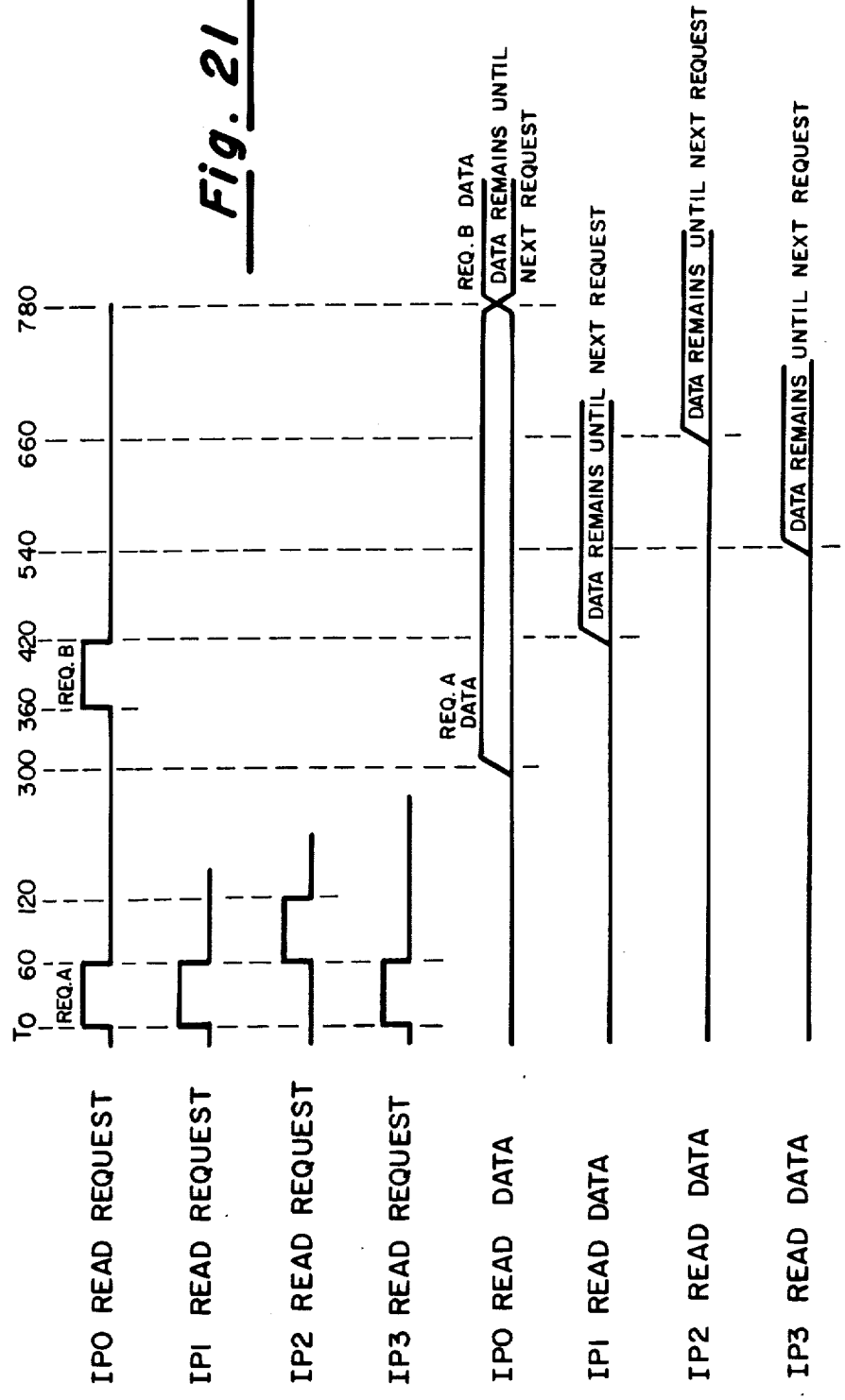
FIG. 21 shows the timing of reads at the HPSU upon an example of conflicts thereat between the IP0, IP1, IP2, and IP3 requestors.

Multiple non block IP function (or multiple IOP) requests received by the HPSU at the same time will result in the higher numbered IPs having to wait 120 nanoseconds for every lower IP request to start execution. See the example of an IP0, IP1, IP2, and IP3 conflict shown in FIG. 21.

2. SP Requester Bank Interleave

Figure 22:
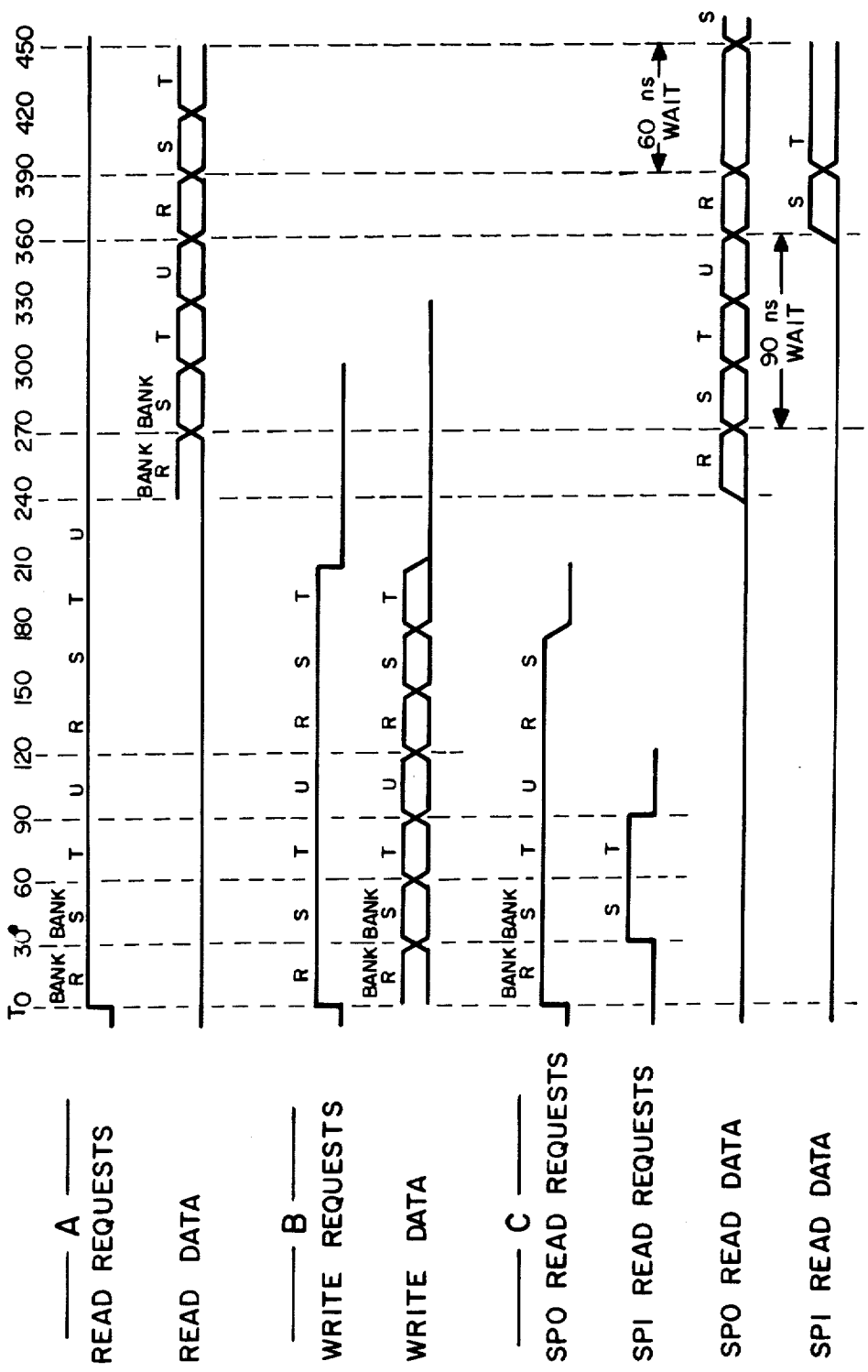
FIG. 22, consisting of parts A, B, and C, shows the read and write requests of an SP requestor to a HPSU wherein four banks are interleaved.
Figure 23B:
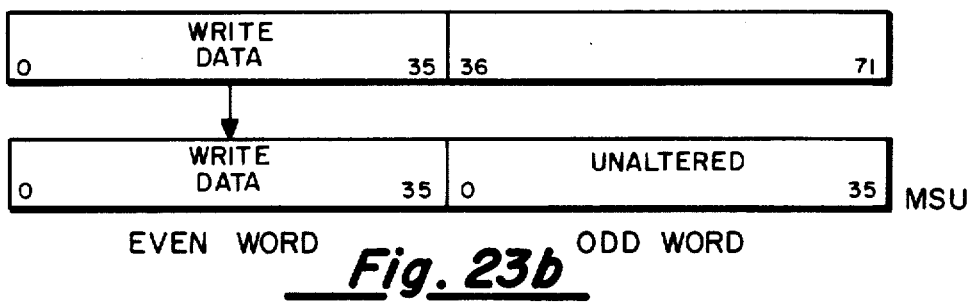
FIG. 23b shows the writing of a full word at an even address by the IP or IOP requestors at the HPSU.
Figure 23C:
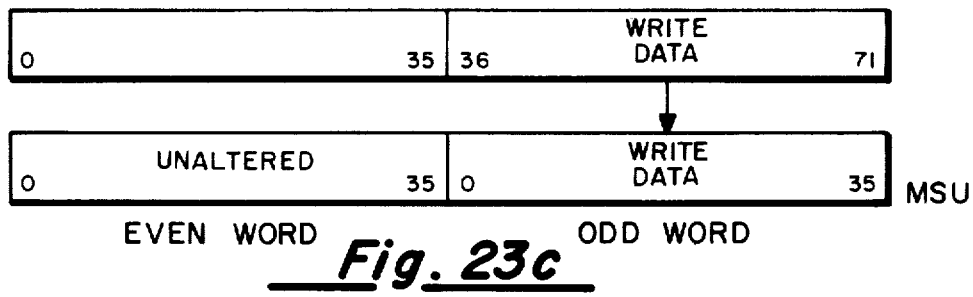
FIG. 23c shows the writing of a whole word at an odd address by the IP or IOP requestors at the HPSU.
Figure 23D:
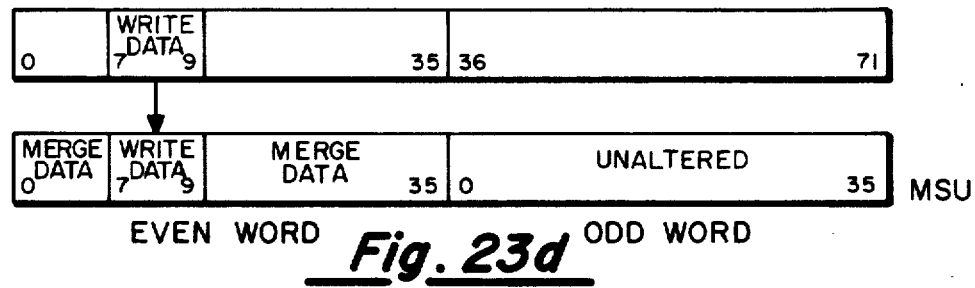
FIG. 23d shows the writing of a partial word at an even address by the IP or IOP requestors at the HPSU.
Figure 23E:
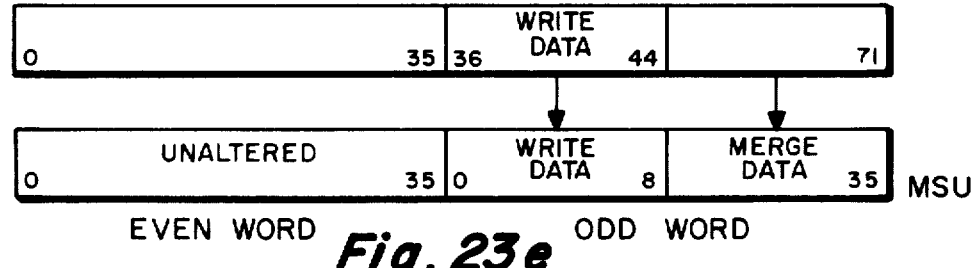
FIG. 23e shows the writing of a partial word at an odd address by the IP or IOP requestors at the HPSU.
Figure 23F:
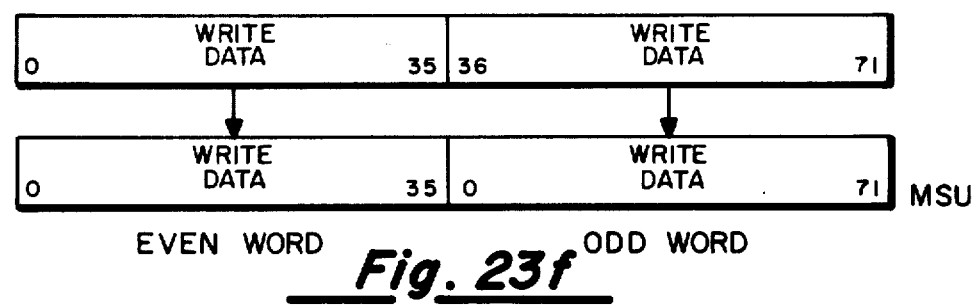
FIG. 23f shows the full writing of a double word by the IP or IOP requestors at the HPSU.

The interface communication to an SP in the case of four-bank interleave is shown in FIG. 22. The HPSU provides a read access at 240 nanoseconds (144 bit word), however, the requestor can interleave between four banks or eight banks providing read data every 30 nanoseconds providing there are no conflicts. See FIG. 22.

10. Unit Available Lines

These lines of three types are considered a special case of control lines.

10.1. HPSU AVAILABLE

The two HPSU AVAILABLE Lines listed in the table of FIG. 6 present two dc logic levels, High and Low, from the HPSU to each requestor to indicate that the HPSU and the requestor are cabled together and that the HPSU is powered up. These lines are disabled by a command from the IPs.

10.2. REQUESTOR AVAILABLE

The two REQUESTOR AVAILABLE lines listed in the table of FIG. 6 present two dc logic levels, High and Low, from a requestor to each HPSU to indicate that the requestor and the HPSU are cabled together and that the requestor is powered up. The HPSU performs an Exclusive OR (XOR) function on three lines. When the XOR is true, the control signals from the requestor are valid. These lines must be valid before the HPSU can be partitioning during initialization.

10.2. DELETE UNIT AVAILABLE

The DELETE UNIT AVAILABLE signal line listed in the table of FIG. 6 provides a dc logic level from the IP which removes the HPSU from the application and causes the HPSU AVAILABLE signal to be inactive.

G. HPSU FUNCTIONAL CHARACTERISTICS

The High Performance Storage Unit (HPSU) contains four million words in eight memory banks. The HPSU has single bit error correction/double bit error detection for the storage array.

1. PERFORMANCE

The storage unit meets the following performance requirements for any combination or sequence of operating modes, data patterns, address sequencing, repetition rates, operating temperature ranges, and voltage margins.

| | |
|---|---|
| Read Access (SP) | 240 Nanoseconds |
| Read Access (IP or IOP) | 300 Nanoseconds |
| Read Cycle | 90 Nanoseconds |
| Block Read Access, First Word Pair | 300 Nanoseconds |
| Block Read Access, Second Word Pair | 360 Nanoseconds |
| Block Read Access, Third Word Pair | 420 Nanoseconds |
| Block Read Access, Fourth Word Pair | 480 Nanoseconds |
| Block Read Cycle | 90 Nanoseconds |
| Write Cycle (1, 2, 3 or 4 words) | 90 Nanoseconds |
| Partial Word Write Cycle | 150 Nanoseconds |
| Block Write (8 words) | 360 Nanoseconds* |
| Dayclock Read Access | 300 Nanoseconds |
| Dayclock Cycle | 300 Nanoseconds |
| Status Word or Comparator Read Access | 300 Nanoseconds |
| Status Word or Comparator Read Cycle | 300 Nanoseconds |
| Maintenance Cycle | 300 Nanoseconds |
| Test and Set Functions | 150 Nanoseconds |
| Block Write Abort Cycle (IF check) | 480 Nanoseconds |
| Abort Cycle (Remaining functions) | 90 Nanoseconds |

*First 4 words are written in the first bank in 360 ns, the remaining four words are all written into the second bank in 480 nanoseconds.

2. DATA RATES

The following data rates require that no bank priority conflicts exist and that requests are pending:

| | |
|---|---|
| SP | 30 Nanoseconds |
| IOP(X)–IOP(Y) | 120 Nanoseconds |
| IP(X) Block Read–IO(Y) | 240 Nanoseconds |
| IP(X) Block Write–IP(Y) | 480 Nanoseconds |
| IP(X)–IP(Y) [remaining functions] | 120 Nanoseconds |

3. MODES OF OPERATION 3.1. IOP/IP Functions

HPSU operation are defined by a five bit function code. See FIG. 8a and 8b. When a requestor is granted priority, the HPSU decodes the function code and initiates the requested operation. It may perform main storage, Dayclock, or maintenance operations. Function codes (octal rotation) for the HPSU are listed in the table shown in FIG. 11.

3.1.1. Write One Word Partial ($10_8$)

The HPSU performs a partial write operation within a word boundary. Address bit 23 selects the even or odd word that will be altered. The Start and End fields are used to determine the bits within the word that will be altered. Full word and partial writes are shown in FIG. 23b through FIG. 23f.

Address bit 23 determines which word will be altered; even word if $23=0$, odd word if $23=1$. Start and End field values of 0 through 35 represent data bit positions 0 through 35.

3.1.2. Write One Word ($11_8$)

The HPSU performs a full word write operation. If address bit 23 is 0, the Even Word (Bits 0–35) is altered. When address bit 23 is 1, the Odd Word (Bits 36–71) is altered.

3.1.3. Write Two Words ($12_8$)

The HPSU performs a double-word write operation. Address Bit 23 is ignored and both the Even and Odd Word, as presented to the interface by the requestor, will be stored.

3.1.4. write Block ($13_8$)

This function initiates an HPSU write operation which alters eight consecutive locations that do not cross eight word block boundaries. (Address Bits 21, 22, and 23 are ignored). The first two words of data are sent with the request. See FIGS. 5a and 5b for detailed data word description.

Upon receipt of ACK 1, the requestor sends the remaining three double words of write data to the HPSU in 60 nanosecond intervals.

3.1.5 Read Functions 3.1.5.1. Read Two Words ($02_8$)

The HPSU performs a read operation (Bit 23 of the address presented is ignored) and places a double-word (odd and even words) of read data on the Read Data interface lines.

3.1.5.2. Read Block ($03_8$)

The HPSU performs an eight-word read block operation on block boundaries. The HPSU ignores Address Bits 21, 22 and 23 which are presented with the request to reference an 8 word block and places the lowest address double words on the Read Interface lines. Then, in 60 nanosecond intervals, the HPSU multiplexes the next three consecutive double-words remaining within the 8-word block to the Read Data Interface Lines.

3.1.6. Status Functions 3.1.6.1. Read System Status Register ($04_8$)

The HPSU reads the System Status Register and places the contents on the read data lines. The System Status Register format is shown in FIG. 24. The utilization of each bit field when set to binary one within the System Status Register is as follows:

| Field | Utilization |
|---|---|
| APO | System Status Register represents Application 0 |
| AP1 | System Status Register represents Application 1 |
| AP2 | System Status Register represents Application 2 |
| AP3 | System status Register represents Application 3 |
| LS0-LS1 | 00 - Load source is SSP IPL |
| | 01 - Load source is system panel |
| | 10 - Load source is auto-recovery timer |
| | 11 - Load source is requestor IAR |
| CLP | Current Load Path is 1, Load Path 0 cleared |
| F0-F1 | 01 - Failed on first attempt, loaded on second attempt |
| | 10 - Failed on first and second attempts, loaded on third attempt |
| | 11 - Failed on first, second, and third attempts, loaded on fourth attempt |
| DPC | Dynamic Partitioning change after System Status Register was loaded |
| USC | USC Fault |
| R | A load path is resident in the MSU |
| AR | Unit has Auto Recovery enabled |
| IL | Unit has 4-Bank Interleave enabled. If interleave error, bit will be forced to 0. |

3.1.6.2 Read Bank Status Register ($17_8$)

The HPSU places the contents of the selected Bank Status Register and additional zeros on the requestors read interface lines. Each bank of storage contains four status registers and the request is directed to the selected registers by address bits 19 through 22. Bit 22 selects the pair of status words within a bank. The HPSU Bank Status Register format for single bit errors is shown in FIG. 18. The utilization of each field in the Bank Status Register was discussed in section 7.6 of previous major section F.

3.1.7. Dayclock Functions-IP Only

Figure 25:
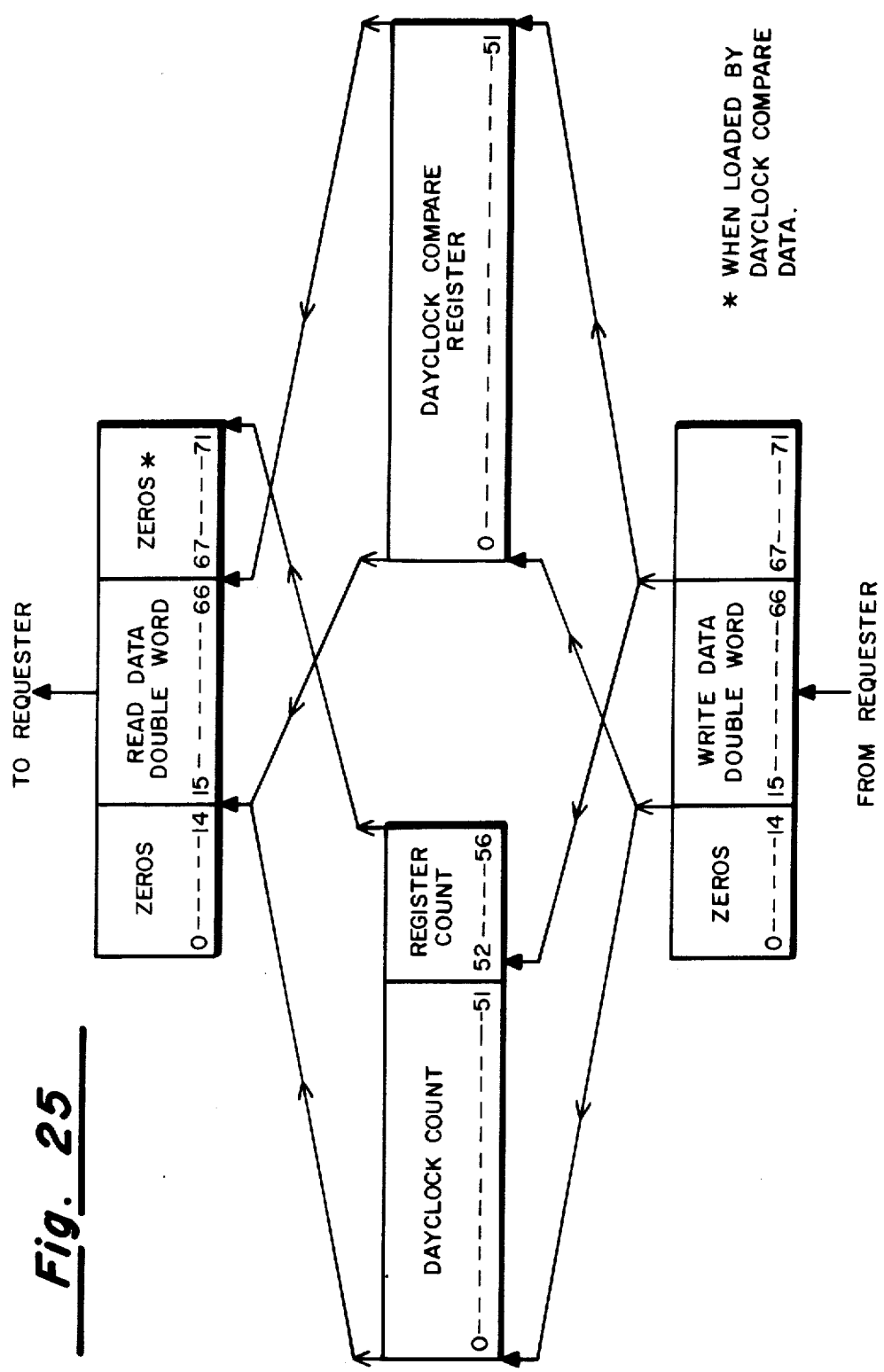
FIG. 25 shows the format of the day clock within the HPSU and the manner of the retrieval of information therein to the IP requestors.

The Dayclock functions provide for reading, loading, and rate selection of the Dayclock and Dayclock Comparator hardware in the HPSU. Data positioning is shown in FIG. 25.

3.1.7.1. Read Dayclock ($05_8$) - Ip Only

The HPSU reads the current value of the Dayclock and places the Dayclock value on the read interface lines.

3.1.7.2. Load Dayclock ($14_8$) - IP Only

The requestor places the Dayclock value to be loaded on the write data lines. The HPSU then stores that value in the Dayclock and proceeds to update from that value.

3.1.7.3. Load Dayclock Comparator ($15_8$) - IP Only

The requestor places the Dayclock Comparator value on the write data lines. The HPSU stores that value in the Comparator and then broadcasts an interrupt whenever the Dayclock value is equal to or greater than the value in the comparator.

3.1.7.4. Select Dayclock Rates

The Dayclock rate may be selected to correct for clock variations. This is accomplished with the three functions: normal, fast, and slow. The function codes are shown below.

3.1.7.4.1. Set Dayclock Mode Normal ($24_8$)

This function sets the normal dayclock rate.

3.1.7.4.2. Set Dayclock Mode Fast ($25_8$)

This function sets the fast dayclock rate.

3.1.7.4.3. Set Dayclock Mode Slow ($26_8$)

This function sets the slow dayclock rate.

3.1.7.4.4. Read Dayclock Comparator ($34_8$)

The HPSU places the value of the comparator on the read data lines in the same locations as received.

3.1.8. Auto Recovery Timer

The HPSU contains an Auto Recovery Timer. This timer monitors the system for hung conditions: i.e., no Reset Auto Recovery Timer (RAT) for seven seconds and if detected, initiates an auto recovery sequence.

3.1.8.1. Select Load Path 0 (SLP 0) ($20_8$)

This function forces the HPSU to select Auto Recovery Path 0 as the active load path.

3.1.8.2. Select Load Path 1 (SLP 1) ($21_8$)

This function forces the HPSU to select Auto Recovery Path 1 as the active load path. Select Load Path 0 or 1 enables the respective auto timer in load path zero or one.

3.1.8.3. Initiate Auto Recovery (IAR) ($22_8$)

This function simulates an immediate expiration of the auto recovery timer which forces an auto recovery Initial Confidence Load Program on the designated load path.

3.1.8.4. Reset Auto Recovery Timer (RAT) ($23_8$)

This function causes the HPSU to clear the auto recovery timer and restart the countdown. RAT functions every 7 seconds are required to prevent an auto recovery sequence from starting. After the initialization by the system support processor, the first RAT function following a select load path 0 or 1 function starts the timer.

3.1.9. Test and Set Functions

The HPSU operation for the test and set function and the test and clear function are identical, except, upon completion bit position 5 (even words) and bit position 41 (odd words), contain a 1 for test and set and a 0 for test and clear. The HPSU places read data on the interface.

3.1.9.1. Test and Set ($06_8$)

The HPSU performs a four word read followed by a partial write operation within a one word boundary. However, the HPSU provides the data to be written. The requestor must insure that the write data lines are stable and parity correct. The HPSU writes 0's into data bits 0 through 4 (even words), 36 through 40 (odd words), and a 1 into data bit 5 (even) or 41 (odd). Data bits 6 through 35 and 42 through 71 are unchanged.

3.1.9.2. Test and Clear ($07_8$)

The HPSU operation is the same as for Test and Set (see 6.3.1.9.1) except that during the write operation 0's are written into data bits 0 through 5 (even words) and 36 through 41 (odd words).

3.1.10. Maintenance and Diagnostic functions 3.1.10.1. Load Error Function Register ($16_8$)

This function loads the Error Function register in each bank pair to control the functions within its bank pair. The maintenance functions become sensitive only if the associated function register bits are enabled. The format of the Error function register is shown in FIG. 26a. The utilization of the bit-fields within the Error Function register is as follows:

Bit 14—Partial Store Internal Check 1—When set, this bit will test read data parity for a partial store when a maintenance read (function 32) is requested (32 adrs to check all ECC circuitry).

Bit 15 Partial Store Internal Check 2—When set, this bit will test the partial store dual parity compare when a maintenance write one word (function 31) is requested (32 adrs to check all ECC circuitry).

Bit 16 Inhibit Interface Check—When set, the HPSU inhibits the Interface Parity Check and allows the parity error to be undetected until it is propagated to the Internal Parity Check. This allows the requestor to test all internal parity through the interface which is similar to testing the interface parity. The HPSU responds to all functions normally except for the Interface Check. (1st level priority (IP,IOP)—Input Stack (SP) or bank.)

Bit 18 SBE Lock—When set, this bit inhibits all SBE reporting.

Bits 19-21 SBE Selective Enable—These bits are active when Bit 25 is set and selectively enables SBE reporting on the 131K boundaries within the bank. (See FIG. 25b (131K boundaries) 16K storage.)

Bit 23 Inhibit Correction—When set, correction on any word in error is inhibited. Error reporting is not affected. (Function 32 and 33 only.)

Bit 24 Inhibit MUE—When set, the HPSU inhibits sending MUEs to the requestor. This bit is set/cleared by the SSP.

Bit 25 Enable SBE—When set, the bits 19-21 are enabled.

Bit 26 Inject Parity—When set, bits 28-32 are enabled to inject a parity error in read data to the requestor. (function 32 and 33 (IP, IOP) function 10(SP)).

Bit 27 Lock Check Bits—When set, the HPSU does not write the check bits for function 31 (maintenance write one word).

Bits 28-32 Parity Error Selector—When set, these bits select the byte in which a parity error occurs to the requestor. Bits 31-32 select the double word on a function 33 and bits 28-30 select the byte for both functions 32 and 33.

The Single Bit Error (SBE) inhibit addressing definitions arising from the SBE Selective Enable, bits 19-21 of the Error Function register, are shown in FIG. 26b.

3.1.10.2. Maintenance Write One Word (31₈)

When the Error Function register bit 15 or 27 is set, the Maintenance Write One Word will cause the HPSU to respond as defined in accordance with the utilization of these bit fields discussed in the previous section 3.1.10.1.

3.1.10.3. Maintenance Read Block (33₈)

When Error Function Register bits 23 or 24 are set, this HPSU function responds as discussed in previous section 3.1.10.1. When Error Function Register bit 26 is set, this function forces a parity error into a read data word during a block read. The byte error is specified by bits 29-30 in the Error Function register. Bits 32 and 28 specify the word in error and bit 31 specifies the bank in error. The fault injected block read operates the same as a block read in all other respects. Reference FIG. 26a and the explanation thereof in section 3.1.10.1. The interpretation of bits 28-32 within the Error Function register is as follows:

| 31 | 32 | 28 | 29 | 30 |        |
|----|----|----|----|----|--------|
| 0  | 0  | Wd 0-1 | 0 | 0 | 0 Byte 0 |
| 0  | 1  | Wd 2-3 | 0 | 0 | 1 Byte 1 |
| 1  | 0  | Wd 4-5 | 0 | 1 | 0 Byte 2 |
| 1  | 1  | Wd 6-7 | 0 | 1 | 1 Byte 3 |
|    |    |        | 1 | 0 | 0 Byte 4 |
|    |    |        | 1 | 0 | 1 Byte 5 |
|    |    |        | 1 | 1 | 0 Byte 6 |
|    |    |        | 1 | 1 | 1 Byte 7 |

3.1.10.4. Maintenance two Word Read (32₈)

When Error Function Register bits 14 or 23 are set, this HPSU function responds as discussed in previous section 3.1.10.1. When Error Function register bit 26 is set, the function of the maintenance two word read is the same as maintenance block read except a two word transfer occurs instead of an eight word block read. The fault injected two word read functions the same as a 2-word read in all other respects. Bit 31-32 of the error function are ignored.

3.2. SP Functions

Function codes (octal notation) for the HPSU are listed in the table of FIG. 11.

3.2.1. Read Four Words (00-0000)

The HPSU reads the four words specified by the address bits 2-21 and places the data on the read data interface.

3.2.2. Write 1-4 Word (00-XXXX)

The HPSU writes one word for each bit set (Master Bits). Any combination of the four words may be write.

3.2.3. Test and Set (01-XXXX)

The HPSU Performs a four word read followed by a partial write for the word specified by the Master Bit (only one bit may be set at one time). 0's are written into data bit positions 0-4, a 1 in bit 5 and data bits 6-35 are unchanged.

3.2.4. Maintenance Read (10-0000)

When bit 26 is set in the Error function register, this function causes the HPSU to inject a parity error into the byte specified by bits 28-30 and bit 32 of the Error Function Register.

3.2.5. Test and Clear (11-XXXX)

The HPSU performs a partial write from the word specified by the master bit (only one bit may be set at one time) 0's are written into data positions 0-5 data bits 6-35 remain unchanged).

H. HPSU BLOCK DIAGRAM

Figure 27B:
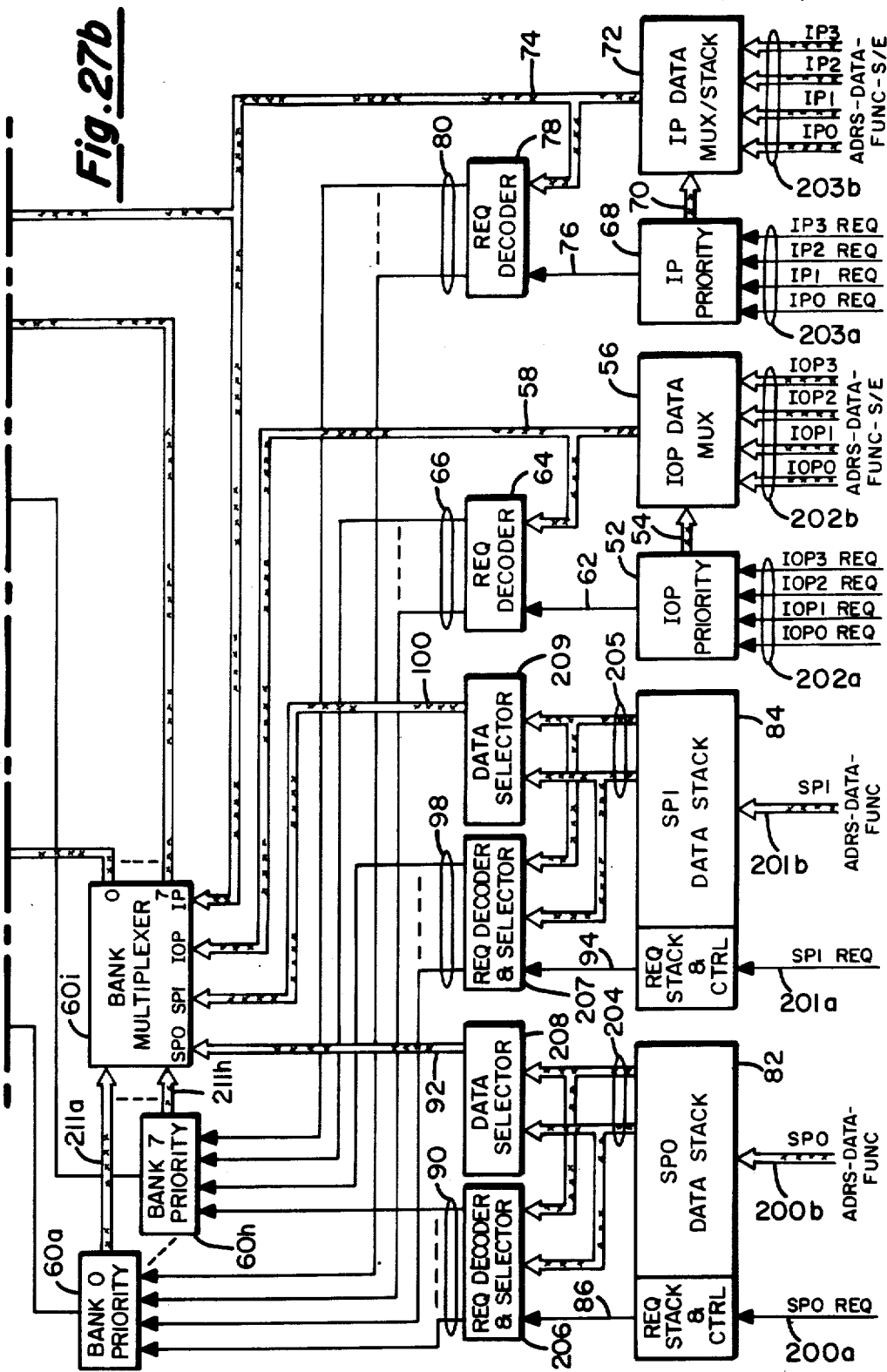
FIG. 27, consisting of FIG. 27a and FIG. 27b, shows a detailed block diagram of the High Performance Storage Unit of the present invention.

The block diagram of the present invention of a High Performance Storage Unit (HPSU) is shown in FIG. 27, consisting of FIG. 27a and FIG. 27b. Elements' identifications shown therein which are less than numerical value 200 may be correlated with the same structures shown in the top-level block diagram of previous FIG. 2. The HPSU supports input and output interfaces to and from ten requestors: from and to Scientific Processor 0 (SP0) respectively across cables 200 and 224, from and to Scientific Procressor 1 (SP1) respectively across cables 201 and 225, from and to four Input Output Processors (IOP 0-IOP 3) respectively across cables 202 and 226, and from and to four Instruction Processors (IP4-IP7) respectively across cables 203 and 227. The HPSU contains eight storage memory banks, STORAGE MEMORY BANK 0 40a through STORAGE MEMORY BANK 7 40h, each containing 512K words for a total of 4M 36-bits words of memory storage. Remaining parts of the HPSU shown in FIG. 27 are the data and control paths, and the logic structure, which does support of the interface of the ten requestors to the eight storage memory banks.

Considering first the data interfaces to the Scientific Processors—the data input from SP0 via cable 200b and output to SP0 via cable 224 plus the data input from SP1 via cable 200b and output to SP1 via cable 225—such interfaces are uniformly four data words in width. Such four data words are transferable, bank priority conflicts and pending requests permitting, at an interface cycle time of 30 nanoseconds. Additionally received upon cables 200b and 201b, respectively from SP0 and SP1, is addressing and function information. There are 144 data lines in cables 200b and 201b plus 16 accompanying parity bits in accordance with FIG. 5b. There are also 6 function/write enable lines plus accompanying 1 parity bit. These 6 lines consists of 2 lines (2 bits) for function and 4 lines (4 bits) for the master word write enables (corresponding to the 4 words) plus 1 accompanying parity line (bit) in accordance with FIGS. 8c and 13 There are also 22 address lines (allowing addressing at the 4-word block boundary) plus 3 parity lines (bits) in accordance with SP address format showing in FIG. 7, the 22 address bits carried thereon allowing addressing at four-word boundaries within the collective storage memory banks, STORAGE MEMORY BANK 0 40a through STORAGE MEMORY BANK 7 40h. The requests of the HPSU by respective SP0 and SP1 is carried on respective interface communication lines 200a and 201a. The output cables 224, 225 carry four words or 144 bits of read data, plus 16 parity bits, in accordance with FIG. 5b.

Continuing in FIG. 27 with the interfaces to the HPSU, the HPSU supports of four "data" interfaces from and to four IOP's, IOP0 through IOP3, on respective cables 202b and 226. The interface to each IOP is two 36-bit words in width. Such two words may be transferred to such IOP's collectively at rates as fast as two words each 120 nanoseconds, and to an individual IOP at a rate of two words per 300 nanoseconds. Such slower rate to an individual IOP exists because of communication times across the interface. There are 72 data lines plus 4 accompanying parity lines in accordance with FIG. 5a in each of the cables 202b as receive communication from each IOP. There are additionally 25 address lines plus an accompanying 3 parity lines in accordance with FIG. 7 within the cables 202b communication path from each IOP. The greater number of address lines (25) upon the IOP ports than upon the SP ports (22) allows of addressing at the word boundaries within the collective storage memory banks. Finally, each IOP interface upon cables 202b carries 5 function lines plus an accompanying 1 parity line in accordance with FIG. 8a, and 12 lines carrying the start/end bits plus an accompanying 2 parity lines in accordance with FIG. 8b. The request signals from each of up to four IOP'3 s are received via a dedicated line for each upon cable 202a. Each of the output cables 226 to each of the four IOP's carries 72 bits of read data, plus accompanying 4 parity bits, on 76 total lines in accordance with FIG. 5a.

Likewise to the interface to the IOP's, the HPSU block diagrammed in FIG. 27 supports of an interface to four Instruction Processors, or IP's: the receipt of data and address and function and start/end information from the IP's which transpires on cable 203b, the receipt of requests from the IP's which transpires on cable 203a, and the issuance of data to the IP's which transpires via cable 227. The width of each data transfer is two words. The rate of data transfer may be as great as eight words per 240 nanoseconds for the IP's collectively during the block read operation thereto. For normal, non-blocked, read, the data transfer rate is identical to the IOP's at two words per 120 nanoseconds collectively. Again, the maximum data transfer rate to a single IP is two words per 300 nanoseconds, the lesser rate being due to the fact that multiple requests are not stacked (as will be seen to be the case for the SP's) and the interfacing time required to transmit an acknowledge from the HPSU to an IP, to process such within an IP, and to transmit a subsequent request to the HPSU. The number of signal lines and accompanying parity lines, within those cables 203a, 203b, and 227 of interface to the four IP's are identical to the numbers of lines within those corresponding cables 202a, 202b, and 226 of interface to the IOP's. In summary, there exists two SP ports each with a width of four data words, four IOP ports each with a width of two data words, and four IP ports each with a width of two data words in data communication between requestors and the HPSU.

Continuing in FIG. 27 with the explanation of the communication path to a Scientific Processor (SP), the data received upon such SP port is stacked in a 9-deep. stack, the SP0 DATA STACK 82 or SP1 DATA STACK 84. Within these 9 locations for stacking data to be written within the HPSU, up to 8 may be filled at any one time with the remaining, 9th, left open. The ninth location is left open to augment performance in accordance with the teaching of U.S. patent application Ser. No. 596,203, filed 4-2-84. Stacking of functions and addresses is also done on the Scientific Processor ports, such stacking as is additionally done in the structures labelled SP0 DATA STACK 82 and SP1 DATA STACK 84. The stacking of functions is in the 9-deep arrangement, but the address stack actually consists of two 4-deep address stacks without a ninth location. Such address stack, as well as the data and function stack, are controlled by the pending requests respectively held eight deep in REQ STACK & CTRL 82 and REQ STACK & CTRL 84 for the respective SP0 and SP1 ports. The splitting of the address stack into two 4-deep halves is made so that the decoding of the address of a next uppermost pending request may be made before an acknowledge is received for that current request which is outstanding, i.e., which has been issued to the memory banks for service thereupon. The mode and manner by which requests, addresses, and data may be stacked in a pipeline in order to expedite the communication thereof from a requestor SP to the HPSU is contained within U.S. patent application Ser. No. 596,203, filed 4-2-84 for a HIGH PERFORMANCE. PIPELINED STACK WITH OVER-WRITE PROTECTION to Michaelson, the contents of which are incorporated herein by reference.

Figure 29A:
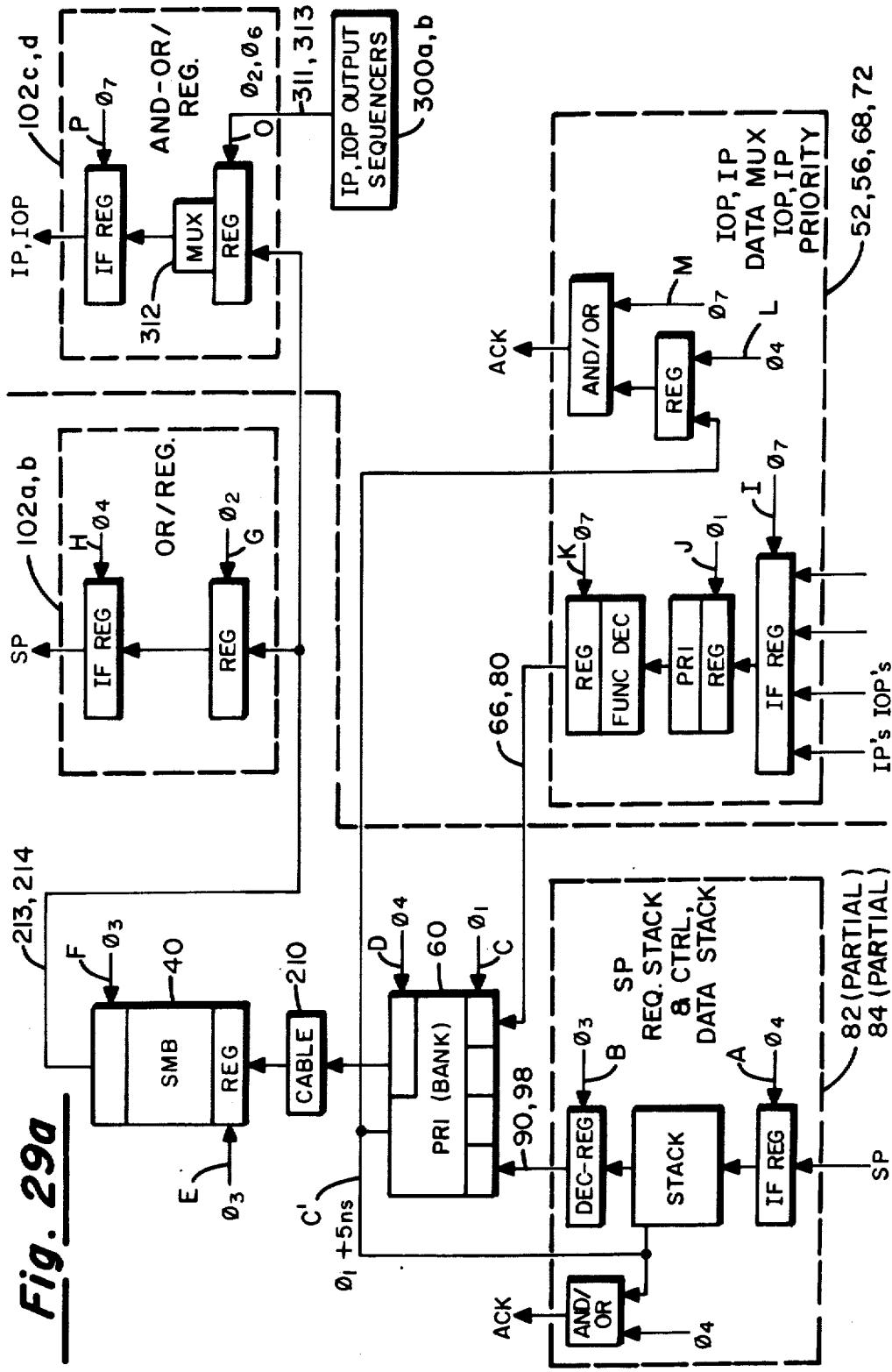
FIG. 29a shows a detailed block diagram of the timing of the HPSU in order that it may interface with requestors of two disparate interface communication cycle times.

Continuing in FIG. 27, and recalling that the up to eight addresses as are stored in each of SP0 DATA STACK 82 and SP1 DATA STACK 84 are split into two half-stacks, called the odd stack and the even stack, so that a performance increase may be registered with the advance translation of such addresses immediately upon the issuance of an acknowledge, such addresses are passed by twos, one address associated with odd stack and called the odd address (although this means nothing as regards the actual location within the storage memory banks to be addressed) and another address associated with the even stack and called the even address, across cables 204 from SP0 Data Stack 82 to REQ DECODER & SELECTOR 86 in the case of SP0 interface, or across the two halves of cable 205 between SP1 DATA STACK 84 and REQ DECODER & SELECTOR 207 in the case of the SP1 interface. The stacked requests of REQ STACK & CTRL 82 for the SP0 interface are also received at the REQ DECODER & SELECTOR 206 via line 86, while the stacked requests of REQ STACK & CTRL 84 for the SP1 interface are received at REQ DECODER & SELECTOR 207 via line 94. The actual address bits received at the REQ DECODER & SELECTORS 206, 207 are four in number: address bits 2, 19, 20, 21 of which bits 2, 20, and 21 are utilized for four-bank interleave (reference FIGS. 15a and 28) and of which bits 19, 20, and 21 are utilized for eight-bank interleave (reference FIGS. 15b and 28). Specifically, those address bits 2, 20, and 21 (or 19, 20 and 21) as are involved in bank selection do allow that the REQ DECODER & SELECTOR 206, 207 do, responsively to a received request, decode one of the selected bank priorities, BANK 0 PRIORITY 60a through BANK 7 PRIORITY 60h, furthering the request only to the one selected bank priority. Immediately upon the decoding and the sending of such request to one of the eight bank priorities, BANK 0 PRIORITY 60a through BANK 7 PRIORITY 60h, another request, and another address, are respectively received from the REQ STACK & CTRL and from the DATA STACK 82, 84 via respective cables 86, 94 and 204, 205 into the REQ DECODER & SELECTOR 206, 207, wherein such next subsequent requests and addresses are immediately decoded prior to the receipt of an acknowledge from the memory banks that such have completed the previous request. Upon receipt of a bank acknowledge (path not shown) from the bank priority selection (as uppermost in priority) of the first-issued request then the REQ DECODER & SELECTORs 206, 207 will issue this second, already decoded request. All stacked requests, and the decode thereof in the REQ DECODER & SELECTOR 206, 207, is on a first-in, first-out basis. The return acknowledge signal from the bank priority, BANK 0 PRIORITY 60a through BANK 7 PRIORITY 60h, to the REQ DECODER & SELECTOR 206, 207, and additionally to REQ DECODER 64, 78, is not shown in the block diagram of FIG. 27 but is shown in FIG. 29a.

Continuing in FIG. 27, in a like manner by which four bits of the address were passed from DATA STACK 82, 84 via cables 204, 205 to REQ DECODER & SELECTOR 206, 207, a remaining 17 address bits, 144 data bits and 6 function bits (plus parity) are passed from DATA STACK 82, 84 via cables 204,205 to DATA SELECTOR 208,209. Each of two paths of width 167 bits plus parity within each of cables 204,205 supports that the data, and the remaining bits of address, associated with a next subsequent requested memory location should become lodged within DATA SELECTOR 208, 209, even prior to the receipt of an acknowledge from the bank priorities, BANK 0 PRIORITY 60a through BANK 7 PRIORITY 60h, which indicates that the memory has acted upon a previous request (path of such return acknowledge not shown in FIG. 27). Similarly to the dual paths between each SP0 DATA STACK 82 and REQ DECODER & SELECTOR 206, and between SP1 DATA STACK 84 and REQ DE-CODER & SELECTOR 207, the dual paths between SP0 DATA STACK 82 and REQ DECODER & SELECTOR 206, and between SP1 DATA STACK 84 and REQ DECODER & SELECTOR 207 support of improved performance due to address pre-decoding. The DATA SELECTORs 208, 209 do supply via respective cables 92, 100, both 144 bits of data, 17 bits of addressing, and 6 bits of function (plus parity) to the respective SP0, SP1 ports of BANK MULTIPLEXOR 60i.

Continuing in FIG. 27, two-word-width interfaces are accorded to each of four input output processors, IOP0 through IOP3, and like two-word-width-interfaces are accorded to each of four Instruction Processors, IP4 through IP7. Upon such interface up to four requests simultaneously arising undergo selection in a first level priority. Requests from IOP0 through IOP3 respectively received as signals IOP0 REQ through IOP3 REQ on cable 202a are selected amongst in IOP PRIORITY 52 to produce a single, highest priority one, request output on line 62. Responsively also to said first-level-priority selected one request, the IOP PRIORITY 52 controls via two multiplexed selection lines 54 the IOP DATA MUX 56 to select amongst data, address, function, and start/end field information received as signals IOP0 ADRS-DATA-FUNC-S/E through IOP3 ADRS-DATA-FUNC-S/E on cable 202b. In a like manner, first-level IP priority 68 does select amongst signals IP4 REQ through IP7 REQ on cable 203a to pass a highest priority one such request via line 76 to REQ DECODER 78. Simultaneously, such IP PRIORITY 68 will control via two multiplexed selection lines 70 the IP DATA MUX/STACK 72 to select amongst the data, address, function and start/end field information received upon four channels as signals IP4 ADRS-DATA-FUNC-S/E through IP7 ADRS-DATAFUNC-S/E on cable 203b. The IP DATA MUX/STACK 72 is to be distinguished from the IOP DATA MUX 56 for incorporating a stack capability in the enablement of the block write function, essentially the receipt of write requests to two consecutive addresses. The stacking of two such addresses in enablement of a block write should not be confused with the 8-deep stacking of requests as occurred upon the SP0 and SP1 channel interfaces. The block write function enables firstly that two words plus two words should be sequentially received upon the interface to an IP performing the block write function and that such will be combined into 4 words transferred at one time to DATA MULTIPLEXER 60i and thence to be written in memory "x", and secondly that another two words plus two words are sequentially received, combined, and written in memory "x+1".

Continuing if FIG. 27, the first-level prioritization of the four IOP ports and the four IP ports in respective IOP PRIORITY 52 and IP PRIORITY 68 is received via respective lines 62, 76 at respective REQ DECODER 64, 78 along with four bits of address via respective cables 58, 74. From the three of such address bits as do provide for bank selection (bits 2, 20, and 21 or bits 19, 20, and 21 shown in FIG. 15 and FIG. 28), each REQ DECODER 64, 78 does activate only one request line of respective cables 66, 80, which one active request line is received at one of the eight bank priorities, BANK 0 PRIORITY 60a through BANK 7 PRIORITY 60h. If two data words, which is the nominal number, are associated with such IOP or IP write requests, then such two data words are emplaced in both the upper two words (word 0 and word 1) and the lower two words (word 2 and word 3) of a four-word field by respective IOP DATA MUX 56 or IP DATA MUX/STACK 72, with the resultant four-word field emplaced on respective cables 58, 74 for transmission to the respective IOP and IP ports of BANK MULTIPLEXER 60i. As will be later seen, communication with the memory stores is at the 4-word-width level being that four words are contained one each within four parallely operative storage modules within each memory bank. Therefore, the alignment of two words within a four-word field is performed immediately at the IOP DATA MUX 56 (in the case of IOP communication) or at the IP DATA MUX/STACK 72 (in the case of IP communication), each memory bank being later controlled in the four storage modules contained therein to selectively write only the upper, or the lower, two words, as the case may be. In a like manner, it is possible for an IOP or an IP to command the writing of but a single word at any location, word 0 through word 3, within the 4-word boundary. Again, the single word will be properly positioned within each 2-word field by the requestor, with the 2-word field further positioned within the 4-word block by the IOP DATA MUX 56 or the IP DATA MUX/ STACK 72. It is the selection control which will later be applied to the storage memory banks which will cause only the appropriate word to be written. Finally, it is possible during a block write operation such as is exercised only by the IP that the IP DATA MUX/STACK 72 should receive, responsively to the block write function code, two successive two-word transmissions of data from an IP, combining both such successive transmissions to be one (word 0 through word 3) four-word block which is emplaced on cable 74 for communication to BANK MULTI-PLEXOR 60i. It should thusly be noted that although the interface to the IOP and to the IP is at a granularity of two words per communication cycle, both cable 58 and cable 74 are four words in width.

Continuing in FIG. 27, it is thusly to be noted that the second-level, or bank, priority in the elements of BANK 0 PRIORITY 60a through BANK 7 PRIORITY 60h does each receive a maximum of four requests to prioritize, which requests are resultant from the SP0 interface via cable 90, from the SP1 interface via cable 98, from the IOP interface via cable 66, and/or from the IP interface via cable 80. Each of the bank priorities, BANK 0 PRIORITY 60a through BANK 7 PRIORITY 60h, does prioritize the four requests received to communicate one such request—SP0 requests being of higher priority than SP1 requests being of higher priority than IOP requests being of higher priority than IP requests—to the associated storage memory bank, respective STORAGE MEMORY BANK 0 40a through BANK 7 40h. Communicated on cables 210a through 210h respectively connecting BANK 0 PRIORITY 60a to STORAGE MEMORY BANK 0 40a through BANK 7 priority 60h to BANK 7 40h are four enabling signals which do enable the respective four storage modules within each memory bank enables the selection of all four words (word 0 through word 3), the upper two words (word 0 and word 1), the lower two words (word 2 and word 3), or a single word (word 0 or word 1 or word 2 or word 3) to be written within the respective four storage modules of each memory bank. This word addressing enablement is derived from the least significant two bits, bit 22 and bit 23, of those five bits of addressing information initially received at REQ DECODER & SELECTOR 206, 207 or REQ DECODER 64, 78. Thus by addressing proceeding from the request decoders and the bank priority are individual words (of four such) selected within each of the memory banks (eight such).

The bank priorities, BANK 0 PRIORITY 60a through BANK 7 PRIORITY 60h, just discussed as receiving request signals plus two bits of addressing information also perform a pretranslation of the function codes which direct the ultimate full and partial word reads and writes, and the test-and-set and test-and-clear functions, of the storage memory banks, STORAGE MEMORY BANK 0 40a through STORAGE MEMORY BANK 7 40h. Such pre-translation transforms the 5-bit function code (plus associated parity) from IP or IOP ports or the 6-bit function code (plus associated parity) from an SP port which is associated with the request now prioritized (reference FIGS. 8b and 8c), plus the start and end fields each of 6 bits (plus associated parity) associated with such functions upon the IP or IOP ports, into a uniform format substantially in accordance with FIG. 13. Now the storage memory banks could be charged with directly receiving, translating, and acting upon the entire functions shown in the table of FIG. 11 which deal with such storage memory banks (i.e., excluding functions dealing with the day-clock, system status register, error function register, etc.). The simple functions that the storage memory modules perform are well known in the art and beyond the teaching of this application. All necessary function code and start/end fields for the accomplishment of such functions could be specified to be routed only along with data and address from the various ports and through the BANK MULTIPLEXER 60i to the storage memory banks. However, the apparatus of the present invention saves a small amount of time in each exercise of a storage memory module by doing some of that function translation which might normally be associated with such modules within the bank priorities, BANK 0 PRIORITY 60a through BANK 7 PRIORITY 60h. Thus the bank priorities might have been called bank priority and control. The path by which the bank priorities, BANK 0 PRIORITY 60a through BANK 7 PRIORITY 60h, do receive 5 or 6 bits of function code (plus associated parity bit) and 12 bits df start/end field is not shown in FIG. 27, although, as could be imagined, such a path is substantially identical to that proceeding through REQ DECODERs 206, 207, 64, and 78 via respective cables 90, 98, 66, and 80 to BANK 0 PRIORITY 60a through BANK 7 PRIORITY 60h. Similarily, the lines of control substantially in conformance with the format of FIG. 13 which proceed from BANK 0 PRIORITY 60a through BANK 7 PRIORITY 60h to respective STORAGE MEMORY BANK 0 40a through STORAGE MEMORY BANK 7 40h are not specifically shown in FIG. 27, although these lines are parallel to cables 210a through 210h. Again, that a pre-translation function has been moved outside the storage memory banks to be accomplished upon an earlier stage in the pipeline is purely a design decision of significance only in that a routineer in the art of digital memory design should be attentive to such an option in the creation of well-balanced pipeline stages in the implementation of a very high performance memory.

Considering the prioritization function discussed within the second preceding paragraph, it is to be noted that the bank priorities, BANK 0 PRIORITY 60a through BANK 7 PRIORITY 60h, do receive of but four request inputs because four IOP ports have been previously prioritized into one signal by IOP PRIORITY 52 while four IP ports have been previously prioritized into one signal by IP priority 68. The number of requests which are prioritized by a priority network positively correlates with the required operational time of such a network. In other words, the time needed to decode a 1 of N priority increases as N increases. Consequently, that the bank priorities need prioritize only four requests allows such to operate faster than if such were to prioritize amongst the total ten ports (two SP's, four IOP's, and four IP's) upon which the HPSU communicates. Furthermore, it is to be noted that requests arising from the SP's are directly routed to the bank priorities, with only the competing requests of the IOP's and IP's going through a first-level priority determination. Consequently, the priority scheme of the present HPSU may be considered a 2-level priority scheme, the purpose of which is to optimize performance to two SP requestor ports, while simultaneously supporting access by a large number of additional requestors (four+four) on two ports. Further function of the 2-level priority determination of the present invention is described in U.S. patent application Ser. No. 596,206, filed 4-2-84 for MULTILEVEL PRIORITY SYSTEM to Scheunemaan, et al., the contents of which are incorporated herein by reference.

Continuing in FIG. 27, the BANK MULTIPLEXOR 60i receives four words of data plus 17 bits of address (plus parity) upon each of four portals: those to SP0, SP1, IOP, and IP. The four words of data received on each portal is directed to a storage memory bank, STORAGE MEMORY BANK 0 40a through STORAGE MEMORY BANK 7 40h, under the multiplex selection control respectively received from BANK 0 PRIORITY 60a through BANK 7 PRIORITY 60h on respective cables 211a through 211h. Such data will be written (in the case of a write function) into the storage memory banks, STORAGE MEMORY BANK 0 40a through STORAGE MEMORY BANK 7 40h, by four words, or by two words, or by single word under the control of word selection received from respective BANK 0 PRIORITY 60a through BANK 7 PRIORITY 60h via respective cables 210a through 210h. The addresses received into BANK MULTIPLEXOR 60i through portals SP0, SP1, IOP, and IP—which addresses are 17 bits in length and sufficient therefore to address any four word boundary within each of the storage memory banks which do each contain 512K words—are likewise gated to memory banks, STORAGE MEMORY BANK 0 40a through STORAGE MEMORY BANK 7 40h, via respective cables 212a through 212h also under the gating control of signals arising at BANK 0 PRIORITY 60a through BANK 7 PRIORITY 60h which connect to such BANK MULTIPLEXOR 60i via cables 211a through 211h. It should be recognized that the 4-word width data and accompanying address which is being gated through BANK MULTIPLEXOR 60i from the SP0, SP1, IOP, and IP under the control of the bank priorities BANK 0 PRIORITY 60a through BANK 7 PRIORITY 60h is all being gated simultaneously. The bank priorities, BANK 0 PRIORITY 60a through BANK 7 PRIORITY 60h, resolve competing requests from multiples of the SP0, SP1, IOP, and IP requestors so that the request of SP0 is gated before the request of SP1 is gated before the request of IOP is gated before the request of IP. The maximum number of storage memory banks, STORAGE MEMORY BANK 0 40a through STORAGE MEMORY BANK 7 40h, which may be simultaneously activated responsively to the four gatings of 4-word-wide data plus accompanying address through the BANK MULTIPLEXOR 60i is actually 5, and not 4. Five of the storage memory banks may be activated only upon the non conflicting requests to such from SP0, SP1, the highest priority IOP, and a highest priority IP which is also performing the block read operation. All eight storage memory banks, which have a 90 nanosecond cycle time, may be simultaneously active from having been activated upon successive 30 nanosecond periods (reference FIG. 29 and associated text).

Continuing in FIG. 27, and returning to the manner of granting priority in order that timing may be first discussed, it should be known that upon the granting of bank priority by BANK 0 PRIORITY 60a through BANK 7 PRIORITY 60h an acknowledge signal is returned, via paths not shown, to the respective one of the ports which did give rise to that request now gated in bank priority. Such acknowledge(s) is (are) returned either to REQ STACK & CTRL 82, to REQ STACK & CTRL 84, to IOP PRIORITY 52, and/or to IP PRIORIIY 68 to inform such that a request has been gated to the appropriate memory bank, and that the requestor may be acknowledged and another subsequent request obtained therefrom. In the case of the SP0 and SP1 interface ports, such next subsequent request from the SP goes on the 8-deep request stacks. Also responsively to such acknowledge, the SP0 DATA STACK 82, the SP1 DATA STACK 84, the IOP DATA MUX 56, and the IP DATA MUX/STACK 72 will be controlled by the associated request logic to no longer hold the current data and address upon the paths to BANK MULTIPLEXOR 60i, but rather to emplace the next subsequent data and address upon such paths. Finally, the return of this bank priority acknowledge to a port the request from which gave rise to same, for example, the return of an acknowledge from BANK 0 PRIORITY 60a to the REQ STACK & CTRL and SP0 DATA STACK 82, does allow of the issuance of further, subsequent, requests. In the case of the SP ports, such subsequent requests responsive to such acknowledges will issue off the stacks of the SP ports at a period of 30 nanoseconds. The continued communication of each such acknowledge, across long cables, to the requestor, the processing of such acknowledge within a requestor, and the return responsively to such acknowledge of a further request is at a timing such that if five successive such requests are stacked, as is exceeded by the 8-deep request stacks for the SP0 and SP1 ports, then such request stacks will not be empty (repetitive SP requests ensuing) even should successive requests be honored from such stacks at a rate of 30 nanoseconds. In attainment of this fastest, 30 nanoseconds, response time to consecutive requests it should be known that each of the storage memory banks, STORAGE MEMORY BANK 0 40a through STORAGE MEMORY BANK 7 40h, has a 90 nanosecond cycle time. Therefore, consecutive requests need reference successive (as will be the case when addressing is incrementally increasing by four (reference FIG. 15)), or at least different, ones of the storage memory banks upon each of up to three consecutive subsequent requests if the fastest, 30 nanoseconds, operational rate is to be obtained.

The manner of the prioritized requesting and addressing of eight memory banks, STORAGE MEMORY BANK 0 40a through STORAGE MEMORY BANK 7 40h, having been preliminarily seen in FIG. 27, a further statement upon the time performance of the HPSU is possible. Each of the eight memory banks, STORAGE MEMORY BANK 0 40a through STORAGE MEMORY BANK 7 40h, can each read or write four words each 90 nanoseconds. The total bandpass of all eight such memory modules is thusly 355.55 megawords per second, or 12.8 gigabits per second. When indexing (normally consecutively) through successive ones of the memory banks, each of the SP0 and SP1 data ports can support the reading and/or writing of four words each 30 nanoseconds. This is equivalent to a bandwidth of 133.33 megawords per second for each such port, or 9.6 gigabits per second for both such ports combined. The bandpass to the IOP's, collectively, is in respect of the concurrency of pending requests from plural IOP's, and the time which it takes to communicate the acknowledge of each such request back to the associated IOP and receive, responsively thereto, a next subsequent request. Such numbers of IOP's and times of interface communication limits reading and writing on the collective IOP ports to two words per 120 nanoseconds, or 16.66 megawords per second, or 600 megabits per second. The collective ports of communication to the IP's would exhibit like performance, save only that the block read mode, supported only to the IP's, does enable of the transfer of eight words every 240 nanoseconds, which is equal to 33.33 megawords per second, which is equal to 1.2 gigabits per second for the 36-bit words of the present invention. The total bandpass of the HPSU actually utilizable is thusly 133.33 megawords per second to each of two SP ports, 16.66 megawords per second to the ports of the IOP's collectively, and 33.33 megawords per second to the ports of the IP's collectively; a total 316.66 megawords per second, or 11.4 gigabits per second. The design accommodation visible in FIG. 27 which makes such high performance possible are as follows. The memory is 8-way interleaved: each of the storage memory banks, STORAGE MEMORY BANK 0 40a through STORAGE MEMORY BANK 7 40h, is independently addressable and simultaneously operatable. There is a request (and data and address and function) stack for each of the highest performance SP ports. Such stacks, holding requests 8-deep in the present invention, are primarily useful to requestors which do make ordered references to vast amounts of data, and which do make references to instructions and particularly to branching address references proceeding from such instructions much more seldomly. Such is the nature of array, or vector, processors such as are the SP's supported by the HPSU. Finally, if a large number of requestors, ten in the case of the present invention, are to be granted parallel access to the common memory stores, then it is of utility that the priority determination amongst such should be accomplished at minimum delay to the highest priority, highest speed, channels. This is accomplished in the HPSU shown in the block diagram of FIG. 27 by a 2-level priority determination: a first-level priority determination amongst four IOP's in IOP PRIORITY 52 and amongst four IP's in IP PRIORITY 68, with a second-level, bank, priority determination amongst two SP's, the prioritized IOP, and the prioritized IP in the bank priorities, BANK 0 PRIORITY 60a through BANK 7 PRIORITY 60h. An "odd" address and "even" address pipeline scheme is also employed in bringing the requests and addresses from the stacks of such upon the SP ports expeditiously to the bank priorities. It may thus be realized, parallelism and multiplicity of other resource such as the storage memory banks permitting, that the performance of the present invention to read and to write data each 30 nanoseconds is essentially based on the performance of the priority network, which performance at a 30 nanoseconds pipelined cycle time to two high-speed SP ports is the more remarkable for also according prioritized service to four IOP's and four IP's.

Continuing in FIG. 27, each of the STORAGE MEMORY BANK 0 40a through STORAGE MEMORY BANK 7 40h memory stores contains 512K 36 bit words plus associated parity and error correction code bits. Each of the storage memory banks, STORAGE MEMORY BANK 0 40a through STORAGE MEMORY BANK 7 40h, receives four words (144 bits) of data plus 17 bits of address from the BANK MULTIPLEXER 60i via respective buses 212a–h. Five bits of function code are received from respective bank priority. Each of the memory storage banks, BANK 0 40a through BANK 7 40h, has four output ports—SP0, SP1, IOP, and IP output ports each of which output ports is four words wide. Each of the storage memory banks, STORAGE MEMORY BANK 0 40a through STORAGE MEMORY BANK 7 40h, receives 4 control bits from respective BANK 0 PRIORITY 60a through BANK 7 PRIORITY 60h via respective cables 210a through 210h, which 4 control lines code direct the storage memory bank to read or write data to designated one(s) only of the four parallel storage modules combined within each storage memory bank. The internal organization of each of the storage memory banks, STORAGE MEMORY BANK 0 40a through STORAGE MEMORY BANK 7 40h, is as illustrated within FIG. 28b. Referencing such FIG. 28b, four storage modules, designated WORD 0, WORD 1, WORD 2, and WORD 3 storage modules, each containing 131K 36-bit words plus associated parity and error correction bits, are contained within each of the storage memory banks. The entire storage memory bank bit is addressed upon a four-word boundary, and each of the STORAGE MODULEs WORD 0 through WORD 3 therein enabled for the storage of an associated one of the four data words, WD1 to WD4, received from the BANK MULTIPLEXOR 60i. In accordance with the type of function being exercised upon the storage memory bank, the signals received from the bank priority will enable that either all four words, the upper two words (WORD 0 and WORD 1), the lower two words (WORD 2 and WORD 3), or an individual one (WORD 0 through WORD 3) of the STORAGE MODULEs will be written with data during a single write operation. The ports labelled SP0, SP1, IOP, and IP occurring on each of the STORAGE MODULEs, WORD 0 through WORD 3, are one data word in width, the combination of four such of each type as appear on STORAGE MODULEs WORD 0 through WORD 3 combining to form the total four-word wide data buses of respective type SP0, SP1, IOP, and IP which are illustrated to be the four output ports of each of the storage memory modules shown in FIG. 27. Further explanation of FIG. 28b is given in related U.S. patent application Ser. No. 596,214, filed 4-2-84 the contents of which are incorporated by reference.

Continuing in FIG. 27, the manner of communication from the storage memory banks, STORAGE MEMORY BANK 0 40a through STORAGE MEMORY BANK 7 40h, to those registers 102a through 102d which registers provide the final output communication from the HPSU to ten requestors of three types, is accomplished by a combination of wired-OR and logical OR selection and enablement of communication interconnection. Commencing with the interface from the four-word wide SP0 port of each of the four memory storage banks to the OR/REG 102a which is the final register and driver interface to bus 204 communicating at a four-word wide data width to SP0, such interface may be observed to be composed of buses 213a and 213b. The SP0 output ports of the zeroeth, second, fourth, and sixth storage memory banks, STORAGE MEMORY BANK 0 40a, STORAGE MEMORY BANK 2 40c, STORAGE MEMORY BANK 4 40e, and STORAGE MEMORY BANK 6 40g, are wired-OR into the single four-word wide bus 213a. Likewise, the SP0 data output port of banks 1, 3, 5, and 7—STOR- AGE MEMORY BANK 1, 40b, STORAGE MEMORY BANK 3 40d, STORAGE MEMORY BANK 5 40f, and STORAGE MEMORY BANK 7 40h—are wired-OR into the single four-word wide data bus 213b. The OR/REG 102a for the SP0 interface to the HPSU will receive a gated enablement signal on one (only) of such buses 213a and 213b, which enablement signal is produced in that one only (if any) of the storage memory banks which is reading data to the SP0 port, in order by such enablement signal to gate the appropriate bus, and four-word wide data quantity received thereupon, into OR/REG 102a. It should be recalled that due to the function of the bank priorities, BANK 0 PRIORITY 60a through BANK 7 PRIORITY 60h, one only of the storage memory banks, STORAGE MEMORY BANK 0 40a through STORAGE MEMORY BANK 7 40h, will be reading a four-word data quantity to the SP0 port at any one time. Thusly, all eight storage memory banks could have been wired-OR in the SP0 port outputs thereof because one only of such storage memory banks are active at any one time. Such totally wired-OR interconnection would be similar to the manner by which such storage memory banks are currently wired-OR by even and odd paths. The reason why a wired-OR interconnect is utilized between four only storage memory banks, and the two wired-OR bus interconnects thereby created between eight banks are then further gated by logical OR means within output registers, is that the physical length of interconnect, and characteristic load impedances, of these buses and of the elements connected thereto dictate that the mode and manner of interconnect should be substantially as shown in economical support of high performance. In point of fact, the OR/REG 102a is physically located midway between the even storage memory banks and the odd storage memory banks, the illustrated combination of two wired-OR buses communicative thereto thereby offering minimum signal communication time if, as is the case, the logical OR function between such two buses 213a and 213b is accomplished within OR/REG 102a at a shorter time than the signal transmission across the finite physical width, and finite impedance, of four storage memory modules. In other words, and in consideration that the HPSU stores 4M 36-bit words, what is under consideration in the area of electrical communication from the storage memory banks, necessarily of physical size, which store such 4M data words to those singular output ports which will communicate four words with a total HPSU pipeline latency (read access time) as low as 240 nanoseconds (although such time obviously includes more than just the time of communication from the storage memory banks to the output registers) is a method of, and apparatus for, wired-OR connection in combination with logic OR selection for, and, in support of, high performance. This high performance communication will transpire in 22.5 nanoseconds, as may be observed by reference to the timing diagram shown in FIG. 29a. A more complete explanation of the utility of wired-OR interconnection between storage memory modules and output registers, which wired-or interconnection is made possible only because each storage memory module does have multiple output ports, and because between all such storage memory modules only one such will emplace read data upon any one port at any one time, is contained in U.S. patent application Ser. No. 596,214, filed 4-2-84 for MULTIPLE OUTPUT PORT STORAGE MODULE to Scheuneman, et al., the contents of which are incorporated herein by reference.

Continuing in FIG. 27 with the explanation of that interconnection structure which is, in aggregate, supportive of the transfer of 11.4 gigabits per second from the storage memory banks, STORAGE MEMORY BANK 0 40a through STORAGE MEMORY BANK 7 40h, to the communication output registers, REGISTERs 102a through 102d, the communication between the SP1 output port of each of the eight storage memory banks to the OR/REG 102b, which is the interface register via four-word wide bus 205 to SP1, is accomplished identically to the manner of communication with SP0 just described. Communication between the IP ports of each of the storage memory banks, STORAGE MEMORY BANK 0 40a through STORAGE MEMORY BANK 7 40h, to the AND/OR/STACK/REG 102d, and communication between the IOP port of each of the storage memory banks and the AND-OR/REG 102c is for each likewise but a combination of two wired-OR buses, one of which is connected to the even ones and one of which is connected to the odd ones of the storage memory banks. Each of the buses is further illustrated, however, to be split into a lower and into an upper half, such as is most readily apparent in illustration of lower half buses 214a1 and 214b1, and in the illustration of upper half buses 214a2 and 214b2, in the connection of the IP port of the storage memory banks to AND-OR-STACK/ REG 102d. The lower half bus carries the two words, WORD 0 and WORD 1, which are output of the respective two STORAGE MODULEs of each storage memory bank, whereas the upper half bus carries the two words, WORD 2 and WORD 3, which are outputs of the remaining two STORAGE MODULEs of each storage memory bank (reference FIG. 28b). Recall that upon a normal, two-word read to either an IP or an IOP only the WORD 0-WORD 1, or the WORD 2-WORD 3 pair of the STORAGE MODULEs will be enabled, in accordance with the function code received by and interpreted within each of the storage memory banks, for output. Since during a two-word read operation to an IP as controlled by the bank priority, BANK 0 PRIORITY 60a through BANK 7 PRIORITY, only one of the storage memory banks, STORAGE MEMORY BANK 0 40a through STORAGE MEMORY BANK 7 40h, will be reading to an IP at any one time, then one only of the paths 214a1, 214a2, 214b1, and 214b2 will contain valid read information at any one time. Signals passed from the storage memory bank which is emplacing data validly readable to an IP upon one of these communication paths will be transferred to the AND-OR-STACK/REG 102d in accompaniment to another signal upon bus 214 which will cause such register to gate the appropriate path to fill that 2-word register which will be ouput to an IP. The AND-OR-STACK/REG 102d also receives additional information (resultantly from the acknowledgement by the bank priorities) from IP PRIORITY 60a, which information does permit of the selection of communication with the proper IP, IP4 through IP7. Communication of data from the storage memory banks to the AND-OR/REG 102c and subsequent communication to a selected one of IOP0 through IOP3 across buses 206 transpires in an equivalent manner. The manner of this selection of a two-word data bus path and of the gating of such to an appropriate one of four requestors is further discussed in section J of this specification disclosure.

Continuing in FIG. 27, there is additional support in the interconnection between the storage memory banks, STORAGE MEMORY BANK 0 40a through STORAGE MEMORY BANK 7 40h, and the AND-OR-STACK/REG 102d (which is the output register to the IP's) by lower buses 214a1, 214b1 and by upper buses 214a2, 214b2 for the special block read function which is capable of being performed (only) to an IP port. During the block read function, two of the storage memory banks are twice simultaneously operative to respectively twice produce a WORD 0-WORD 1 pair and WORD 2-WORD 3 pair in joint constitution of a eight-word data quantity to be read to an IP. Such a eight-word quantity is transmitted by four words upon bus 214a1 and 214b1, and by remaining four words upon bus 214a2 and 214b2, from the selected two memory banks to the AND-OR-STACK/REG 102d. It is because of this function that the word "STACK" appears within the title of AND OR-STACK/REG 102d: the eight words being held in a stack prior to their issuance, most significant word pair first, by two-word pairs to that IP performing the block read function.

Additionally appearing in FIG. 27 are DC & COMPARE 215 referring to dayclock and comparison circuitry, AUTO TIMER 216 and SYS STATUS 217 which represent additional, miscellaneous functions enabled within the memory. The dayclock and auto timer are loaded from the IP, and show a communication path from such by IP DATA MUX/STACK 72 via bus 74. Additionally, the dayclock of D.C. & COMPARE 215 and the system status register of SYS STATUS 217 may be selectively addressably read to the AND-OR-STACK/REG 102d via respective buses 218 and 219, and then output to the IP interrogating such. These miscellaneous functions, although noted for the sake of completeness, are not integral to the function of the present invention.

In general, from the study of the block diagram of FIG. 27, it should be considered that a very large scale memory is shown therein which is composed of a number of logic structures, which logic structures arranged in a particular interconnection and upon particular levels and with particular cooperative interrelationship, which are routine of implementation to a practitioner in the art of digital memory design. The primary difficulties in the implementation of the structure of FIG. 27 by a routineer in art from prior art logic structures, such as priority networks and memories capable of storing data, are twofold. First, if it is recognized that the interface cycle time of synchronous communication to the SP's is not equivalent to the interface cycle time of synchronous communication with the IOP's and IP's, and that moreover such latter interface cycle time is not an integral fraction of the read/write cycle time of the storage memory banks, then the consideration of how to time the logic structures shown in FIG. 27 for synchronous communication with two general classes of requestors (the SP's versus the IOP's and IP's), each of which does communicate at a different interface cycle times, requires further teaching. Second, although internal data paths within the HPSU short of the actual two-word wide interface ports to the IOP's and IP's are uniformly four words in width, the controlled enablement of these data paths so that two-word quantities can be moved interchangeably with four-word quantities, and a two-word width interface supported additionally to a four-word width interface, is deserving of further teaching. These further teachings particularly directed to the timing of the HPSU in support of its response to requestors of differing interface cycle times, and of the data paths of the HPSU in support of its response to requestors of differing interface bit-widths (word-widths), are contained within the next two sections of this specification disclosure.

I. TIMING OF THE HPSU IN SUPPORT OF RESPONSE TO REQUESTORS OF DIFFERING INTERFACE COMMUNICATION CYCLE TIMES

The present invention of a High Performance Storage Unit, the block diagram of which was seen in FIG. 27, supports of the synchronous communication to requestors of, and at, two different interface cycle times. Specifically, the present invention communicates to one type of requestor, called a Scientific Processor or SP, at a pipelined interface communication cycle time of 30 nanoseconds (within which interface communication cycle four 36-bit data words may be transferred). The present invention also supports synchronous communication with requestors of a second interface cycle time, requestors identified either as instruction processors or IP's or as input output processors or IOP's, which second interface cycle time is 60 nanoseconds (during each of which two 36-bit data words may be transferred). That these two cycle times are in integral relationship to each other (i.e., 2:1) is irrelevant: the only requirement being that there should be a common interval, or clock base, which divides integrally into both such cycle periods. In the present invention, this clock space interval is 7.5 nanoseconds, of which there are four such intervals, or a four-phase clock, in support of the 30 nanosecond interface cycle time and of which there are eight such, or an eight-phase clock, in support of the 60 nanosecond cycle time interface. Considering this basic interval clock base, for example, to be the 7.5 nanosecond of the present invention, the following teaching will suffice, for example, to teach the manner by which interface communication cycle time might established at 52.5 nanoseconds.

Although it is only incidental to the present invention that the two interface cycle times (60 nanoseconds and 30 nanoseconds) supported are in integral relationship (2:1), it is of greater significance that any HPSU internal function commonly exercised by the requestors of two different interface cycle times, such as the internal read/write cycle time of the storage memory bank is, and can be by definition, in fixed time relationship to one only of the two interface cycle times. The HPSU internal functions are timed by a clock relational to its fastest interface, ergo a four-phase 30 nanosecond clock. (Conversely, it could be said that a 30 nanosecond interface cycle time can exist only because there is an HPSU clock to support such.) Consider, for example, the read/write function of the storage memory banks relative to the four-phase 30 nanosecond clock. Both the read/write cycle time and the access time of the storage memory banks are longer than 30 nanoseconds, ergo in a pipelined organization of the HPSU at a 30 nanosecond period both such read/write cycle time and such access time must be multiples of such 30 nanosecond period. This is indeed the case: the read/write cycle time of 90 nanoseconds is in 3:1 integral relationship with the 30 nanosecond pipelined HPSU cycle time which is the faster (SP) interface communication cycle time, and the access time of 120 nanoseconds is in 4:1 integral relationship with the 30 nanosecond interface communication cycle time. Most importantly for recognition of the timing complexities solved by the present invention, it should be noted that the initiation (upon availability after each 90 nanosecond read/write cycle time) of any storage memory bank is always at the same phase (actually $\phi 3$) of the four-phase 30 nanosecond clock, and the gating of read data from such storage memory bank (120 nanoseconds later) will also be always at the same phase ($\phi 3$) of the four-phase 30 nanosecond clock.

Now consider the interaction of a second, 60 nanosecond cycle time, communication interface with the functions, such as the internal read/write cycle time of the storage memory banks, of the HPSU exercised of fixed times (phases) relative to the 30 nanosecond clock cycle. It is obvious that HPSU internal functions, such as the read/write cycle time of the storage memory banks, if uniformly initiated relative to the faster, 30 nanosecond, clock cycle (and the next two paragraphs will explain that not to do so is inefficient) will not always occur at the same time, meaning clock phase, relative to the 60 nanosecond interface communication cycle time. For example, the phase of the four-phase 30 nanosecond clock which both gates initiation of the storage memory banks and the gating of read data therefrom (shown respectively as signals E and F in FIG. 29a) can occur at either $\phi 3$ or $\phi 7$ of the eight-phase 60 nanosecond clock, as may be visualized by momentary reference to FIG. 29b. Now there is no appreciable problem to synchronizing a request occurring (from an IP or an IOP) upon the slower, 60 nanosecond interface cycle time, communications interface with the faster 30 nanosecond pipelined cycle time of the storage memory banks. But there is a problem in resynchronizing the data read of such storage memory banks with such a slower, 60 nanosecond interface cycle time, communications interface. Incidentally, this problem arises even should such slower interface cycle time be in an integral relationship to the read/write cycle time of the storage memory banks (60 nanoseconds not being in an integral relationship to 90 nanoseconds). The reader may consider the relationship between the phases of a four-phase 30 nanosecond clock and all corresponding phases of a co-incident twelve-phase 90 nanosecond clock, or of a six-phase 45 nanosecond clock, or of a five-phase 52.5 nanosecond clock in order to discern that resynchronization must always occur for simultaneous operation at two different interface communication cycle times.

The relationship between the second interface cycle time (60 nanoseconds) and the read/write cycle time (90 nanoseconds) of the present invention as being either integral or non-integral is not the essential criteria of the present invention: the essential criteria is the resynchronization required on a second interface when HPSU activities, such as reading and writing of storage memory units, are timed relative to the different cycle time of another communications interface. But the interesting fact that the 90 nanosecond read/write cycle time happens to be in a non-integral relationship with the 60 nanosecond interface cycle time does give an interesting insight into prior art approaches. In such prior art, proceeding from such a non-integral relationship, the latency between the initiation of the read/write operation upon a storage memory bank and the communication of the results thereof such operation would be at that next integral cycle time period greater than the read/write cycle time. That is, for regular initiation of a single storage memory bank of read/write cycle time equaling 90 nanoseconds, the results thereof could be communicated across an interface of 60 nanosecond cycle time at intervals of 120 nanoseconds, thereby creating a wait, or dead, time of 30 nanoseconds. The prior art would probably then establish the read/write cycle time of the storage memories at 120 nanoseconds, thereby allowing such storage memories to deliver read data results each four interface communication cycle times of a 30 nanosecond interface, or each two interface communication cycle times of a 60 nanosecond interface. The present invention rejects this approach which is inefficient of utilization of the storage memory resource to the requestor(s) of the faster (30 nanosecond) interface communication cycle time.

In contrast to such probable prior art approaches, the present invention is strongly concerned with how the uneliminatable existence of a wait, or dead time, in allowing the communication of requests and resultantly obtained data from storage memory modules of one cycle time (i.e., 90 nanoseconds) across an interface the cycle time of which (60 nanoseconds) is not an integral multiple of such read/write cycle time, should be accomplished without affecting the 100% duty cycle utilization of such storage memory modules by another, parallel, interface which is, by virtue of operating at an interface cycle time which is an integral multiple of such memory storage module read/write cycle time, capable of continuously utilizing such storage memory modules without wait, or dead, time. Specifically, the present invention rejects any implementation wherein the storage memory banks should be requested only at such interval, greater than the read/write cycle time of such storage memory resource, which is an integral multiple of the cycle times of all interfaces to the HPSU. Such a rejected approach would, in the apparatus of the present invention, mean that the storage memory resource therein should incur a read/write cycle only each 120 nanoseconds, thereby wasting one-third of the potential of such storage memory resource when, as is the case, the actually attainable physical cycle time of such storage memory resource is 90 nanoseconds. Instead, the present invention utilizes a method and an implementing apparatus of such method whereby the storage memory resource is operated at its minimum read/write cycle time (90 nanoseconds) while plural synchronous requestor interfaces should also be operated at respective interface cycle times which are different (e.g., 30 nanoseconds and 60 nanoseconds), and also wherein at least one of such different interface cycle times may not be an integral fraction or multiple of such read/write cycle time (e.g., 60 nanoseconds is not an integral fraction of 90 nanoseconds).

Although it is illustrative to contrast the present invention with the probable prior art approach to management of two differing interface communication cycle times, such concerns involving integral and non-integral relationships between the interface communication cycle time(s) and the storage memory read/write cycle times should not obscure the true nature of the present invention. Indeed, as aforesaid, the present invention is needed even if the storage memory module read/write cycle time had been an integral multiple of both interface communication cycle times. The present invention is effective to resynchronize one communications interface of a first interface communications cycle time (normally but not necessarily the slower) when the internal function of a memory resource (most particularly the storage memory banks but also other function like priority determination) is fixedly timed relative to another communications interface of a second, different, interface communications cycle time. The reason the present invention is effective is that every function, including most particularly the read/write cycle time of the storage memory banks, will be timed, within the memory resource and in fixed time (phase) relationship with the second communications cycle time, to run just as fast as the real components electronically permit. Since the memory resource finishes its total function in fixed time relationship to the second interface communications cycle time then it cannot, by definition, always finish such total function at one invariantly fixed time relationship to the first interface communications cycle time, which is defined to be different than said second interface communications cycle time. Therefore, the final results of the total function of the memory resource must be at plural, different, times relative to the first interface communications cycle time recovered to such first interface in order that such final results may thereafter be synchronously output to a requestor upon said first interface synchronously communicating at said first interface communications cycle time.

The nature of the problem solved by the apparatus of the present invention thus becomes one of resynchronization, such resynchronization being necessitous to deliver the results of a storage memory module operating fixedly relative to an interface communication cycle time of one duration (30 nanoseconds) to a requestor interface operative at a interface cycle time of another duration (60 nanoseconds). Incidentally to the problem solved, the read/write cycle time duration (90 nanoseconds) of the storage memory modules is not an integral multiple of such another interface cycle time duration (60 nanoseconds). This resynchronization is performed upon the data as read from the storage memory module or bank, and the storage memory bank resource is freed to continue service to all other requestors, and especially to those requestors which do operate at the faster interface cycle time (30 nanoseconds). Such a timed interrelationship, and the operation of resynchronization, will become clearer during the ensuing explanation.

The timing of the present invention of a high performance storage unit (HPSU) in support of its capability to synchronously communicate with requestors of two different interface cycle times, while simultaneously enabling that the storage memory banks therein the HPSU should not incur read/write cycle time greater than electronically necessary in order merely to support of such interface communication at plural interface cycle times, is shown in FIG. 29, consisting of FIG. 29a through FIG. 29e. The block diagram of the essential timing of the HPSU is shown in FIG. 29a. All timing to the left of the dashed line is enabled by a clock of period 7.5 nanoseconds, the phases of which are labelled 1 through 4, ergo a 4-phase clock. All timing to the right of the dashed line is enabled by the selfsame coincident and identical clock pulses of phase 7.5 nanoseconds save that such pulses are numbered 1 through 8, ergo consitituting an 8-phase clock. The relationship between the phases of the 4-phase clock and those of the 8-phase clock, which are seen to be the identical clock save only for the designation of the phases, is seen within the timing diagram of FIG. 29b. The 4-phase clock supports of a 30 nanosecond communications cycle time synchronous interface to the Scientific Processor, or SP, the input signals from which SP may be seen at the bottom, and the output signals to which SP may be seen at the top, of that area to the left of the dashed line. The 8-phase clock supports a 60 nanosecond communications cycle time synchronous interface to the Instruction Processors or IP's and to also the Input/Output Processors or IOP's, the input signals from which are seen at the bottom, and the output signals to which are seen at the top, of that area to the right of the dashed line within FIG. 29a.

Continuing in FIG. 29a, the REQ STACK & CTRL 82 (partial), 84 (partial) shown therein was previously shown in FIG. 27 to receive the request, address, data and function from both SP0 and SP1. Such is clocked into the IF REG within the REQ STACK & CTRL 82 (partial), 84 (partial) by clock $\phi 4$. Likewise, considering to the right of the dashed line the IOP, IP DATA MUX IOP, IP PRIORITY 52, 54, 68, 72, also previously seen in FIG. 27, receives the request, address, data, function, and start/end information from the IP's and IOP's. This information is clocked into the interface register IF/REG by clock $\phi 7$ of the 8-phase clock. The requests received of the SP's, clocked at $\phi 4$ of the 4-phase clock, and those received of the IP's and IOP's, clocked at $\phi 7$ of the 8-phase clock (which clock times are not identical) must first be brought into synchronization at a common priority network. Thusly, the first problem encountered is merely being able to synchronize those request signals received from the SP via cables 90, 98 with those received of the IP's and IOP's received via cables 60, 80 at the PRI (BANK) 60, which is the common bank priority network. This synchronization is very simple, almost trivial. Consider that all requestors are gated into bank priority PRI (BANK) 60 upon clock $\phi 1$ of the 4-phase clock. Within the IOP, IP DATA MUX IOP, IP PRIORITY 52, 54, 68, 72 the requests from the IP's and IOP's which were clocked into the IF REG thereof on clock $\phi 7$ of the 8-phase clock are subsequently clocked through the first-level priority consisting of PRI and REG during clock $\phi 1$ of the 8-phase clock and finally into the function decoder ending at a register FUNC DEC and REG upon the clock $\phi 7$ (of the 8-phase clock) of the next subsequent cycle. All such clocked timing, as is the two clock phases (15 nanoseconds) allowed for transmission upon cables 66, 80, is taken in consideration of the delays incurred within, and between, the associated circuit elements. Likewise considering the SP REQ STACK & CTRL, DATA STACK 82 (partial), 84 (partial), the requests received of the SP's which were clocked into the IF REG interface register therein upon clock $\phi 4$ of the 4-phase clock are entered into the STACK. Earliest requests leaving the STACK are clocked into the decoder and register DEC-REG upon clock $\phi 3$ (of the 4-phase clock) of the next subsequent cycle. Referring to the pulse trains of the $4\phi$ CLOCK and $8\phi$ CLOCK shown within the timing diagram of FIG. 29b, 15 nanoseconds have been allocated for the transmission of the request signals via cables 90, 98 to the bank priority PRI (BANK) 60. It will be noted that in consideration of the differing circuitry which does handle and stack the requests of the SP's, as compared to the first-level priority determination which does transpire upon the request of the IP's and IOP's, the elapsed time until a single request received of an SP, or one received of an IP or IOP, is received at the bank priority PRI (BANK) 60 is different. This says nothing more than that the latency of the memory response to a request of an IP or an IOP will be greater than that latency of response to a SP request. In fact, the minimum elapsed time upon which a request received of an IP or IOP may be recognized at bank priority is ten clock phases or 75 nanoseconds, whereas the minimum elapsed time upon which a request received of the SP may be recognized at the same bank priority is five clock phases or 27.5 nanoseconds. The HPSU is, of course, pipelined, and the bank priority PRI (BANK) 60 is clocked upon each clock $\phi1$ occurrence of the 4-phase clock.

Continuing in FIG. 29a, it may be noted that the bank priority PRI (BANK) 60 does select, in consideration of the availability of the associated memory module, from amongst the four possible types of requestors competing at this level (SP0, SP1, a first-level prioritized IOP, and a first-level prioritized IP) the highest priority one requestor extremely quickly, returning an acknowledge signal to that single requestor which wins bank priority at time $\phi1+5$ ns, or only 5 nanoseconds after the bank priority was gated upon the occurrence of $\phi1$ of the 4-phase clock. If returned to the SP REQ STACK & CTRL, DATA STACK 82 (partial), 84 (partial), this acknowledge signal permits of the read of a next request from the STACK, and the much later gating of this bank-priority-winning condition by clock $\phi4$ of the 4-phase clock in the AND/OR element to send the ACK acknowledge signal across the interface to the SP requestor. Similarly, if the signal $\phi1+5$ ns is routed to IOP, IP DATA MUX IOP, IP priority 52, 54, 68, 72 upon the winning of bank priority by such then it is first gated into a REG therein by the occurrence of $\phi4$ of the 8-phase clock. The acknowledge signal $\phi1+5$ ns is thereafter gated in element AND/OR upon the interface to the priority-winning IOP or IP as the acknowledgement signal ACK by the occurrence of $\phi7$ of the 8-phase clock. The bank priority PRI (BANK) 60 produces and gates upon clock $\phi4$ of the 4-phase clock those control signals which are distributed via cables 211 to BANK MULTIPLEXOR 60i (shown in FIG. 27) and via cable 210 to the storage memory bank SMB 40 (shown in FIG. 27 as STORAGE MEMORY BANK 0 40a through STORAGE MEMORY BANK 7 40h). Note that three clock phases of time have elapsed within the second-level, bank, priority network. The path of CABLE 210 is clearly labelled as CABLE in order that the significant time spent in signal propagation thereupon may be more clearly recognized, such time as allows the clocking upon $\phi3$ of the 4-phase clock the control signals carried thereon CABLE 210 into the REG receipt register of the storage memory bank SMB 40.

Continuing in FIG. 29a, it is a fixed characteristic of the storage memory bank-SMB 40 that each such operates at a 120 nanoseconds access time. Thusly, that $\phi3$ of the 4-phase clock shown in the output thereof such SMB 40 is that $\phi3$ upon the fourth following complete cycle of the 4-phase clock to that $\phi3$ which did gate the input REG to such SMB 40. The fixed, 120 nanosecond, access time of the storage memory banks presents no problem to the SP interfaces which operate upon a 30 nanosecond interface cycle time. Again allowing three clock phases for receipt of signals transmitted from the (necessarily) physically dispersed modules of the storage memory banks, such signals are recovered via cable 213, 214 into REG of OR/REG 102a,b upon the occurrence of clock $\phi2$ of the 4-phase clock. Such data is subsequently transferred to the interface register IF REG structure within the OR/REG 102a,b upon the occurrence of clock $\phi4$ of the 4-phase clock, and transferred to the SP upon this time which is equal to that clock phase upon which the request from the SP was initially gated, and which represents an integral number of SP interface cycle times of delay therefrom (actually 8 complete cycles equalling a 240 nanosecond read access time).

Figure 29B:
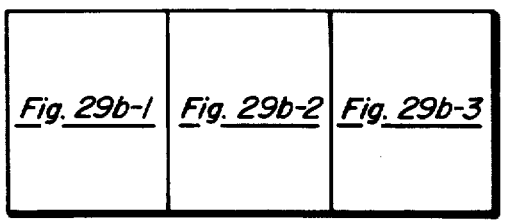
FIG. 29b, consisting of FIG. 29b-1 through FIG. 29b-3 shows a timing diagram of the 8-phase and of the 4-phase clocks which are utilized by different types of requestors in communication with the HPSU, and the possible times of occurrence of the initiation of reading the storage memory bank, and of the gating of the results output therefrom such reading, relative to the clock phases of each of the 4-phase and 8-phase clock timing chains.
Figures 1, 29B:
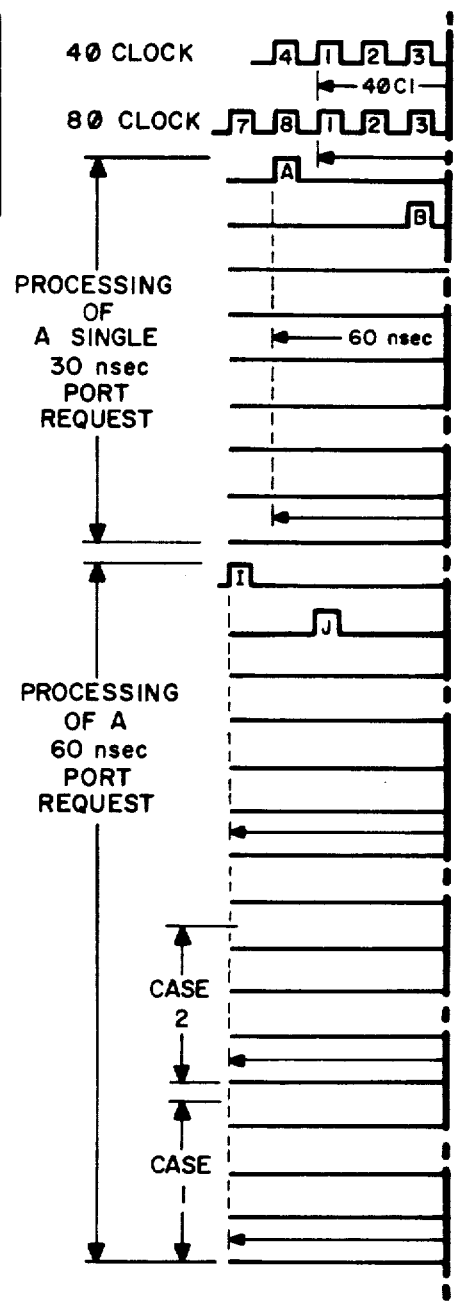
Figures 2, 29B:
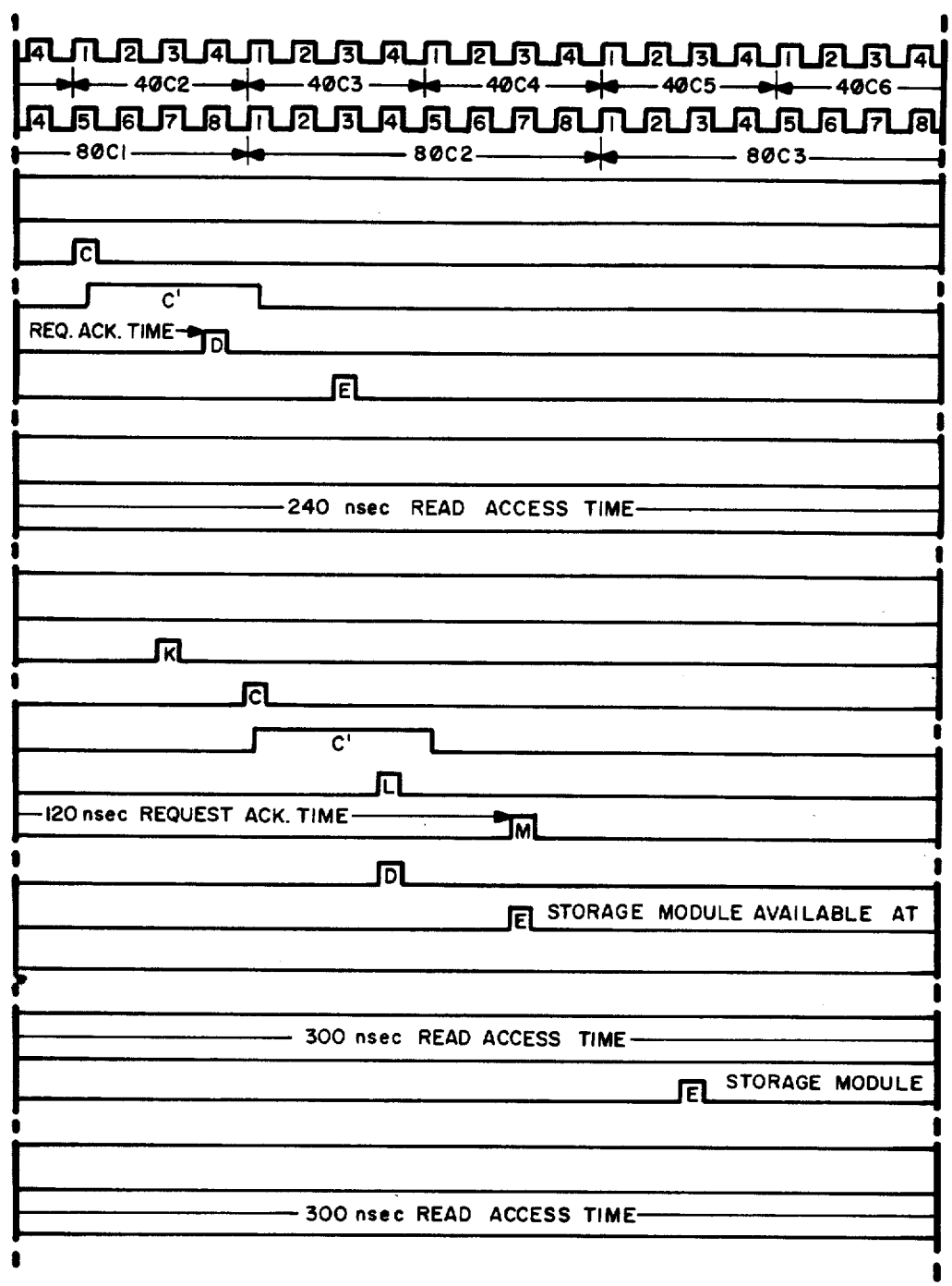
Figures 3, 29B:
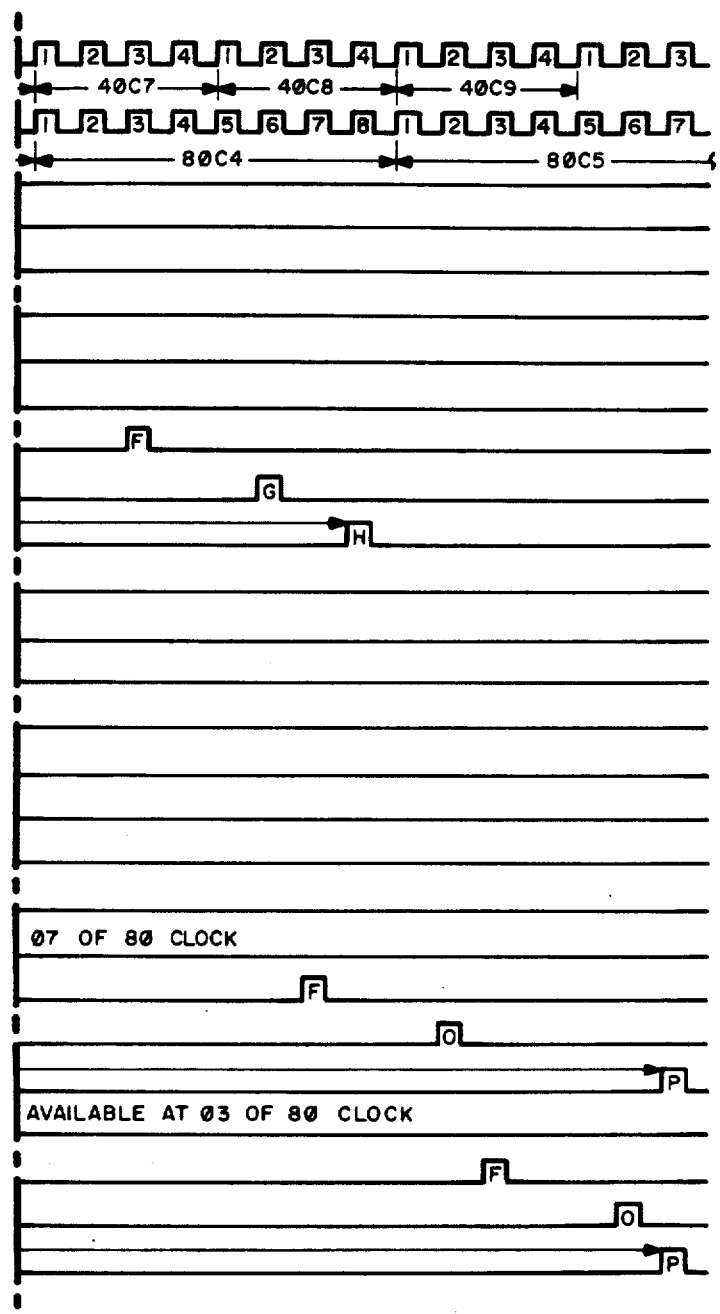

The problem of recovering the data output of the fixed 90 nanosecond cycle time storage memory banks to the interfaces of 60 nanosecond cycle time for the IP and IOP is more severe. It may be readily understood that since 60 nanoseconds is not an integral fraction of 90 nanoseconds (90 nanoseconds is not an integral multiple of 60 nanoseconds), then that clock phase upon which the storage memory bank SMB 40 does both initiate, and does some 90 nanoseconds later start a next subsequent read/write cycle if a request is present, cannot always be in identical relationship to a set phase of the 8-phase clock, such as $\phi7$ of the 8-phase clock which gates the requests from the IP's and IOP's. For example, referring to FIG. 29b, signal E shown therein is the signal, High-going when true, which is coincident with $\phi3$ of the 4-phase clock to both initiate the storage memory bank and to start a next subsequent storage module cycle 90 nanoseconds from the previous initiation. It may be noted that while the occurrence of this signal for the first case of storage module availability within the timing diagram of FIG. 29b is coincident with $\phi7$ of the 8-phase clock, the occurrence of this signal at a separation of 90 nanoseconds is coincident with storage module availability at $\phi3$ of the 8-phase clock. If the output of the storage memory bank SMB 40 as carried upon cables 213, 214 is to be gated into the receiving REG of AND-OR/REG. 102c,d upon the fourth clock phase following such output availability, then said gating will be at either time $\phi2$ or at time $\phi6$ of the 8-phase clock. Reference signal O, High-going when true, shown in FIG. 29b which is intended to illustrate, at respective times $\phi2$ and $\phi6$ the 4-phase clock, the gating into REG of the AND-OR/REG. 102c,d (shown in FIG. 29a) of that data output from the storage memory bank. Returning momentarily to FIG. 29a, the data from the memory recovered into REG of the AND-OR/REG. 102c,d upon either $\phi2$ or $\phi6$ of the 8-phase clock is held therein until being multiplexed in MUX to the IF REG, wherein it is gated upon the occurrence of $\phi7$ of the 8-phase clock, for communication to the appropriate IP or IOP.

The gating signals A through P which are shown in FIG. 29a are again shown in the timing diagram of FIG. 29b. The progress of (1) a single request from an SP requestor upon the 30 nanosecond interface communication cycle time interface, (2) a request arising at an IOP or IP requestor upon the 60 nanosecond interface communication cycle time interface which request does, in the first case, find the memory storage module available at $\phi3$ of the 8phase clock, and (3) a similar request arising at an IOP or IP requestor upon the 60 nanosecond interface which request does, in the second case, find the memory storage module available at $\phi7$ of the 8phase clock, are all shown in FIG. 29b. It should be remembered that the HPSU is pipelined at a 4-phase, 30 nanosecond, clock rate and that all gating signals, enabling conditions such as storage memory bank availability permitting, will be repeated many times during the nine successive cycles of the 4-phase clock (almost five successive cycles of the 8-phase clock) shown in FIG. 29b. The progress of but single requests is illustrated for clarity. The phase of occurrence of all signals A through P may be observed to be in accordance with FIG. 29a. Furthermore, the 60 nanosecond request acknowledge time (REQ. ACK TIME) and the 240 nanosecond READ ACCESS TIME may be observed for the SP interface ports. The 120 nanosecond REQUEST ACK. TIME to IOP or IP port requests may be observed, and it may be noted that the READ ACCESS TIME of such IOP or IP ports is invariant at 300 nanoseconds regardless of whether the case I or case II condition holds true concerning the availability of the memory storage module relative to the gating of the read request from the IOP or IP ports.

Returning to FIG. 29a, the choice of either $\phi 2$ or $\phi 6$ of the 8-phase clock and the application thereof to the entrance register REG of the AND-OR/REG. 102c,d is that resynchronization operation which is crucial to the operation of the present invention to communicate with a class of requestors (the IP's and IOP's) which have an interface cycle time (60 nanoseconds) which is not equal to the interface cycle time (30 nanoseconds) of another class of requestors (the SP's). Most notably, the timely recovery of the data results of the storage memory bank SMB 40 into the REG of the AND-OR/REG. 102c,d will free the storage memory bank to the further service of other requestors, additional pending IP and IOP requests, and, most particularly, the (most often) voluminous requests of the SP's. Note that no resynchronization problem exists with the 30 nanosecond interface of the SP's, each data result produced by the storage memory bank SMB 40 always being at a fixed time, $\phi 3$ of the 4-phase clock, relative to the 4-phase, 30 nanosecond, cycle time of the SP interface. That the results of the storage memory bank SMB 40 will be immediately recovered to the AND-OR/REG. 102c,d and resynchronized therein for communication across the IP and IOP interfaces prevents that such should have to be stored upon the output of the storage memory banks, clogging such storage memory banks and under-utilizing the full potential operational bandwidth of such storage memory banks. Inefficiency would be the result if the cycle time of the storage memory banks had been moved to 120 nanoseconds and the storage module always started concurrently with $\phi 7$ of the 8-phase clock, thereby totally eliminating any resynchronization problem which is the subject of the present invention but, as the price of such elimination, incurring a one-third increase in the performance speed of the storage memory modules. This one-third increase would inefficiently rebound to the utilization of same by the SP interface ports which, as has been seen, require no resynchronization to fully and effectively utilize the 90 nanosecond read-write cycle time of the storage memory banks. Optimization of the performance of the storage memory banks SMB 40 within the present invention is causitive of the required complexity, and resultant resynchronization solution, in the gating of the read data to the IP and IOP interfaces.

The control area which determines whether $\phi 2$ or $\phi 6$ of the 8-phase clock should be provided to gate the read data of storage memory banks SMB 40 into the output register REG of the AND-OR/REG. 102c,d is the IP, IOP OUTPUT SEQUENCER 300a,b shown in FIG. 29a. The signals received by such IP, IOP OUTPUT SEQUENCER 300a,b,-actually composed of two parts as IP OUTPUT SEQUENCER 300a, and IOP OUTPUT SEQUENCER 300b are further shown in FIG. 29c. The dashed line, separating the left section time by the 4-phase clock and the right section time by the 8-phase clock, which was previously seen in FIG. 29a is again seen in FIG. 29c. Additionally, logic structures previously seen in FIG. 29a and FIG. 27 are again shown in FIG. 29c.

Figure 29C:
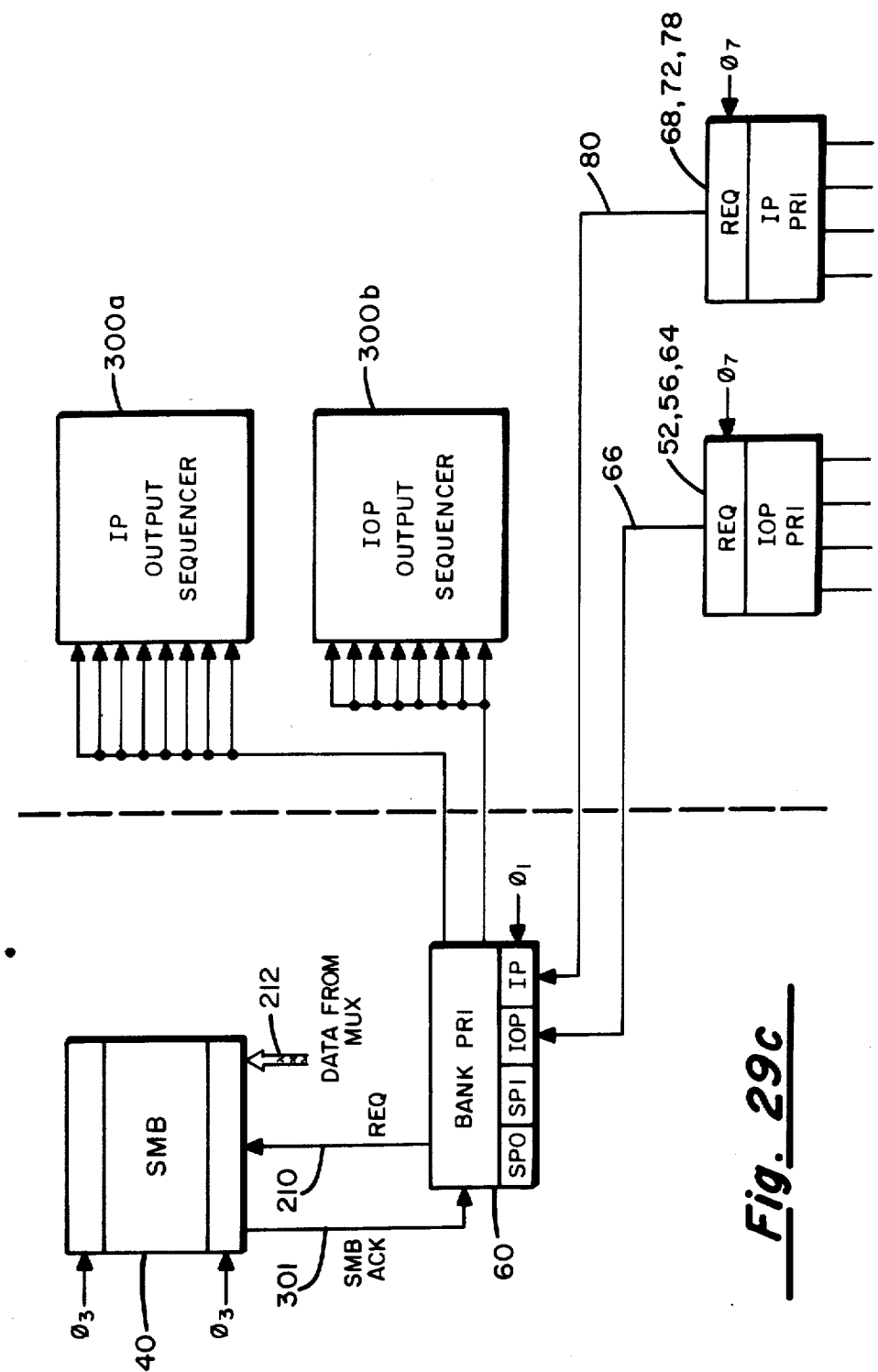

The simple teaching of FIG. 29c is as follows. The storage memory banks SMB 40 each return an acknowledge signal SMB ACK on respectively dedicated ones of the lines of cable 301 to the respective bank priority BANK PRI 60 which had requested same via signal REQ on the associated one line of cable 210. This acknowledge signal SMB ACK on the lines of cable 301 indicates that the storage memory bank has commenced a read/write cycle, basically being equivalent to the receipt of the request signal REQ on line 210 and the gating of such by the storage memory bank initiate timing signal E previously seen in the timing diagram of FIG. 29b. The bank priority BANK PRI 60 routes this acknowledge signal SMB ACK received on a one of the lines of cable 301 to the IP OUTPUT SEQUENCER 300a if the REQ signal on a one of the lines of cable 210 was resultant from an IP request received at such BANK PRI 60 via cable 80, or, alternately, to the IOP OUTPUT SEQUENCER 300b if signal REQ on a one of the lines of cable 210 was resultant from a request signal received at such BANK PRI 60 via cable 66. Each of the IP OUTPUT SEQUENCER 300a and IOP OUTPUT SEQUENCER 300b does receive signals from each of the bank priorities, of which there are eight such BANK 0 PRIORITY 60a through BANK 7 PRIORITY 60h as may be seen by momentary reference to FIG. 27.

Figure 29D:
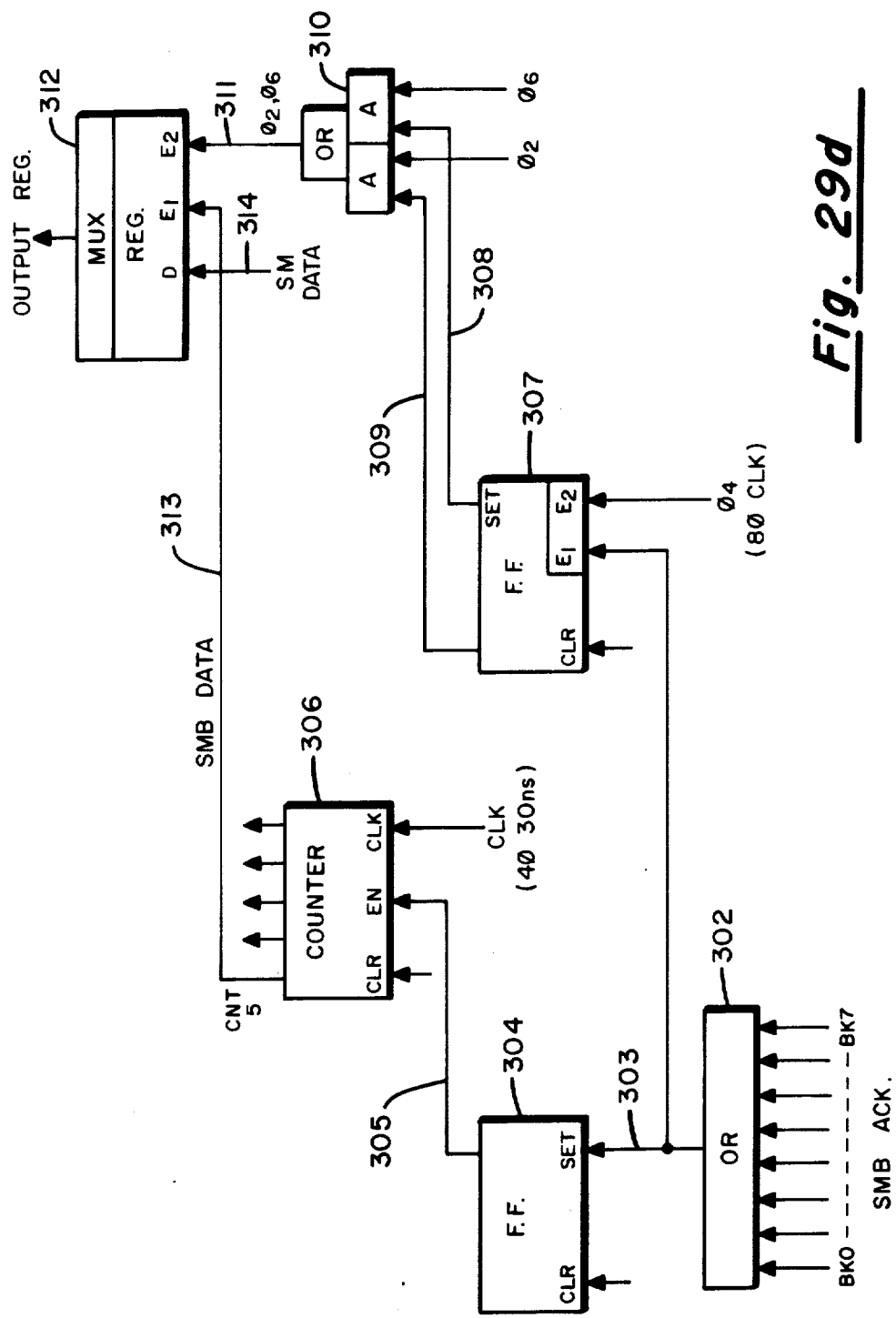
FIG. 29d shows the detailed logic schematic of the implementation of either a IP OUTPUT SEQUENCER 300a or an IOP OUTPUT SEQUENCER 300b previously seen in FIG. 29c.

The detailed structure of each of the IP OUTPUT SEQUENCER 300a and IOP OUTPUT SEQUENCER 300b previously seen in FIG. 29c is shown in FIG. 29d. The eight storage memory bank's knowledge signals labelled SMB ACK BK0 through BK7 received of the eight bank priorities, BANK 0 PRIORITY 60a through BANK 7 PRIORITY 60h, are logically ORed together in OR gate 302 and used to develop a signal on line 303 which does set flip-flop FF 304, the set-side signal output therefrom one line 305 enabling COUNTER 306 to commence counting. The COUNTER 306 is clocked by a signal which is $\phi 4$ of the 4-phase 30 nanosecond clock. That, consequent to the setting of flip-flop FF 304, the COUNTER 306 is timely enabled prior to the occurrence of this signal $\phi 4$ of the 30 nanosecond clock is due to the timing of the signals SMB ACK, which was discussed in conjunction with FIG. 20c. The COUNTER 306 will count five such occurrences of the signal $\phi 4$ of the 30 nanosecond clock.

Continuing in FIG. 29d, if a signal SMB ACK occurs on $\phi 4$ of the 8-phase clock, then the satisfaction of OR GATE 302 producing a true signal on line 303 during such $\phi 4$ of the 8-phase clock will set flip-flop FF 307. If the signal SMB ACK occurs on a phase 8 of the 8-phase clock, the flip-flop FF 307 will not be set. That signal SMB ACK which does occur upon $\phi 4$ of the 4-phase clock may thusly occur at either $\phi 8$ or at $\phi 4$ of the 4-phase clock may be verified by the study of the coincidences of phases within the $\phi 8$ CLOCK and $\phi 4$ CLOCK both shown in the timing diagram of FIG. 29b.

Continuing in FIG. 29d, if the flip-flop FF 307 is set, then the true set-side signal output therefrom on line 308 will enable dual 2-wide AND-OR GATE 310 to gate $\phi 6$ of the 8-phase clock via line 311 to multiplexor register MUX-REG 312. Otherwise, if flip-flop FF 307 is not set, then the true clear side signal output therefrom on line 309 will enable dual 2-wide AND-OR GATE 310 to gate φ2 of the 8-phase clock via line 311 to multiplexor-register MUX-REG 312.

Figure 29E:
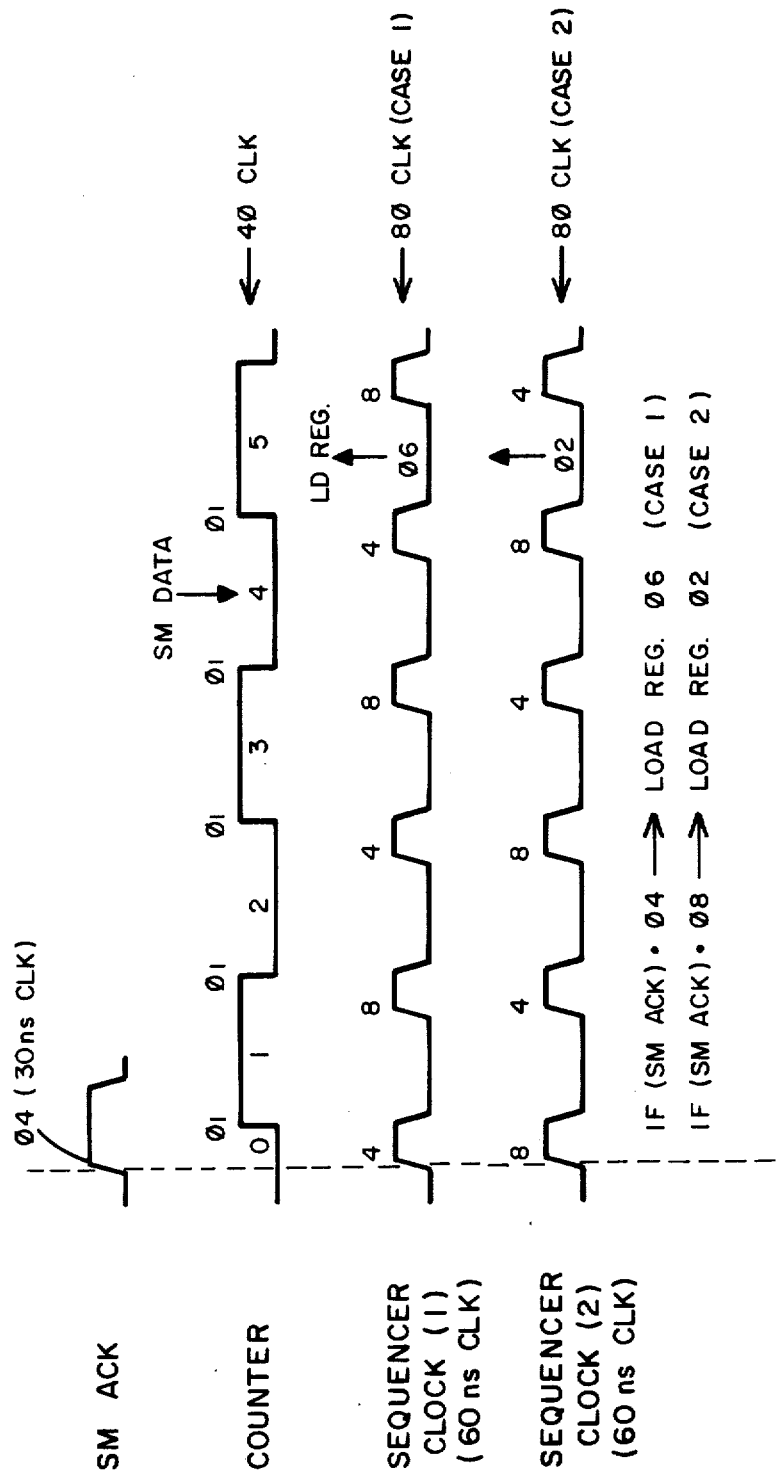
FIG. 29e shows a timing diagram of the operation of an IP OUTPUT SEQUENCER 300a or an IOP OUTPUT SEQUENCER 300b relative to the 4-phase and to the 8-phase clocks which are respectively used by two different type of requestors of the HPSU.

Continuing in FIG. 29d, the fifth count CNT 5 output of COUNTER 306 will produce true signal SMB data on line 313 upon φ3 of the 4-phase clock occurring four 30 nanosecond cycles after the receipt of signal SMB ACK, which signal SMB ACK may be recalled from the explanation of FIG. 29c to arrive one clock phase after the receipt of the request at the storage memory bank SMB 40. Thus signal SMB DATA on line 13 occurs five 30 nanosecond cycles after the occurrence of the request signal to the storage memory bank, and the loading of multiplexor register MUX-REG 312 will occur either upon φ2 or upon φ6 thereof such fifth 30 nanosecond cycle. That this is the proper time for the SM data on line 214 to be recovered into multiplexor-register MUX-REG 312 part of AND-OR/REG 102c,d (shown in FIG. 29a) may be confirmed by reference to such FIG. 29a. Compare also that for either case of storage module availability to requests arising from the 60 nanoseconds interface communication time interface, signal 0 will be delayed five 30 nanosecond cycles from signal E as shown in FIG. 29b. A timing diagram of the operation of the circuit of FIG. 20d, which circuit provides of the synchronization which is essential to the operation of the present invention, is shown in FIG. 29e.

J. Data Paths of the HPSU in Support of Response to Requestors of Differing Interface Bit Widths The HPSU of the present invention communicates with one class of requestor, the SP's, by transferring four words, or 144 data bits plus 16 associated parity bits, upon each SP interface communication cycle time of 30 nanoseconds. The HPSU communicates with another class of requestors, the IOP's and IP's, by transferring two words, or 72 data bits plus 8 associated parity bits, to the IOP's collectively, or to the IP's collectively, upon each IOP or IP interface communication cycle time of 60 nanoseconds.

As has been seen in the study of FIG. 27, the data paths of the HPSU are everywhere four words in width. The problem of inserting two words into a four word field, or of extracting two words from a four word field, is somewhat analogous to the writing of partial words to/from a memory. Most often the write of a partial memory word, including an integral fraction of a memory word such as a half word or a quarter word, is done in a replace operation wherein a requestor reads the entire memory word, selectively masks the memory word inserting the desired partial word, and then the original memory word, altered in the partial word field, is restored to memory. Some memories, such as the HPSU, receive start and end information (defining the beginning and end of partial word fields) from the requestors and act themselves to effectuate partial word writes. The occurrence of partial word writes differs in several aspects, however, from the performance of the present invention. The interface across which a partial word is received is normally enabled for transmission of all bits, and even if it is not the read is normally enabled for the transmission of all bits, and such all bits represent the uniform, fixed-width, interface word of the memory. The HPSU of the present invention always, and not merely selectively, communicates on plural (two) types of requestor interfaces, which types of requestor interfaces always and invariably each operate to communicate a number of bits unique to each type requestor interface upon each and every interface communication cycle. The same type requestor interface is not selectively used at plural bit-widths: different type requestor interfaces are each invariably used at an associated bit-width, which bit-width is different between requestor types and associated requestor type interfaces.

The communication of four words each interface communication time being considered the normal bit-width of HPSU communication, only the control allowing communication of two words upon only the IOP and IP interfaces needs be explained. The receipt of each two words from an IP or an IOP is easily applied to the four-word-wide internal data paths of the HPSU. Each two words received are channeled to both the upper two words and the lower two words of the four-word-wide data path. For example, and by momentary reference to FIG. 27, each two words of data received on the IOP input data paths 202b would be emplaced by the IOP DATA MUX onto both the upper two word and the lower two word parts of four-word-wide data bus 58. The ultimate control of which two words are to be written within each four word addressable boundary of the storage memory banks, STORAGE MEMORY BANK 0 40a through STORAGE MEMORY BANK 7 40h, will be under the control of storage module enables, which as previously discussed are developed in the bank priorities in consideration of address and function information. Similarily, when a write is commanded to occur upon but a single word (or even upon but a partial field down to but a single bit within a single word) then this single word of data is received properly positioned within a two word field by the requestor, and the IOP or IP DATA MUX will properly position this two word field to both the upper and lower parts of the four-word field so that it can later, under the control of the word write enables as are uniquely developed in bank priority for each of the four storage modules within each of the storage memory banks, be properly written into memory as word 3, word 2, word 1, or word 0 upon some four-word addressable boundary. This selective write enablement is done for the example of a single word write by an IP, within the bank priority in accordance with the function code directing single word write and by address bit 22 telling the lower pair/-upper pair, and by bit 23 telling the least significant or more significant word of pair, of the four-word-wife data buses 212 (reference FIG. 27). Note in section 6.3.1 of this specification that special function codes attend the writing of one word and of partial words. The function controlled operation that partial words such as half-words or quarter-words should be emplaced upon proper partial word boundaries is well known in memory design. Herein the HPSU, the directly analogous operation is the emplacement of word pairs, or single words within a four-word-wide addressable space.

The more interesting question in the operation of the present invention is how to read a pair of words after making memory reference at a four word addressable boundary. Even this is not difficult, however, being based on a selection between an upper two words or a lower two words wherein selection is based on addressing. Within the scheme of the HPSU for wired-OR bussed distribution of data read of storage memory banks to the memory resource output ports associated with each type of requestor, this required selection is performed in the gating of the upper and lower wired-OR communication buses to the output registers.

Referencing FIG. 27 the preferred embodiment implementation of the present invention does permit of more wired-OR communication buses than there are memory resource output ports, to-wit: two wired-OR communication buses, one connecting to the even storage memory banks and one to the odd storage memory banks, for each of the output communication ports. Furthermore, the preferred embodiment of the invention further permits that each wired-OR communication bus as is connected between the odd memory banks and either the IOP or IP port, and between the even memory banks and either the IOP or IP port, should further be divisible into two halves, a lower 2-word half and an upper 2-word half. Gating control at each of the IOP and IP ports needs be further established to controllably gate each of the 2-word, upper and lower, halves. Finally, the preferred embodiment of invention does allow that the information controllably gated of the even or the odd wired-OR communication bus connected to the IOP and IP ports, and from the upper 2-word half or the lower 2-word half of each such communication bus, may be further controllably distributed one only of the four IOP's or four IP's as respectively communicated with the IOP and IP ports. All this control utilized in the preferred embodiment of the invention is shown in FIG. 30.

Figure 30A:
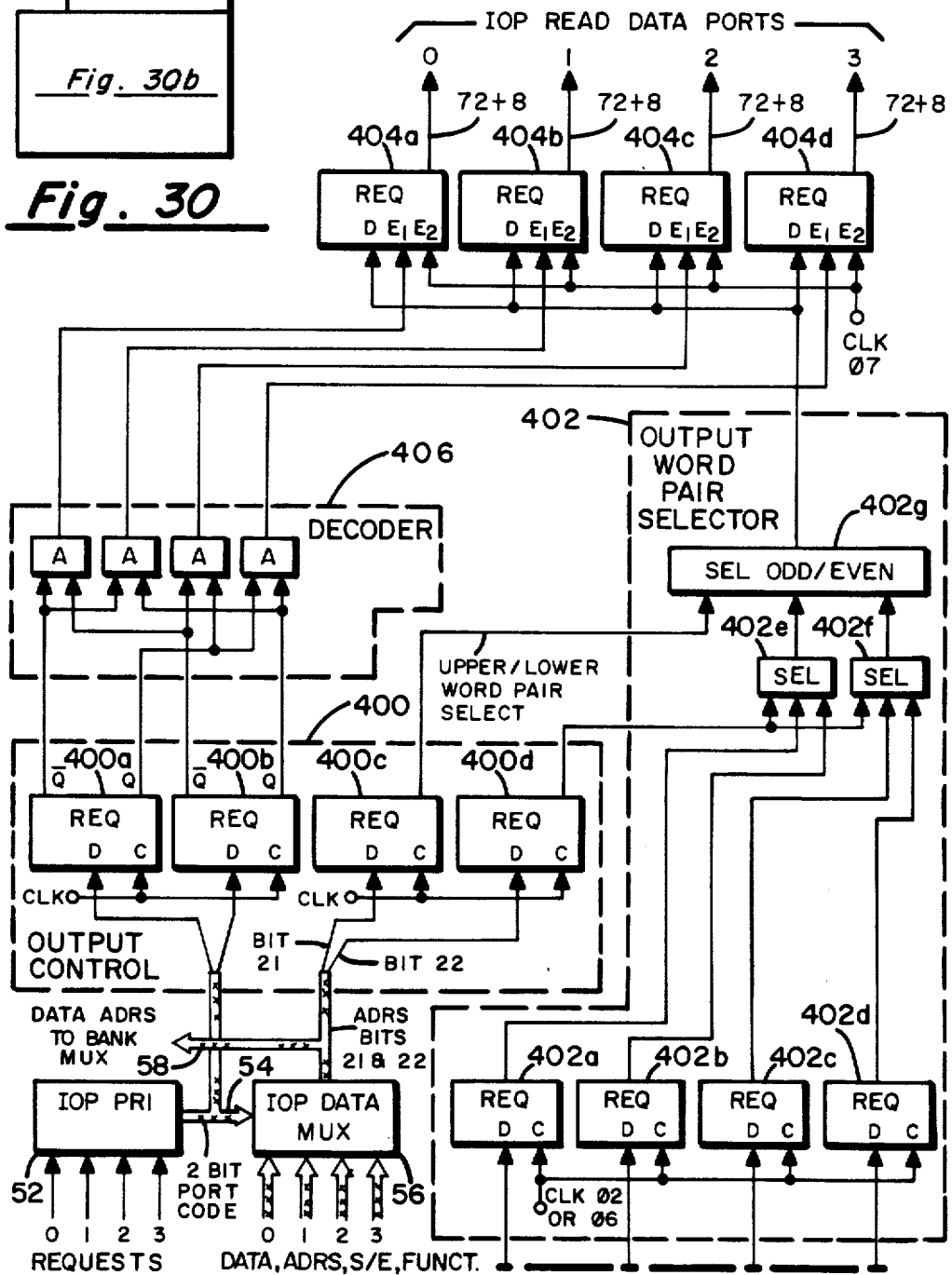
FIG. 30, consisting of FIG. 30a and FIG. 30b, shows a diagram of the manner and apparatus by which the memory resource output ports of the High Performance Storage Unit received of the wired-OR communication buses, and to gate such data to be transmitted to one of the requestors with which such memory resource output port communicates.
Figure 30B:
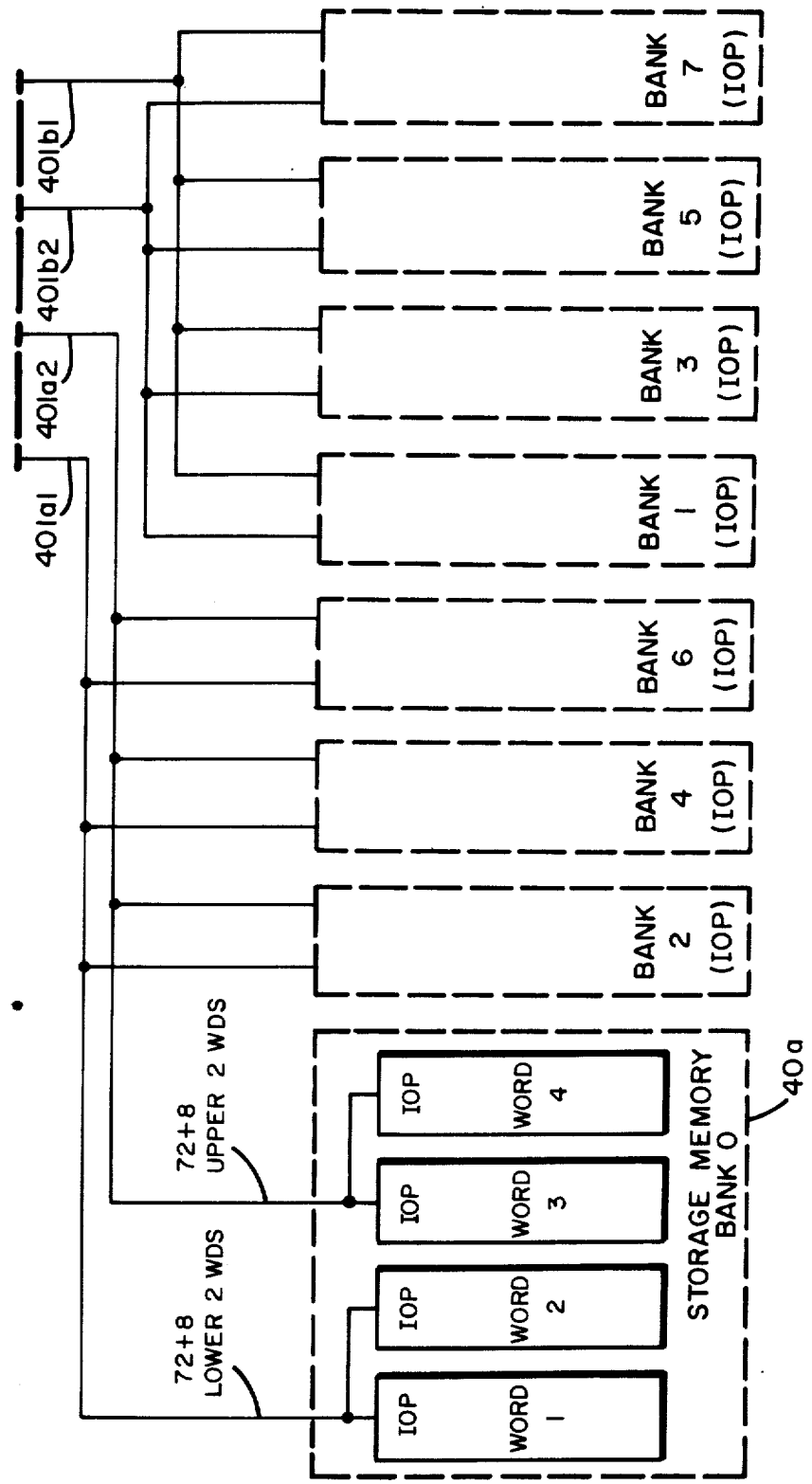

The manner of the application of control to the IOP port, and to the AND-OR/REG 102c which may be momentarily referenced in FIG. 27a, is shown as illustrative of the application of such control in FIG. 30. Momentarily referencing FIG. 27a, the control of the OR/REG 102a which is the output register for the SP0 port, or the OR/REG 102b which is the output register for the SP1 port, will be somewhat simpler by not requiring the selection amongst a plural number of requestors on each such port. Alternatively, the control of the AND-OR-STACK/REG 102d which is the output register for the IP port will be equivalent to that control for the IOP port which is shown in FIG. 30. Illustrated in FIG. 30 is STORAGE MEMORY BANK 0 40a, showing the four complete storage modules as are associated with WORD 1, WORD 2, WORD 3, and WORD 4 contained therein. It is further known that each such storage module, and the storage memory bank in its entirety, has four output ports, of which the IOP output port to the storage memory bank is of present interest. Further, such IOP output port as across each of the even storage memory banks is combined into wired-OR communication buses 401a, consisting of 401a1 and 401a2, whereas the IOP output port associated with each of odd memory banks (BANKs 1, 3, 5, and 7) are combined into wired-OR communication buses 401b, consisting of 401b1 and 401b2. Further, each such communication bus 401a to the even-storage memory banks and 401b to the odd storage memory banks is divided into lower and upper halves, each half which respectively communicates with the lower two (WORD 1 and WORD 2) storage memory modules of each storage memory bank with which it communicates, or with the upper two (WORD 3 and WORD 4) storage memory modules within each bank with which such communicates. Each of these halves indicated as wired-OR communication buses 401a1, 401a2, 401b1, and 401b2 is thusly of 2-word width, consisting of 72 data bits plus eight accompanying parity bits. Such 2-word wide communication buses 401a1, 401a2, 401b1, 401b2 are received into the indicated REG registers of the OUTPUT WORD PAIR SELECTOR 402 which is part of AND-OR/REG 102c (shown in FIG. 27a) in a like manner to the receipt of 2-word wide wired-OR buses 214a1, 214a2, 214b1, and 214b2 into AND-OR-STACK/REG 102d (shown in FIG. 27a).

The selection problem thus presents itself as selecting amongst these even and odd, lower word pair and upper word pair, wired-OR communication buses as are received at a single output port, the IOP output port in the illustration of FIG. 30. This selection is accomplished simply by address bit 21 and 22 as do respectively select of the even or odd storage memory bank, and of the upper or lower two words within each such bank. These address bits 21 and 22 are obtained as signal ADRS bits 21 and 22, part of cable 58 otherwise distributing DATA, ADRS (and other information) to BANK MUX, meaning the BANK MULTIPLEXER 60i (shown in FIG. 27b), from the IOP DATA MUX 56 (also shown in FIG. 27b). These address bits 21 and 22 are respectively received into REG 400c and REG 400d holding flip-flop registers within OUTPUT CONTROL 400. Address bit 22 held in REG 400d is first used to select in selector SEL 402e from amongst lower two words of read data held within REG 402a or the upper two words of read data held within REG 402b. Likewise and simultaneously, address bit 22 held within REG 400d is used to select within selector SEL 402f from amongst the lower two words of data held within REG 402c or from amongst the upper two words of data held within REG 402d, both such lower and upper half words coming from the odd memory banks. The selected, upper or lower, two words from the even memory banks, and from the odd memory banks, are respectively output of selectors SEL 402f and received at SEL ODD/EVEN selector 40.2g. Therein they are selected between under control of address bit 21 stored within REG 402c, the selected two words from the selected odd or even memory banks being further routed in parallel as the read data to output registers REG 404a, REG 404b, REG 404c, and REG 404d as are associated with each of the four IOP's which are communicative with this IOP data port of the HPSU. Thus has the problem of the selection between the two, the even and the odd, wired-OR communication buses which are communicative between all the storage memory banks and a single output port been solved, and additionally the selection between the lower two words and the upper two words which are carried on 2-word wide wired-OR communication buses between each of the storage memory banks and the IOP or IP ports also been solved.

Continuing in FIG. 30, the control which does allow of the selection of the single IOP of the four such connected to an IOP port to which the (two words of) read data will be communicated is derived from IOP PRIORITY 52, also shown in FIG. 27b. Such IOP PRIORITY 52 does decode amongst the competing requests of up to four IOP requestors to develop a single highest priority one request identified by a 2-bit code on cable 54, which code does select of the data, address, function, and start/end data to be gated from the appropriate IOP through IOP DATA MUX 56. This 2-bit IOP identifier code is also stored within REG 400a and REWG 400b of output control 400. Thereafter the set side, Q, and clear side, Q of both such REG 400a and REG 400b are utilized in the AND gate network of DECODER 406 to develop four signals, only one of which will be true, which are respectively routed to output registers REG 404a, REG 404b, REG 404c, and REG 404d. These enablements, when gated by the occurrence of CLK ϕ7 to the same registers, will enable one only of such registers to accept 2-words of read data from SEL ODD/EVEN 402g, and drive such two words of data as 72 data bits plus eight associated parity bits onto the interface lines of the associated IOP, IOP0 through IOP3. Thus has the selection of an individual IOP, one of four such which communicates to the IOP port of the HPSU, been accomplished by control stemming from the original, initial, prioritization of such IOP. The timing of all selection shown in FIG. 30 must be accomplished in consideration of the overall timing of the HPSU, such timing as is further expounded in section I of this specification disclosure.

While the method and apparatus of the present invention have been taught with reference to a particular preferred embodiment implementation, is is to be recognized that equivalent implementations may suggest themselves to those of skill in the art upon a reading of the present specification disclosure. Therefore, the following claims should be interpreted so as to encompass all such equivalents which might suggest themselves to one skilled in the art upon a reading of the present specification.

What is claimed is:

1. A memory resource synchronously communicative with a plurality of requesters for the reading and writing of addressable data stores operative in a manner such that said memory resource does synchronously communicate with at least one of said plurality of requestors at a first interface communication cycle time $T_x$ while simultaneously synchronously communicating with at least another one of said plurality of requesters at a different second interface communication cycle time $T_y$, $T_x \neq T_y$, said interface communication cycle time being defined as that time between successive synchronous receipts of a request signal plus accompanying address and data and control information from a single requestor, which is equivalent to defining said interface communication cycle time as that time interval during which synchronous communication of information transpires, said memory resource operative for said synchronously communicating at a plurality of different interface communication cycle times comprising:

a multi-phase basic master clock of a phase time period which divides integrally into each said different interface communication cycle times;

storage memory banks containing data, and honoring requests to read or write such data only upon a fixed phase of said multi-phase master clock, and performing such requests during a fixed read/write cycle time which is not in an integral relationship to at least one of said interface communication cycle times $T_x$ or $T_y$;

synchronization means for receiving the synchronous communications of each of said plurality of requestors and for presenting such communications as requests to said storage memory banks upon said fixed phase of said multi-phase master clock;

resynchronization means for receiving, at said fixed read/write cycle time after said fixed phase of said multi-phase master clock, results of either read data or write acknowledgement from said storage memory banks, and for resynchronizing said results and communicating such to appropriate communicating said requestors WHEREIN said receiving performed by said resynchronization means is always immediately timely effective to free said storage memory banks for further use by said receiving of said results regardless that said communicating said results to said requestors needs transpire at said plurality of different interface communication times;

whereby said memory resource has not only communicated to a plurality of requestors at a plurality of different interface communication cycle times but has done so, via said synchronization means and said resynchronization means, in a manner which accorded that said storage memory banks do always perform requests to read or write such data during said fixed read/write cycle time which is not in simultaneous integral relationship to at least one of said interface communication cycle times.

2. The memory resource of claim 1 further operative in a manner that said synchronously communicating with at least one of said plurality of requestors during said communication cycle time $T_x$ is at a bit-width of each communication transfer equal to $W_x$ bits, while synchronously communicating with at least another one of said plurality of requestors at said second interface communication cycle time $T_y$ is a bit-width of each communication transfer equal to $W_y$ bits, $W_x \neq W_y$, said memory resource communicating $W_x$ bits at communication cycle time $T_x$ and $W_y$ bits at communication cycle time $T_y$ comprising:

input data alignment and assembly means for receiving write data/read requests at a bit-width of $W_x$ bits from a one of said plurality of requestors communicating at interface communication cycle time $T_x$, and receiving write data/read/requests a bit-width of $W_y$ bits from another one of said plurality of requestors communicating at interface cycle time $T_y$, and for aligning and assembling said write data/read requests at whatever, $W_x$ or $W_y$, bit-width received into a fixed field of $W_z$ bits, $W_z > W_x$, $W_z > W_y$, and for making requests to read or write said storage memory banks at a field-width of $W_z$ bits;

said storage memory banks containing data being further operative to honor said requests to read or write data at a field-width of $W_z$ bits; and .

output data extracting and disassembly means for taking data read of said storage memory banks at said field-width of $W_z$ bits and for extracting, of disassembling as the case requires, of said $W_z$ bits data a word of $W_x$ bits and for communicating said word of $W_x$ bits to said one of said plurality of requestors, also for extracting, or disassembling as the case requires, of said $W_z$ data bits a word of $W_y$ bits and for communicating said word of $W_y$ bits to said another one of said plurality of requestors;

thereby alignment and assembly, and extraction and disassembly, of data communicated to said memory resource has been performed for bit-widths of each communication transfer of $W_x$ bits, and also for $W_y$ bits, $W_x \neq W_y$.

3. The memory resource of claim 2 wherein said memory resource does synchronously communicate at a bandwidth $B_x = W_x/T_x$ to at least said one of said plurality of requestors and does also synchronously communicate at a bandwidth $B_y = W_y/R_y$ to at least said another one of said plurality of requestors, $B_x = B_y$.

4. The memory resource of claim 3 wherein said memory resource does synchronously communicate at bandwidth $B_x = W_x/T_y$ to at least said one of said plurality of requestors and at bandwidth $B_y = W_y/T_y$ to at least said another one of said plurality of requestors WHEREIN $W_x > W_y$ while simultaneously $T_x < T_y$, ergo $B_x > B_y$.

5. A memory resource synchronously communicative with each such plurality of requestors for the reading and writing of addressable data stores operative in a manner such that said memory resource does always and invariantly synchronously communicate for the reading and writing of common addressable data stores with at least one of said plurality of requestors at a first interface bit-width $W_x$ while simultaneously synchronously communicating with at least another one of said plurality of requestors at a second interface bit-width $W_y$, $W_x = W_y$, said interface bit-width being defined as the number of bits of data which are communicated upon each synchronous interface communication cycle time to each of said plurality of requestors and said memory resource does perform reading and writing in common on a priority basis to all said plurality of requestors collectively, meaning that both said at least one of said plurality of requestors and said another one of said plurality of requestors can read and write, on a priority basis, the same locations of said common addressable data stores, said memory resource operative for said synchronously communicating on a priority basis at a plurality of interface communication cycle times comprising:

a multi-phase basic master clock of a phase time period which divides integrally into each said different interface communication cycle times;

storage memory banks containing data, and honoring requests to read or write such data only upon a fixed phase of said multi-phase master clock, and performing such requests during a fixed read/write cycle time which is not in an integral relationship to at least one of said interface communication cycle times $T_x$ or $T_y$;

synchronization means for receiving the synchronous communications of each of said plurality of requestors and for presenting such communications as requests to said storage memory banks upon said fixed phase of said multiphase master clock;

resynchronization means for receiving, at said fixed read/write cycle time after said fixed phase of said multi-phase master clock, results of either read data or write acknowledgment from said storage memory banks, and for resynchronizing said results and communicating such to appropriate communicating said requestors WHEREIN said receiving performed by said resynchronization means is always immediately timely effective to free said storage memory banks for further use by said receiving of said results regardless that said communicating said results to said requestors needs transpire at said plurality of different interface communication times;

whereby said memory resource has not only communicated to a plurality of requestors at a plurality of different interface communication cycle times but has done so, via said synchronization means and said resynchronization means, in a manner which accorded that said storage memory banks do always perform requests to read or write such data during said fixed read/write cycle time which is not in simultaneous integral relationship to at least one of said interface communication cycle times.

* * * * *